United States Patent
Du et al.

(10) Patent No.: US 12,517,693 B2
(45) Date of Patent: Jan. 6, 2026

(54) METHOD FOR INVOKING CAPABILITY OF ANOTHER DEVICE, ELECTRONIC DEVICE, AND SYSTEM

(71) Applicant: HUAWEI TECHNOLOGIES CO., LTD., Guangdong (CN)

(72) Inventors: Yiquan Du, Shanghai (CN); Yaojun Wang, Shanghai (CN); Yulin Yan, Shanghai (CN); Yi Yue, Shanghai (CN); Liangchuan Ma, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 65 days.

(21) Appl. No.: 18/258,441

(22) PCT Filed: Dec. 16, 2021

(86) PCT No.: PCT/CN2021/138870
§ 371 (c)(1),
(2) Date: Jun. 20, 2023

(87) PCT Pub. No.: WO2022/135273
PCT Pub. Date: Jun. 30, 2022

(65) Prior Publication Data
US 2024/0303022 A1 Sep. 12, 2024

(30) Foreign Application Priority Data
Dec. 22, 2020 (CN) .......................... 202011526935.5

(51) Int. Cl.
*G06F 3/14* (2006.01)
*G06F 40/279* (2020.01)
(Continued)

(52) U.S. Cl.
CPC .......... *G06F 3/1454* (2013.01); *G06F 40/279* (2020.01); *G06F 40/58* (2020.01); *G06V 10/955* (2022.01)

(58) Field of Classification Search
CPC ..................................................... G06F 3/0482
See application file for complete search history.

(56) References Cited

U.S. PATENT DOCUMENTS

2006/0129976 A1  6/2006  Brand et al.
2011/0037712 A1* 2/2011  Kim ...................... G06F 3/0488
                                                             345/173
(Continued)

FOREIGN PATENT DOCUMENTS

CN       1361622 A     7/2002
CN     101841637 A     9/2010
(Continued)

OTHER PUBLICATIONS

International Search Report and Written Opinion in International Appln. No. PCT/CN2021/138870, mailed on Mar. 21, 2022, 18 pages (with English translation).
(Continued)

*Primary Examiner* — Nan-Ying Yang
(74) *Attorney, Agent, or Firm* — Fish & Richardson P.C.

(57) ABSTRACT

Example methods and apparatus for invoking a capability of a device are described. One example system comprises a first electronic device and a second electronic device, and the first electronic device has a first function. In one example method, the first electronic device detects a first operations of a use, and sends request information to the second electronic device in response to the first operation, wherein the request information is used to request first image information on the second electronic device. The second electronic device sends the first image information to the second electronic device in response to the request information. The
(Continued)

first electronic device processes the first image information by using the first function.

20 Claims, 51 Drawing Sheets

(51) Int. Cl.
*G06F 40/58* (2020.01)
*G06V 10/94* (2022.01)

(56) References Cited

U.S. PATENT DOCUMENTS

| | | | |
|---|---|---|---|
| 2011/0047214 A1* | 2/2011 | Lee | H04L 12/2809 |
| | | | 709/204 |
| 2012/0040719 A1* | 2/2012 | Lee | G06F 3/1454 |
| | | | 455/557 |
| 2016/0110348 A1 | 4/2016 | Issaev | |
| 2017/0134393 A1 | 5/2017 | Islam et al. | |
| 2017/0310685 A1 | 10/2017 | Zhao et al. | |
| 2018/0039384 A1* | 2/2018 | DeLuca | H04W 8/005 |
| 2018/0164963 A1* | 6/2018 | Ku | G06F 3/04842 |
| 2018/0276473 A1* | 9/2018 | Kim | G06V 10/235 |
| 2020/0067901 A1 | 2/2020 | Marchand et al. | |
| 2020/0342166 A1 | 10/2020 | Sheth et al. | |
| 2020/0395020 A1 | 12/2020 | Mondragon | |
| 2021/0204337 A1 | 7/2021 | Yang et al. | |
| 2022/0067992 A1 | 3/2022 | Xu et al. | |
| 2023/0305680 A1* | 9/2023 | Liu | G06F 3/0488 |

FOREIGN PATENT DOCUMENTS

| | | |
|---|---|---|
| CN | 103634640 A | 3/2014 |
| CN | 103986504 A | 8/2014 |
| CN | 104469714 A | 3/2015 |
| CN | 104506946 A | 4/2015 |
| CN | 104754413 A | 7/2015 |
| CN | 105049608 A | 11/2015 |
| CN | 106202308 A | 12/2016 |
| CN | 108154020 A | 6/2018 |
| CN | 109598115 A | 4/2019 |
| CN | 109618224 A | 4/2019 |
| CN | 110781688 A | 2/2020 |
| CN | 111756696 A | 10/2020 |
| EP | 4187876 A1 | 5/2023 |
| WO | 2015156011 A1 | 10/2015 |

OTHER PUBLICATIONS

Extended European Search Report in European Appln No. 20949470.7, dated Nov. 24, 2023, 301 pages.
Extended European Search Report in European Appln. No. 21909265.7, mailed on Mar. 20, 2024, 7 pages.
Extended European Search Report in European Appln. No. 21909269.9, mailed on Mar. 15, 2024, 10 pages.
EP Communication Pursuant to Article 94(3) EPC in European Appln. No. 21909269.9, mailed on Mar. 12, 2025, 8 pages.

* cited by examiner

CONT. FROM

CONT. FROM

CONT. FROM FIG. 5(a)-1

CONT. FROM FIG. 10(a)-1

CONT. FROM FIG. 10(c)-1

METHOD FOR INVOKING CAPABILITY OF ANOTHER DEVICE, ELECTRONIC DEVICE, AND SYSTEM

CROSS-REFERENCE TO RELATED APPLICATIONS

This application is a national stage of International Application No. PCT/CN2021/138870, filed on Dec. 16, 2021, which claims priority to Chinese Patent application Ser. No. 202011526935.5, filed on Dec. 22, 2020. Both of the aforementioned applications are hereby incorporated by reference in their entireties.

TECHNICAL FIELD

This application relates to the terminal field, and more specifically, to a method for invoking a capability of another device, an electronic device, and a system.

BACKGROUND

Currently, increasingly more devices are owned by users, and increasingly more linkages are performed between devices. Technologies such as projection and multi-screen interaction also emerge endlessly. However, most of existing inter-device linkage technologies are limited to interface integration and file transfer. In most cases, users need to complete some difficult tasks on a single device. Due to a limited capability of the single device, the user operations are inconvenient.

SUMMARY

This application provides a method for invoking a capability of another device, an electronic device, and a system, to help improve cross-device use experience of a user.

According to a first aspect, a system is provided. The system includes a first electronic device and a second electronic device. The first electronic device has a first function. The first electronic device is configured to detect a first operation of a user; the first electronic device is further configured to send request information to the second electronic device in response to the first operation, where the request information is used to request first image information on the second electronic device; the second electronic device is configured to send the first image information to the second electronic device in response to the request information; and the first electronic device is further configured to process the first image information by using the first function.

In this embodiment of this application, the user may quickly process image information on the second electronic device by using the first electronic device, to enrich capabilities of interconnection and function sharing between the first electronic device and the second electronic device, and help improve cross-device use experience of the user.

With reference to the first aspect, in some implementations of the first aspect, the first electronic device is further configured to send a processing result of the first image information to the second electronic device; and the second electronic device is further configured to display the processing result.

In this embodiment of this application, after obtaining the processing result, the first electronic device may send the processing result to the processing result, and the second electronic device may display the processing result, so that the user can view the processing result on the second electronic device, to help improve cross-device use experience of the user.

With reference to the first aspect, in some implementations of the first aspect, the first electronic device is further configured to display the processing result of the first image information.

In this embodiment of this application, after obtaining the processing result, the first electronic device may display the processing result on the first electronic device, so that the user can conveniently view the processing result on the first electronic device, to help improve cross-device use experience of the user.

With reference to the first aspect, in some implementations of the first aspect, the first function includes a first sub-function and a second sub-function, and the first electronic device is specifically configured to: when the first image information includes first content, process the first content by using the first sub-function; or when the first image information includes second content, process the second content by using the second sub-function.

In this embodiment of this application, the first electronic device may determine, based on content included in the first image information, a function to be used to process the content, and the user does not need to select the function. This improves intelligence of the electronic device and helps improve cross-device use experience of the user.

In some possible implementations, if the first image information includes a text, the first electronic device may translate the text by using a translation function, or the first electronic device may perform a word extraction operation on the text by using a word extraction function.

In some possible implementations, if the first image information includes an image of an object, the first electronic device may recognize the object by using an object recognition function.

With reference to the first aspect, in some implementations of the first aspect, the first electronic device further has a second function, and the first electronic device is specifically configured to: in response to receiving the first image information, prompt the user to process the first image information by using the first function or the second function; and process the first image information by using the first function in response to an operation of selecting the first function by the user.

In this embodiment of this application, after obtaining the first image information, the first electronic device may prompt the user to use a specific function to process the image information. This helps improve accuracy of processing the image information and helps improve cross-device use experience of the user.

With reference to the first aspect, in some implementations of the first aspect, the first electronic device is specifically configured to: display the first image information in response to receiving the first image information, where the first image information includes a first part and a second part; and process the first part by using the first function in response to a second operation performed by the user on the first part.

In this embodiment of this application, if the first image information includes the first part and the second part, the first electronic device may first display the first part and the second part, and when detecting the second operation performed by the user on the first part, the first electronic device may process the first part. This helps improve accuracy of processing the image information and helps improve cross-device use experience of the user.

In some possible implementations, the first electronic device is specifically configured to: in response to the detected second operation, prompt the user to process the first part by using the first function or the second function; and process the first part by using the first function in response to an operation of selecting the first function by the user.

With reference to the first aspect, in some implementations of the first aspect, the first electronic device is specifically configured to: in response to the first operation, prompt the user whether to process image information on the second electronic device; and send the request information to the second electronic device in response to an operation that the user determines to process the image information on the second electronic device.

With reference to the first aspect, in some implementations of the first aspect, the first electronic device is further configured to: detect a third operation of the user; and in response to the third operation, process image information displayed on the first electronic device.

In this embodiment of this application, when detecting the first operation of the user, the first electronic device may prompt the user to determine to process the image information on the first electronic device or the second electronic device. This helps improve accuracy of processing the image information and helps improve cross-device use experience of the user.

With reference to the first aspect, in some implementations of the first aspect, the request information includes information about a first moment, first moment is a moment at which the first electronic device detects the first operation, and the second electronic device is further configured to determine the first image information based on the first moment.

In this embodiment of this application, the first electronic device may use the request information to carry the information about the first moment, so that the second electronic device searches for image information at (or near) the first moment, and sends the image information at (or near) the first moment to the first electronic device. This helps improve accuracy of processing the image information by the first electronic device and helps improve cross-device use experience of the user.

With reference to the first aspect, in some implementations of the first aspect, the request information further includes information about first duration, and the second electronic device is specifically configured to determine the first image information based on the first moment and the first duration.

In this embodiment of this application, considering that there is specific duration from a time point at which the user sees a related picture on the second electronic device to a time point at which the user triggers the first operation on the first electronic device, the first electronic device may use the request information to carry the information about the first duration, to help the second electronic device determine image information at (or near) a specific moment that expects to be obtained by the first electronic device. This helps improve accuracy of processing the image information by the first electronic device and helps improve cross-device use experience of the user.

In some possible implementations, the first duration is preset duration in the first electronic device.

In some possible implementations, the first duration is duration that is set by the user and that is detected by the first electronic device.

In some possible implementations, the first duration is duration determined by the first electronic device based on user information of an owner of the first electronic device.

With reference to the first aspect, in some implementations of the first aspect, the first image information includes text information, and the first electronic device is specifically configured to: translate the text content by using a translation function, to obtain a translation result; or perform a word extraction operation on the text content by using a word extraction function, to obtain a word extraction result.

In this embodiment of this application, the user may quickly perform operations such as translation, word extraction, and character string storage on the image information on the second electronic device by using the first electronic device, to enrich capabilities of cross-device interconnection and function sharing, and help improve cross-device use experience of the user.

With reference to the first aspect, in some implementations of the first aspect, the first image information includes an image of an object, and the first electronic device is specifically configured to recognize the object by using an object recognition function, to obtain an object recognition result.

In this embodiment of this application, the user may quickly perform operations such as object recognition and object shopping link viewing on the image information on the second electronic device by using the first electronic device, to enrich capabilities of cross-device interconnection and function sharing, and help improve cross-device use experience of the user.

With reference to the first aspect, in some implementations of the first aspect, a login account on the first electronic device is associated with a login account on the second electronic device.

According to a second aspect, a method for invoking a capability of another device is provided. The method is applied to a first electronic device, the first electronic device has a first function, and the method includes: The first electronic device detects a first operation of a user. The first electronic device sends request information to a second electronic device in response to the first operation, where the request information is used to request first image information on the second electronic device. The first electronic device receives the first image information sent by the second electronic device. The first electronic device processes the first image information by using the first function.

In this embodiment of this application, the user may quickly process image information on the second electronic device by using the first electronic device, to enrich capabilities of interconnection and function sharing between the first electronic device and the second electronic device, and help improve cross-device use experience of the user.

With reference to the second aspect, in some implementations of the second aspect, the method further includes: The first electronic device sends a processing result of the first image information to the second electronic device.

In this embodiment of this application, after obtaining the processing result, the first electronic device may send the processing result to the processing result, and the second electronic device may display the processing result, so that the user can view the processing result on the second electronic device, to help improve cross-device use experience of the user.

With reference to the second aspect, in some implementations of the second aspect, the method further includes: The first electronic device displays the processing result of the first image information.

In this embodiment of this application, after obtaining the processing result, the first electronic device may display the processing result on the first electronic device, so that the user can conveniently view the processing result on the first electronic device, to help improve cross-device use experience of the user.

With reference to the second aspect, in some implementations of the second aspect, the first function includes a first sub-function and a second sub-function, and that the first electronic device processes the first image information by using the first function includes: When the first image information includes first content, the first electronic device processes the first content by using the first sub-function; or when the first image information includes second content, the first electronic device processes the second content by using the second sub-function.

In this embodiment of this application, the first electronic device may determine, based on content included in the first image information, a function to be used to process the content, and the user does not need to select the function. This improves intelligence of the electronic device and helps improve cross-device use experience of the user.

With reference to the second aspect, in some implementations of the second aspect, the first electronic device further has a second function, and before the first electronic device processes the first image information by using the first function, the method includes: In response to receiving the first image information, the first electronic device prompts the user to process the first image information by using the first function or the second function. That the first electronic device processes the first image information by using the first function includes: The first electronic device processes the first image information by using the first function in response to an operation of selecting the first function by the user.

In this embodiment of this application, after obtaining the first image information, the first electronic device may prompt the user to use a specific function to process the image information. This helps improve accuracy of processing the image information and helps improve cross-device use experience of the user.

With reference to the second aspect, in some implementations of the second aspect, before the first electronic device processes the first image information by using the first function, the method includes: The first electronic device displays the first image information in response to receiving the first image information, where the first image information includes a first part and a second part. That the first electronic device processes the first image information by using the first function includes: The first electronic device processes the first part by using the first function in response to a second operation performed by the user on the first part.

In this embodiment of this application, if the first image information includes the first part and the second part, the first electronic device may first display the first part and the second part, and when detecting the second operation performed by the user on the first part, the first electronic device may process the first part. This helps improve accuracy of processing the image information and helps improve cross-device use experience of the user.

With reference to the second aspect, in some implementations of the second aspect, that the first electronic device sends request information to the second electronic device in response to the first operation includes: In response to the first operation, the first electronic device prompts the user whether to process image information on the second electronic device. The first electronic device sends the request information to the second electronic device in response to an operation that the user determines to process the image information on the second electronic device.

With reference to the second aspect, in some implementations of the second aspect, the method further includes: The first electronic device detects a third operation of the user. In response to the third operation, the first electronic device processes image information displayed on the first electronic device.

In this embodiment of this application, when detecting the first operation of the user, the first electronic device may prompt the user to determine to process the image information on the first electronic device or the second electronic device. This helps improve accuracy of processing the image information and helps improve cross-device use experience of the user.

With reference to the second aspect, in some implementations of the second aspect, the request information includes information about a first moment, and the first moment is a moment at which the first electronic device detects the first operation.

In this embodiment of this application, the first electronic device may use the request information to carry the information about the first moment, so that the second electronic device searches for image information at (or near) the first moment, and sends the image information at (or near) the first moment to the first electronic device. This helps improve accuracy of processing the image information by the first electronic device and helps improve cross-device use experience of the user.

With reference to the second aspect, in some implementations of the second aspect, the first image information includes text information, and that the first electronic device processes the first image information by using the first function includes: The first electronic device translates the text content by using a translation function, to obtain a translation result; or the first electronic device performs a word extraction operation on the text content by using a word extraction function, to obtain a word extraction result.

In this embodiment of this application, the user may quickly perform operations such as translation, word extraction, and character string storage on the image information on the second electronic device by using the first electronic device, to enrich capabilities of cross-device interconnection and function sharing, and help improve cross-device use experience of the user.

With reference to the second aspect, in some implementations of the second aspect, the first image information includes an image of an object, and that the first electronic device processes the first image information by using the first function includes: The first electronic device recognizes the object by using an object recognition function, to obtain an object recognition result.

In this embodiment of this application, the user may quickly perform operations such as object recognition and object shopping link viewing on the image information on the second electronic device by using the first electronic device, to enrich capabilities of cross-device interconnection and function sharing, and help improve cross-device use experience of the user.

With reference to the second aspect, in some implementations of the second aspect, a login account on the first electronic device is associated with a login account on the second electronic device.

According to a third aspect, an apparatus is provided. The apparatus includes: a detection unit, configured to detect a first operation of a user; a sending unit, configured to send request information to a second electronic device in response to the first operation, where the request information is used to request first image information on the second electronic device; a receiving unit, configured to receive the first image information sent by the second electronic device; and a processing unit, configured to process the first image information by using a first function.

According to a fourth aspect, an electronic device is provided, and includes one or more processors, a memory, and one or more computer programs. The one or more computer programs are stored in the memory. The one or more computer programs include instructions. When the instructions are executed by the electronic device, the electronic device is enabled to perform the method according to any possible implementation of the second aspect.

According to a fifth aspect, a computer program product including instructions is provided. When the computer program product runs on a first electronic device, the electronic device is enabled to perform the method according to the second aspect.

According to a sixth aspect, a computer-readable storage medium is provided, and includes instructions. When the instructions are run on a first electronic device, the electronic device is enabled to perform the method according to the second aspect.

According to a seventh aspect, a chip is provided to execute instructions. When the chip runs, the chip performs the method according to the second aspect.

BRIEF DESCRIPTION OF DRAWINGS

FIG. 3(a)-1 and FIG. 3(a)-2 to FIG. 3(e)-1 and FIG. 3(e)-2 show a group of graphical user interfaces according to an embodiment of this application.

FIG. 4(a) to FIG. 4(d)-1 and FIG. 4(d)-2 show another group of graphical user interfaces according to an embodiment of this application;

FIG. 5(a)-1 and FIG. 5(a)-2 to FIG. 5(c) show another group of graphical user interfaces according to an embodiment of this application;

FIG. 6(a)-1 and FIG. 6(a)-2 to FIG. 6(f) show another group of graphical user interfaces according to an embodiment of this application;

FIG. 8(a)-1 and FIG. 8(a)-2 to FIG. 8(e) show another group of graphical user interfaces according to an embodiment of this application;

FIG. 9(a)-1 and FIG. 9(a)-2 to FIG. 9(e) show another group of graphical user interfaces according to an embodiment of this application;

FIG. 10(a)-1 and FIG. 10(a)-2 to FIG. 10(c)-1 and FIG. 10(c)-2 show another group of graphical user interfaces according to an embodiment of this application;

DESCRIPTION OF EMBODIMENTS

The following describes the technical solutions in embodiments of this application with reference to the accompanying drawings in embodiments of this application. In descriptions of embodiments of this application, "/" means "or" unless otherwise specified. For example, A/B may represent A or B. In this specification, "and/or" describes only an association relationship for describing associated objects and represents that three relationships may exist. For example, A and/or B may represent the following three cases: Only A exists, both A and B exist, and only B exists. In addition, in the descriptions of embodiments of this application, "a plurality of" means two or more.

The terms "first" and "second" mentioned below are merely intended for the purpose of description, and shall not be understood as an indication or implication of relative importance or implicit indication of the quantity of indicated technical features. Therefore, a feature limited by "first" or "second" may explicitly or implicitly include one or more features. In the descriptions of embodiments, unless otherwise specified, "a plurality of" means two or more.

A method provided in embodiments of this application may be applied to an electronic device, for example, a mobile phone, a tablet computer, a wearable device, a vehicle-mounted device, an augmented reality (AR) device/a virtual reality (VR) device, a notebook computer, an ultra-mobile personal computer (UMPC), a netbook, or a personal digital assistant (PDA). A specific type of the electronic device is not limited in embodiments of this application.

Figure 1:
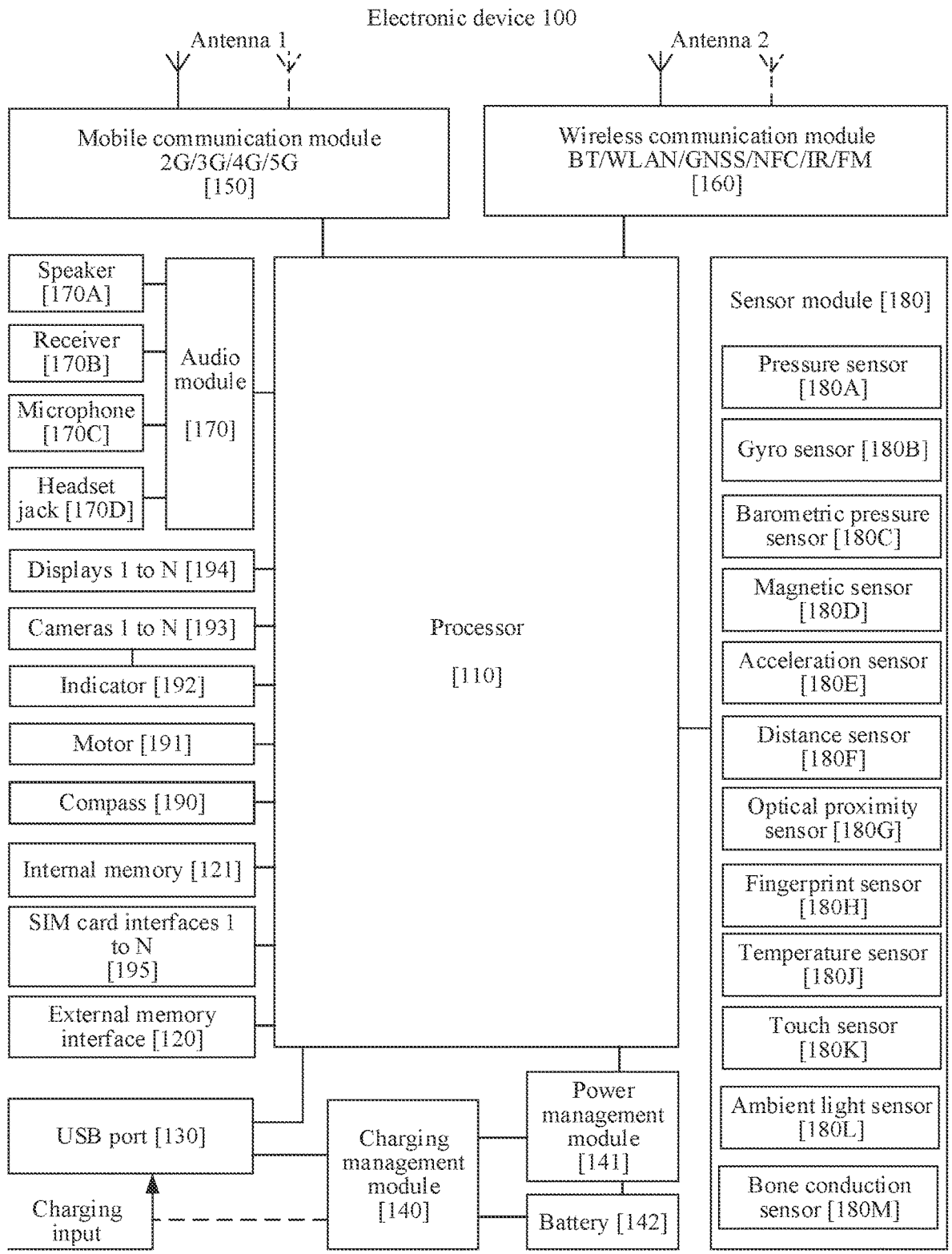
FIG. 1 is a schematic diagram of a hardware structure of an electronic device according to an embodiment of this application.

For example, FIG. 1 is a schematic diagram of a structure of an electronic device 100. The electronic device 100 may include a processor 110, an external memory interface 120, an internal memory 121, a universal serial bus (USB) port 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, and a subscriber identity module (SIM) card interface 195. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of this application does not constitute a specific limitation on the electronic device 100. In some other embodiments of this application, the electronic device 100 may include more or fewer components than those shown in the figure, or combine some components, or split some components, or have different component arrangements. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, and/or a neural-network processing unit (NPU). Different processing units may be independent components, or may be integrated into one or more processors.

The controller may be a nerve center and a command center of the electronic device 100. The controller may generate an operation control signal based on an instruction operation code and a time sequence signal, to complete control of instruction reading and instruction execution.

A memory may be further disposed in the processor 110, and is configured to store instructions and data. In some embodiments, the memory in the processor 110 is a cache memory. The memory may store instructions or data that has been used or cyclically used by the processor 110. If the processor 110 needs to use the instructions or the data again, the processor may directly invoke the instructions or the data from the memory. This avoids repeated access, reduces waiting time of the processor 110, and improves system efficiency.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface MIPI), a general-purpose input/output (GPIO) interface, a subscriber identity module (SIM) interface, a universal serial bus (USB) port, and/or the like.

The I2C interface is a two-way synchronization serial bus, and includes one serial data line (SDA) and one serial clock line (SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the electronic device 100.

The I2S interface may be used for audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communication module 160 through the I2S interface, to implement a function of answering a call through a Bluetooth headset.

The PCM interface may also be used for audio communication, and sample, quantize, and code an analog signal. In some embodiments, the audio module 170 may be coupled to the wireless communication module 160 through a PCM bus interface. In some embodiments, the audio module 170 may also transmit an audio signal to the wireless communication module 160 through the PCM interface, to implement a function of answering a call through a Bluetooth headset. Both the I2S interface and the PCM interface may be used for audio communication.

The UART interface is a universal serial data bus, and is used for asynchronous communication. The bus may be a two-way communication bus, and converts to-be-transmitted data between serial communication and parallel communication. In some embodiments, the UART interface is usually configured to connect the processor 110 to the wireless communication module 160. For example, the processor 110 communicates with a Bluetooth module in the wireless communication module 160 through the UART interface, to implement a Bluetooth function. In some embodiments, the audio module 170 may transmit an audio signal to the wireless communication module 160 through the UART interface, to implement a function of playing music through a Bluetooth headset.

The MIPI may be configured to connect the processor 110 to a peripheral component such as the display 194 or the camera 193. The MIPI includes a camera serial interface (CSI), a display serial interface (DSI), and the like. In some embodiments, the processor 110 communicates with the camera 193 through the CSI, to implement a photographing function of the electronic device 100. The processor 110 communicates with the display 194 through the DSI, to implement a display function of the electronic device 100.

The GPIO interface may be configured by software. The GPIO interface may be configured as a control signal or a data signal. In some embodiments, the GPIO interface may be configured to connect the processor 110 to the camera 193, the display 194, the wireless communication module 160, the audio module 170, the sensor module 180, or the like. The GPIO interface may alternatively be configured as an I2C interface, an I2S interface, a UART interface, an MIPI, or the like.

The USB port 130 is a port that conforms to a USB standard specification, and may be specifically a mini USB port, a micro USB port, a USB Type-C port, or the like. The USB port 130 may be configured to connect to a charger to charge the electronic device 100, or may be configured to transmit data between the electronic device 100 and a peripheral device, or may be configured to connect to a headset for playing audio through the headset. The port may be further configured to connect to another electronic device such as an AR device.

It may be understood that an interface connection relationship between the modules illustrated in this embodiment of this application is merely an example for description, and constitutes no limitation on the structure of the electronic device 100. In some other embodiments of this application, the electronic device 100 may alternatively use an interface connection manner different from that in the foregoing embodiment, or use a combination of a plurality of interface connection manners.

The charging management module 140 is configured to receive a charging input from a charger. The charger may be a wireless charger or a wired charger. In some embodiments of wired charging, the charging management module 140 may receive a charging input of a wired charger through the USB port 130. In some embodiments of wireless charging, the charging management module 140 may receive a wireless charging input through a wireless charging coil of the electronic device 100. The charging management module 140 supplies power to the electronic device through the power management module 141 while charging the battery 142.

The power management module 141 is configured to connect to the battery 142, the charging management module 140, and the processor 110. The power management module 141 receives an input of the battery 142 and/or the charging management module 140, to supply power to the processor 110, the internal memory 121, an external memory, the display 194, the camera 193, the wireless communication module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented through the antenna 1, the antenna 2, the mobile communication module 150, the wireless communication module 160, the modem processor, the baseband processor, and the like.

The antenna 1 and the antenna 2 are configured to: transmit and receive an electromagnetic wave signal. Each antenna in the electronic device 100 may be configured to cover one or more communication frequency bands. Different antennas may be further multiplexed, to improve antenna utilization. For example, the antenna 1 may be multiplexed as a diversity antenna in a wireless local area network. In some other embodiments, the antenna may be used in combination with a tuning switch.

The mobile communication module 150 may provide a wireless communication solution that is applied to the electronic device 100 and that includes 2G/3G/4G/5G or the like. The mobile communication module 150 may include at least one filter, a switch, a power amplifier, a low noise amplifier (LNA), and the like. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 1. In some embodiments, at least some functional modules in the mobile communication module 150 may be disposed in the processor 110. In some embodiments, at least some functional modules in the mobile communication module 150 may be disposed in a same device as at least some modules of the processor 110.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal through an audio device (which is not limited to the speaker 170A, the receiver 170B, or the like), or displays an image or a video through the display 194. In some embodiments, the modem processor may be an independent component. In some other embodiments, the modem processor may be independent of the processor 110, and is disposed in a same device as the mobile communication module 150 or another functional module.

The wireless communication module 160 may provide a wireless communication solution that is applied to the electronic device 100 and that includes a wireless local area network (WLAN) (for example, a wireless fidelity (Wi-Fi) network), Bluetooth (BT), a global navigation satellite system (GNSS), frequency modulation (FM), a near field communication (NFC) technology, an infrared (IR) technology, or the like. The wireless communication module 160 may be one or more components integrating at least one communication processing module. The wireless communication module 160 receives an electromagnetic wave through the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

In some embodiments, the antenna 1 and the mobile communication module 150 in the electronic device 100 are coupled, and the antenna 2 and the wireless communication module 160 in the electronic device 100 are coupled, so that the electronic device 100 can communicate with a network and another device by using a wireless communication technology. The wireless communication technology may include a global system for mobile communications (GSM), a general packet radio service (GPRS), code division multiple access (CDMA), wideband code division multiple access (WCDMA), time-division code division multiple access (TD-CDMA), long term evolution (LTE), BT, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or a satellite based augmentation system (SBAS).

The electronic device 100 may implement a display function through the GPU, the display 194, the application processor, and the like. The GPU is a microprocessor for image processing, and is connected to the display 194 and the application processor. The GPU is configured to: perform mathematical and geometric computation, and render an image. The processor 110 may include one or more GPUs, which execute program instructions to generate or change display information.

The display 194 is configured to display an image, a video, and the like. The display 194 includes a display panel. The display panel may be a liquid crystal display (LCD), an organic light-emitting diode (OLED), an active-matrix organic light emitting diode (AMOLED), a flexible light-emitting diode (FLED), a mini-LED, a micro-LED, a micro-OLED, a quantum dot light emitting diode (QLED), or the like. In some embodiments, the electronic device 100 may include one or N displays 194, where N is a positive integer greater than 1.

The electronic device 100 may implement a photographing function through the ISP, the camera 193, the video codec, the GPU, the display 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (CCD) or a complementary metal-oxide-semiconductor (CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the electronic device 100 may include one or N cameras 193, where N is a positive integer greater than 1.

The digital signal processor is configured to process a digital signal, and may process another digital signal in addition to the digital image signal. For example, when the electronic device 100 selects a frequency, the digital signal processor is configured to perform Fourier transform on frequency energy.

The video codec is configured to: compress or decompress a digital video. The electronic device 100 may support one or more video codecs. In this way, the electronic device 100 may play or record videos in a plurality of coding formats, for example, moving picture experts group (MPEG)-1, MPEG-2, MPEG-3, and MPEG-4.

The NPU is a neural-network (NN) computing processor, quickly processes input information by referring to a structure of a biological neural network, for example, by referring to a mode of transmission between human brain neurons, and may further continuously perform self-learning. Applications such as intelligent cognition of the electronic device 100 may be implemented through the NPU, for example, image recognition, facial recognition, speech recognition, and text understanding.

The external memory interface 120 may be used to connect to an external storage card, for example, a micro SD card, to extend a storage capability of the electronic device 100. The external storage card communicates with the processor 110 through the external memory interface 120, to implement a data storage function. For example, files such as music and videos are stored in the external storage card.

The internal memory 121 may be configured to store computer-executable program code. The executable program code includes instructions. The processor 110 runs the instructions stored in the internal memory 121, to perform various function applications of the electronic device 100 and data processing. The internal memory 121 may include a program storage area and a data storage area. The program storage area may store an operating system, an application required by at least one function (for example, a voice playing function or an image playing function), and the like. The data storage area may store data (such as audio data and an address book) created during use of the electronic device 100, and the like. In addition, the internal memory 121 may include a high-speed random access memory, or may include a nonvolatile memory, for example, at least one magnetic disk storage device, a flash memory, or a universal flash storage (UFS).

The electronic device 100 may implement an audio function, for example, music playing and recording, through the audio module 170, the speaker 170A, the receiver 170B, the microphone 170C, the headset jack 170D, the application processor, and the like.

The audio module 170 is configured to convert digital audio information into an analog audio signal for output, and is also configured to convert analog audio input into a digital audio signal. The audio module 170 may be further configured to: code and decode an audio signal. In some embodiments, the audio module 170 may be disposed in the processor 110, or some functional modules in the audio module 170 are disposed in the processor 110.

The speaker 170A, also referred to as a "horn", is configured to convert an audio electrical signal into a sound signal. The electronic device 100 may be used to listen to music or answer a call in a hands-free mode over the speaker 170A.

The receiver 170B, also referred to as an "earpiece", is configured to convert an electrical audio signal into a sound signal. When a call is answered or speech information is received through the electronic device 100, the receiver 170B may be put close to a human ear to listen to a voice.

The microphone 170C, also referred to as a "mike" or a "mic", is configured to convert a sound signal into an electrical signal. When making a call or sending a voice message, a user may make a sound near the microphone 170C through the mouth of the user, to input a sound signal to the microphone 170C. At least one microphone 170C may be disposed in the electronic device 100. In some other embodiments, two microphones 170C may be disposed in the electronic device 100, to collect a sound signal and implement a noise reduction function. In some other embodiments, three, four, or more microphones 170C may alternatively be disposed in the electronic device 100, to collect a sound signal, implement noise reduction, and identify a sound source, so as to implement a directional recording function and the like.

The headset jack 170D is configured to connect to a wired headset. The headset jack 170D may be a USB port 130, or may be a 3.5 mm open mobile terminal platform (OMTP) standard interface or cellular telecommunications industry association of the USA (CTIA) standard interface.

The pressure sensor 180A is configured to sense a pressure signal, and can convert the pressure signal into an electrical signal. In some embodiments, the pressure sensor 180A may be disposed on the display 194. There are a plurality of types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device 100 determines pressure intensity based on the change in the capacitance. When a touch operation is performed on the display 194, the electronic device 100 detects intensity of the touch operation through the pressure sensor 180A. The electronic device 100 may also calculate a touch location based on a detection signal of the pressure sensor 180A. In some embodiments, touch operations that are performed at a same touch location but have different touch operation intensity may correspond to different operation instructions. For example, when a touch operation whose touch operation intensity is less than a first pressure threshold is performed on a Messages application icon, an instruction for viewing an SMS message is performed. When a touch operation whose touch operation intensity is greater than or equal to the first pressure threshold is performed on the Messages application icon, an instruction for creating a new SMS message is performed.

The gyro sensor 180B may be configured to determine a moving posture of the electronic device 100. In some embodiments, an angular velocity of the electronic device 100 around three axes (namely, axes x, y, and z) may be determined through the gyro sensor 180B. The gyro sensor 180B may be configured to implement image stabilization during photographing. For example, when the shutter is pressed, the gyro sensor 180B detects an angle at which the electronic device 100 jitters, calculates, based on the angle, a distance for which a lens module needs to compensate, and allows the lens to cancel the jitter of the electronic device 100 through reverse motion, to implement image stabilization. The gyro sensor 180B may also be used in a navigation scenario and a somatic game scenario.

The barometric pressure sensor 180C is configured to measure barometric pressure. In some embodiments, the electronic device 100 calculates an altitude through the barometric pressure measured by the barometric pressure sensor 180C, to assist in positioning and navigation.

The magnetic sensor 180D includes a Hall sensor. The electronic device 100 may detect opening and closing of a flip cover by using the magnetic sensor 180D. In some embodiments, when the electronic device 100 is a clamshell phone, the electronic device 100 may detect opening and closing of a flip cover based on the magnetic sensor 180D. Further, a feature such as automatic unlocking of the flip cover is set based on a detected opening or closing state of the flip cover.

The acceleration sensor 180E may detect accelerations of the electronic device 100 in various directions (usually on three axes). When the electronic device 100 is still, a magnitude and a direction of gravity may be detected. The acceleration sensor 180E may be further configured to identify a posture of the electronic device, and is used in an application such as switching between a landscape mode and a portrait mode or a pedometer.

The distance sensor 180F is configured to measure a distance. The electronic device 100 may measure the distance in an infrared manner or a laser manner. In some embodiments, in a photographing scenario, the electronic device 100 may measure a distance through the distance sensor 180F to implement quick focusing.

The optical proximity sensor 180G may include, for example, a light-emitting diode (LED) and an optical detector, for example, a photodiode. The light-emitting diode may be an infrared light-emitting diode. The electronic device 100 emits infrared light by using the light-emitting diode. The electronic device 100 detects infrared reflected light from a nearby object through the photodiode. When sufficient reflected light is detected, the electronic device 100 may determine that there is an object near the electronic device 100. When insufficient reflected light is detected, the electronic device 100 may determine that there is no object near the electronic device 100. The electronic device 100 may detect, by using the optical proximity sensor 180G, that the user holds the electronic device 100 close to an ear for a call, to automatically turn off a screen for power saving. The optical proximity sensor 180G may also be used in a smart cover mode or a pocket mode to automatically perform screen unlocking or locking.

The ambient light sensor 180L is configured to sense ambient light brightness. The electronic device 100 may adaptively adjust brightness of the display 194 based on the sensed ambient light brightness. The ambient light sensor 180L may also be configured to automatically adjust white balance during photographing. The ambient light sensor 180L may also cooperate with the optical proximity sensor 180G to detect whether the electronic device 100 is in a pocket, to avoid an accidental touch.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device 100 executes a temperature processing policy through the temperature detected by the temperature sensor 180J. For example, when the temperature reported by the temperature sensor 180J exceeds a threshold, the electronic device 100 lowers performance of a processor near the temperature sensor 180J, to reduce power consumption for thermal protection. In some other embodiments, when the temperature is less than another threshold, the electronic device 100 heats the battery 142 to prevent the electronic device 100 from being shut down abnormally due to a low temperature. In some other embodiments, when the temperature is less than still another threshold, the electronic device 100 boosts an output voltage of the battery 142 to avoid abnormal shutdown caused by a low temperature.

The touch sensor 180K is also referred to as a "touch panel". The touch sensor 180K may be disposed on the display 194, and the touch sensor 180K and the display 194 constitute a touchscreen. The touch sensor 180K is configured to detect a touch operation performed on or near the touch sensor. The touch sensor may transfer the detected touch operation to the application processor to determine a type of the touch event. A visual output related to the touch operation may be provided through the display 194. In some other embodiments, the touch sensor 180K may also be disposed on a surface of the electronic device 100 at a location different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a body pulse to receive a blood pressure beating signal. In some embodiments, the bone conduction sensor 180M may also be disposed in the headset, to obtain a bone conduction headset. The audio module 170 may obtain a speech signal through parsing based on the vibration signal that is of the vibration bone of the vocal-cord part and that is obtained by the bone conduction sensor 180M, to implement a speech function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The electronic device 100 may receive a key input, and generate a key signal input related to a user setting and function control of the electronic device 100.

The motor 191 may generate a vibration prompt. The motor 191 may be configured to provide an incoming call vibration prompt and a touch vibration feedback. For example, touch operations performed on different applications (for example, photographing and audio playback) may correspond to different vibration feedback effects. The motor 191 may also correspond to different vibration feedback effects for touch operations performed on different areas of the display 194. Different application scenarios (for example, a time reminder, information receiving, an alarm clock, and a game) may also correspond to different vibration feedback effects A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the electronic device 100. The electronic device 100 may support one or N SIM card interfaces, where N is a positive integer greater than 1. The SIM card interface 195 may support a nano-SIM card, a micro-SIM card, a SIM card, and the like. A plurality of cards may be simultaneously inserted into a same SIM card interface 195. The plurality of cards may be of a same type or different types. The SIM card interface 195 is compatible with different types of SIM cards. The SIM card interface 195 is also compatible with an external storage card. The electronic device 100 interacts with a network through the SIM card, to implement functions such as conversation and data communication. In some embodiments, the electronic device 100 uses an embedded SIM (eSIM) card. The eSIM card may be embedded into the electronic device 100, and cannot be separated from the electronic device 100.

It should be understood that a calling card in embodiments of this application includes but is not limited to a SIM card, an eSIM card, a universal subscriber identity module (USIM), a universal integrated circuit card (UICC), and the like.

A software system of the electronic device 100 may use a layered architecture, an event-driven architecture, a microkernel architecture, a micro service architecture, or a cloud architecture. In an embodiment of this application, an Android system with a layered architecture is used as an example to describe a software structure of the electronic device 100.

Figure 2:
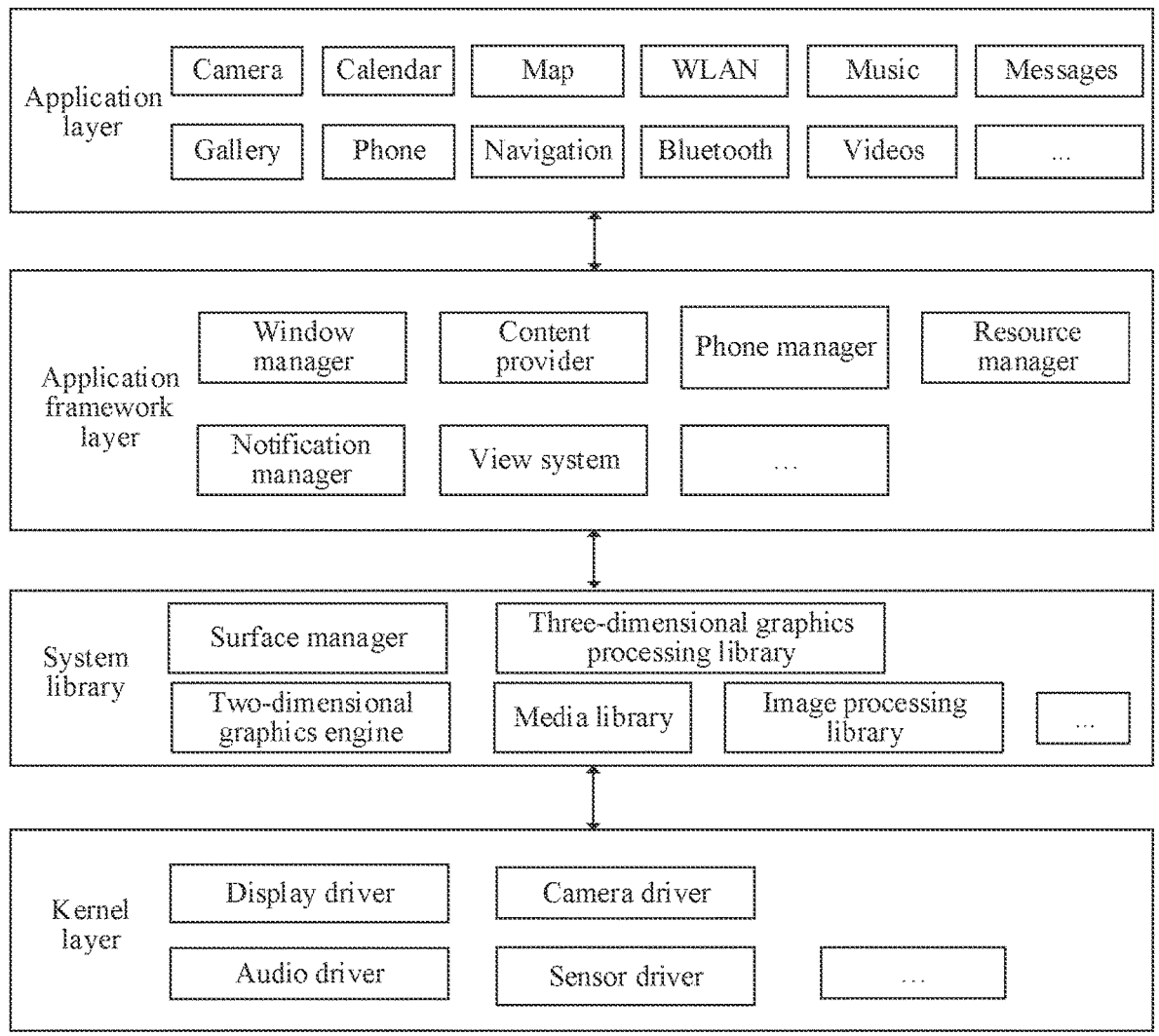
FIG. 2 is a block diagram of a software structure according to an embodiment of this application.

FIG. 2 is a block diagram of a software structure of the electronic device 100 according to an embodiment of this application. In a layered architecture, software is divided into several layers, and each layer has a clear role and task. The layers communicate with each other through a software interface. In some embodiments, the Android system is divided into four layers: an application layer, an application framework layer, an Android runtime and system library, and a kernel layer from top to bottom. The application layer may include a series of application packages.

As shown in FIG. 2, the application packages may include applications such as Camera, Gallery, Calendar, Phone, Map, Navigation, WLAN, Bluetooth, Music, Videos, and Messages.

The application framework layer provides an application programming interface (API) and a programming framework for an application at the application layer. The application framework layer includes some predefined functions.

As shown in FIG. 2, the application framework layer may include a window manager, a content provider, a view system, a phone manager, a resource manager, a notification manager, and the like.

The window manager is configured to manage a window program. The window manager may obtain a size of the display, determine whether there is a status bar, perform screen locking, take a screenshot, and the like.

The content provider is configured to: store and obtain data, and enable the data to be accessed by an application. The data may include a video, an image, an audio, calls that are made and answered, a browsing history and bookmarks, an address book, and the like.

The view system includes visual controls such as a control for displaying a text and a control for displaying an image. The view system may be configured to construct an application. A display interface may include one or more views. For example, a display interface including an SMS message notification icon may include a text display view and an image display view.

The phone manager is configured to provide a communication function for the electronic device 100, for example, management of a call status (including answering, declining, or the like).

The resource manager provides various resources such as a localized character string, an icon, an image, a layout file, and a video file for an application.

The notification manager enables an application to display notification information in a status bar, and may be configured to convey a notification message. The notification manager may automatically disappear after a short pause without requiring user interaction. For example, the notification manager is configured to: notify download completion, give a message notification, and the like. The notification manager may alternatively be a notification that appears in a top status bar of the system in a form of a graph or a scroll bar text, for example, a notification of an application that is run on the background, or may be a notification that appears on the screen in a form of a dialog window. For example, text information is displayed in the status bar, an announcement is given, the electronic device vibrates, or the indicator light blinks.

The Android runtime includes a kernel library and a virtual machine. The Android runtime is responsible for scheduling and management of the Android system.

The kernel library includes two parts: a function that needs to be invoked in Java language and a kernel library of Android.

The application layer and the application framework layer run on the virtual machine. The virtual machine executes Java files of the application layer and the application framework layer as binary files. The virtual machine is configured to implement functions such as object lifecycle management, stack management, thread management, security and exception management, and garbage collection.

The system library may include a plurality of functional modules, for example, a surface manager, a media library, a three-dimensional graphics processing library (for example, OpenGL ES), and a 2D graphics engine (for example, SGL).

The surface manager is configured to: manage a display subsystem and provide fusion of 2D and 3D layers for a plurality of applications.

The media library supports playback and recording in a plurality of commonly used audio and video formats, and static image files. The media library may support a plurality of audio and video coding formats, for example, MPEG-4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

It should be understood that the technical solutions in embodiments of this application may be applied to systems such as Android, IOS, and Harmony.

FIG. 3(a)-1 and FIG. 3(a)-2 to FIG. 3(e)-1 and FIG. 3(e)-2 show a group of graphical user interfaces (graphical user interface, GUI) according to an embodiment of this application.

Figures 1, 3A:
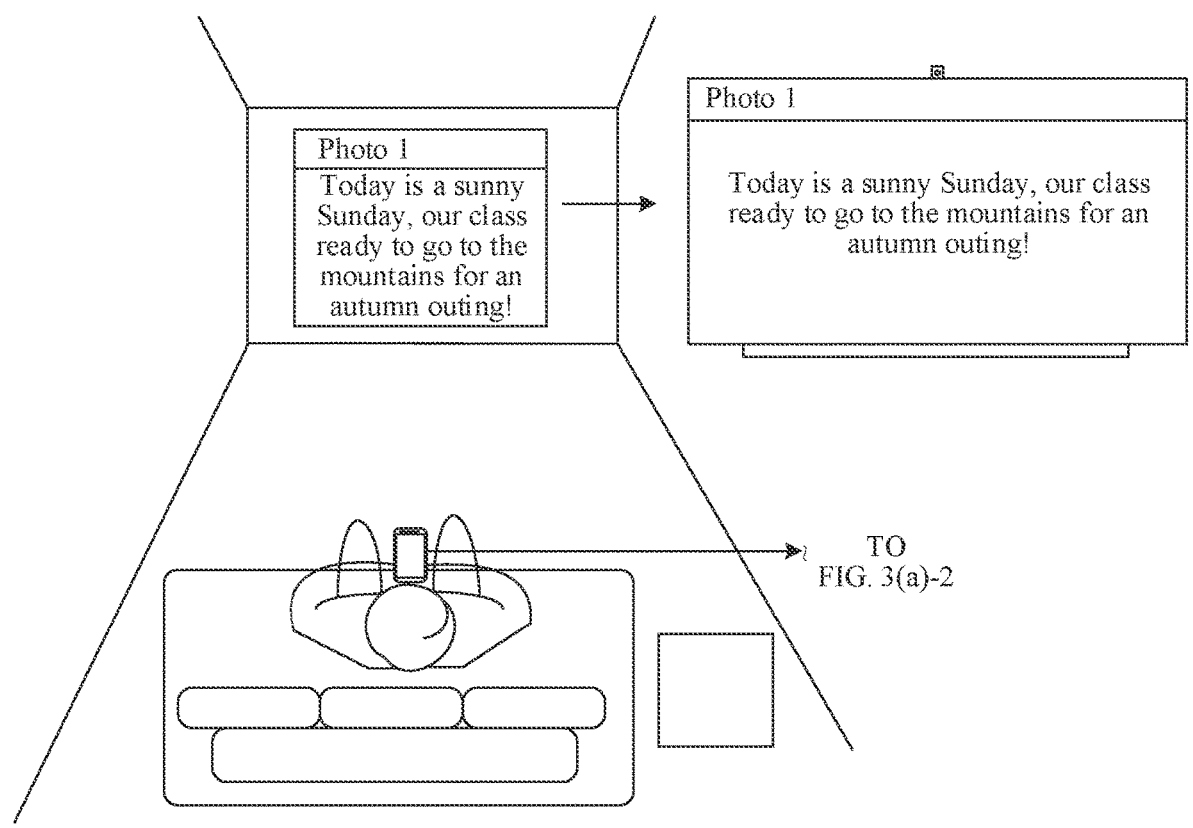
Figures 2, 3A:
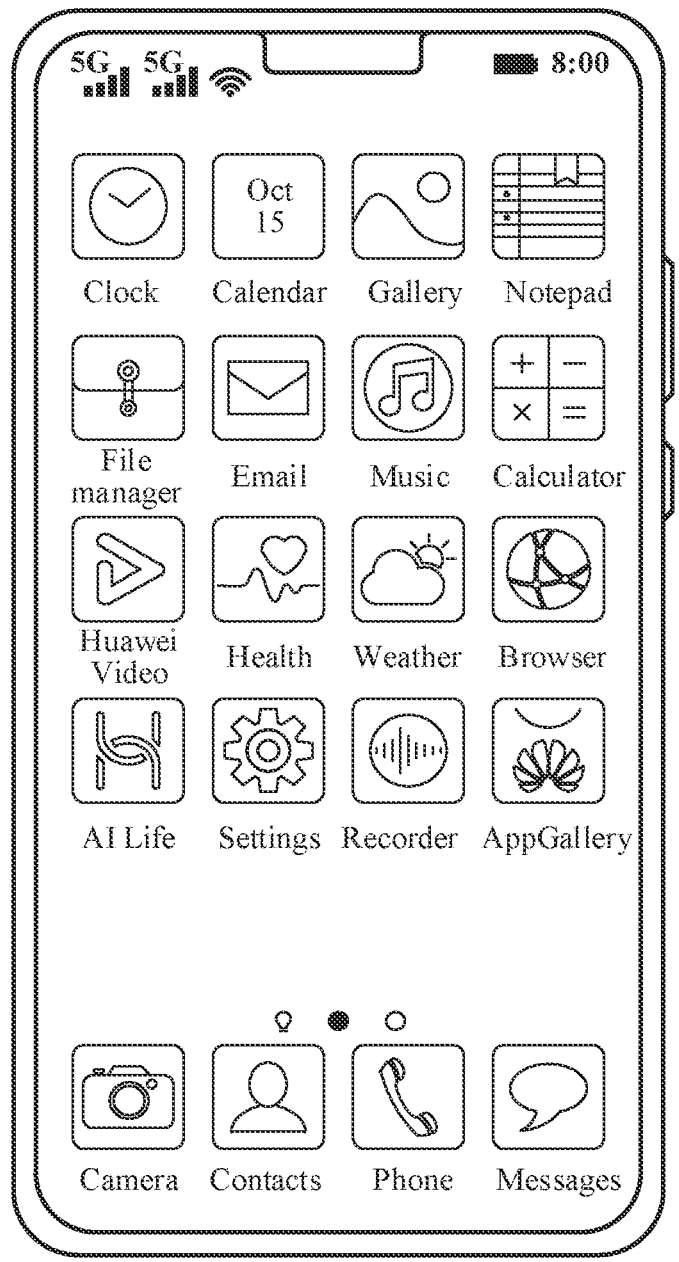

Refer to a GUI shown in FIG. 3(a)-1 and FIG. 3(a)-2. A smart television displays a photo 1, where the photo 1 includes an English paragraph "Today is a sunny . . . outing!". In this case, a home screen of a mobile phone is displayed on the mobile phone.

Figure 3B:
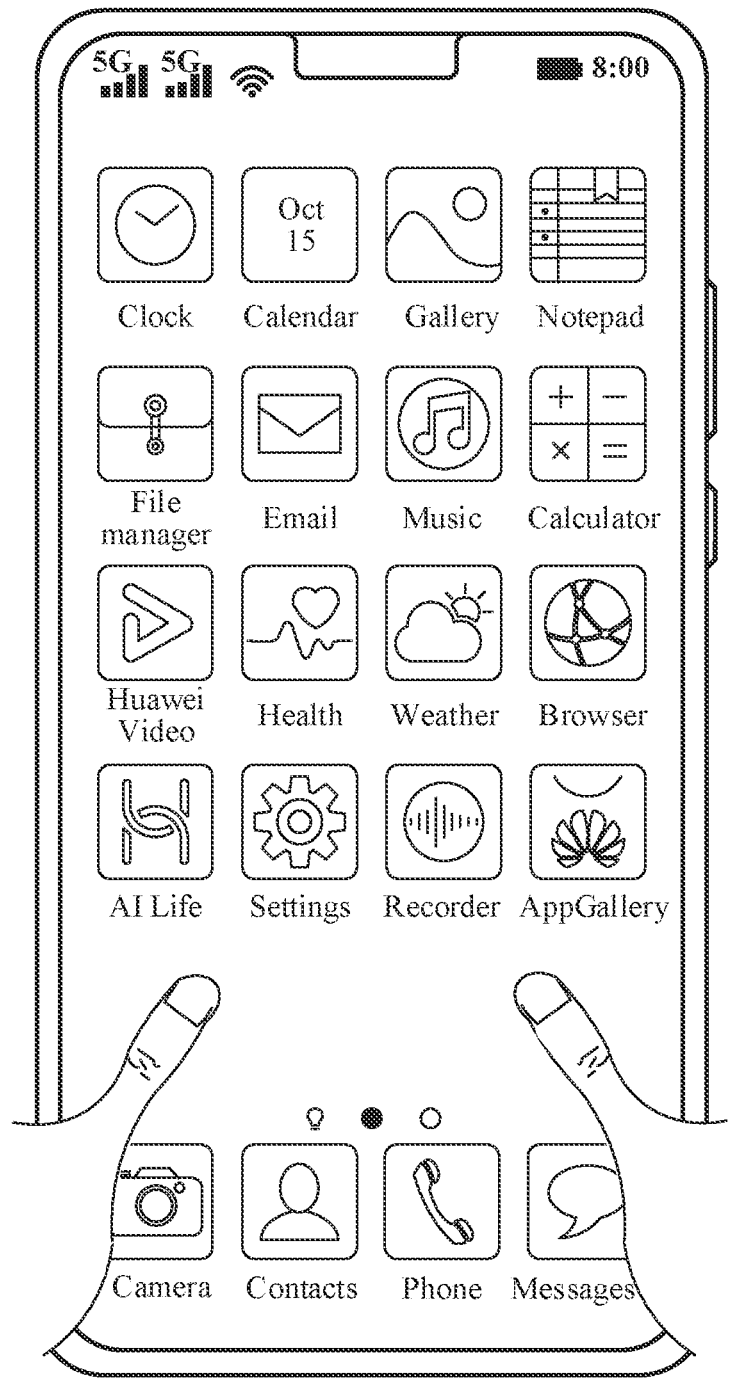

Refer to a GUI shown in FIG. 3(b). After the mobile phone detects an operation of pressing a screen with two fingers by a user, the mobile phone may send an instruction to the smart television, where the instruction instructs the smart television to capture image information currently displayed on the smart television. In response to receiving the instruction sent by the mobile phone, the smart television sends, to the mobile phone, the image information currently displayed through the display. In response to receiving the image information sent by the smart television, the mobile phone may recognize a text in the photo 1 through optical character recognition (OCR), to obtain character string information "Today is a sunny . . . outing!".

Figure 3C:
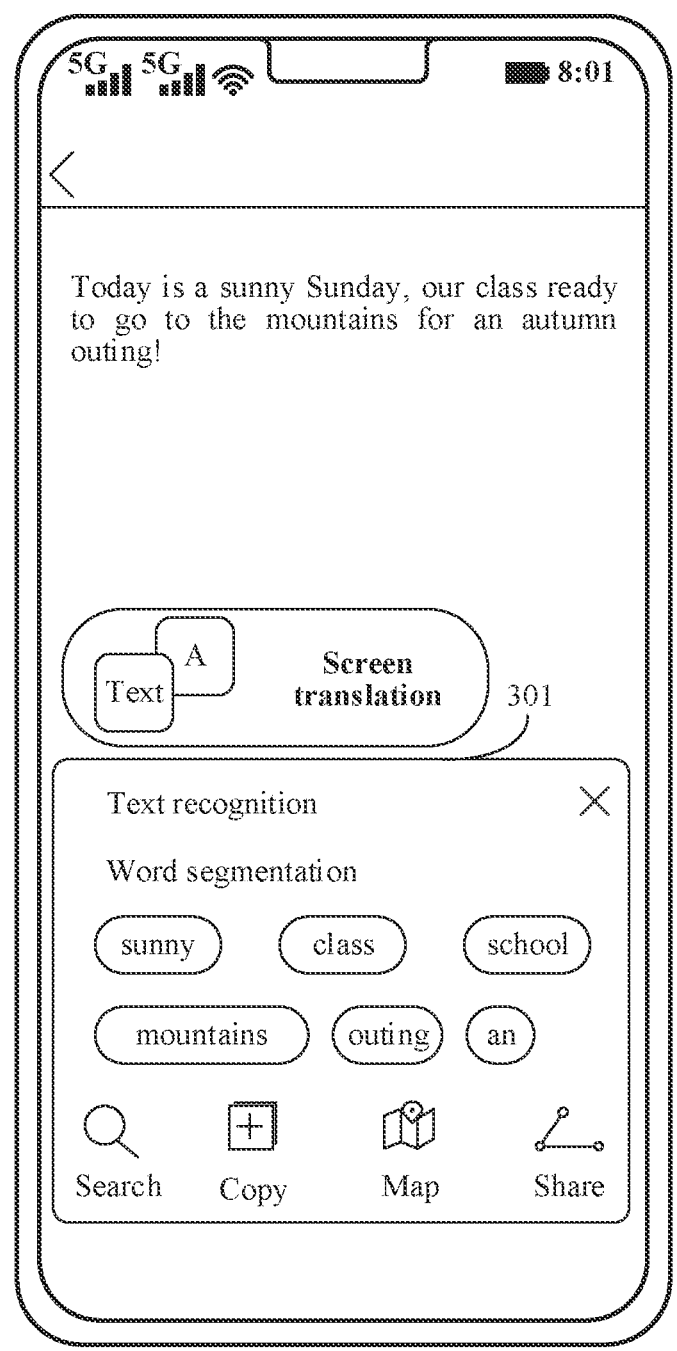

Refer to a GUI shown in FIG. 3(c). The GUI is a character string information display interface. After identifying the character string information, the mobile phone may display the character string information and display a prompt box 301 through the display. The prompt box 301 includes a result of performing word segmentation on the character string information by the mobile phone and a screen translation control. The mobile phone may automatically translate the character string information after displaying the character string information display interface for preset duration (for example, 3 seconds).

In an embodiment, if the mobile phone determines, after recognizing the photo 1, that the photo 1 includes only text content, the mobile phone may automatically translate the character string information obtained through recognition.

For example, if a default language of the mobile phone is Chinese, and the mobile phone determines that a language corresponding to the character string information is non-Chinese content (for example, English), the mobile phone may automatically translate the character string content into Chinese.

In an embodiment, the mobile phone may further display prompt information to the user after obtaining character string information, where the prompt information prompts the user with a language (for example, Chinese, Japanese, Korean, or Spanish) into which the character string content is to be translated.

Figure 3D:
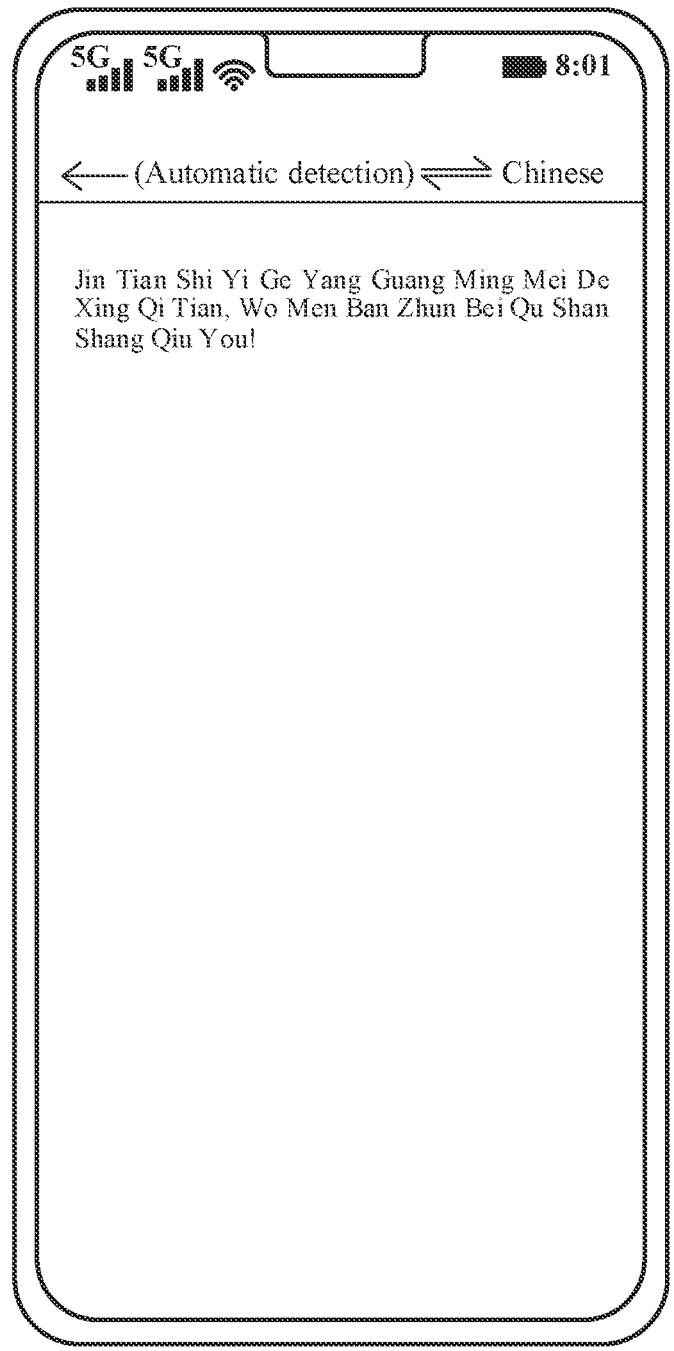

Refer to a GUI shown in FIG. 3(d). The GUI is a translation display interface. After completing translation of the character string information, the mobile phone may display corresponding translation content "Jin Tian Shi Yi Ge Yang Guang Ming Mei De Xing Qi Tian . . . Qiu You!" through the display.

In an embodiment, while displaying the translation display interface, the mobile phone may further send translation content to the smart television.

In an embodiment, after the mobile phone detects an operation of pressing a screen with two fingers of the user, the mobile phone may also directly display the GUI shown in FIG. 3(d).

Figures 1, 3E:
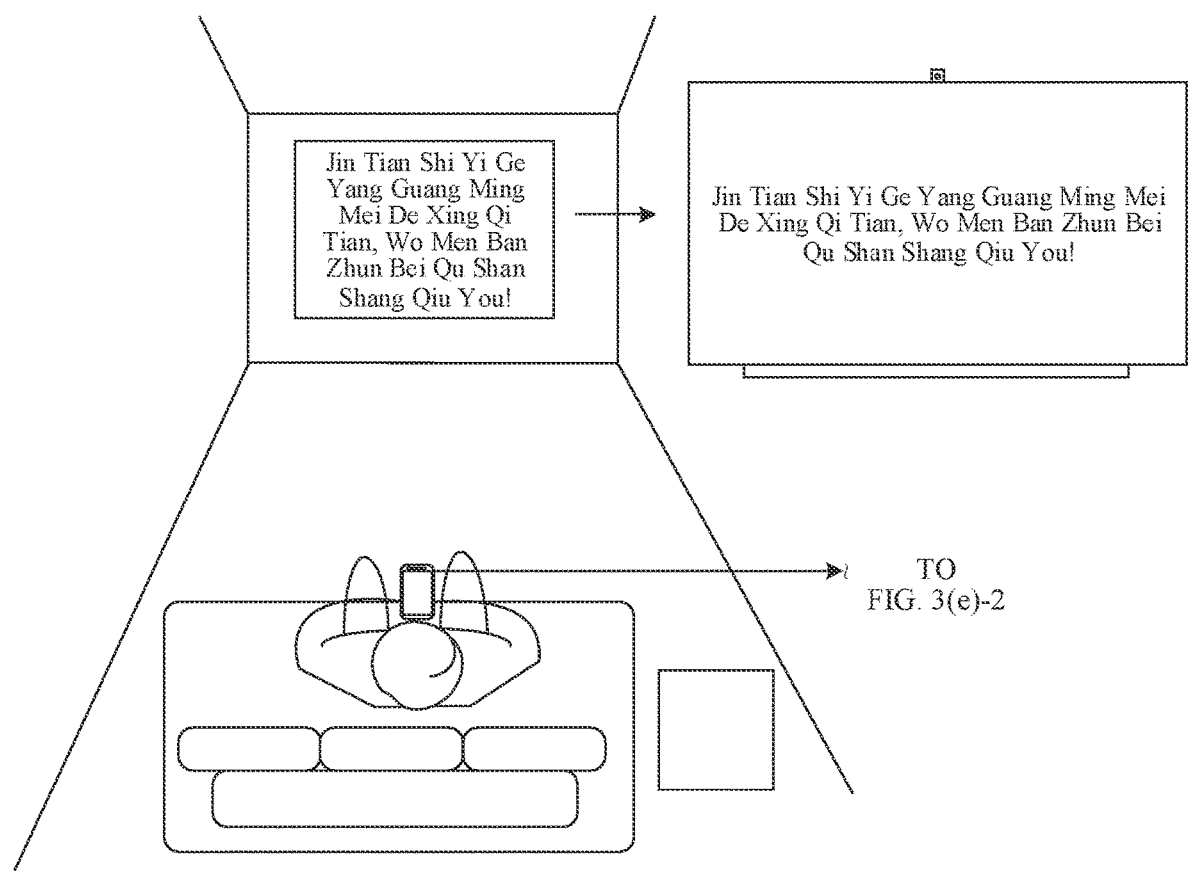
Figures 1, 2, 3E:
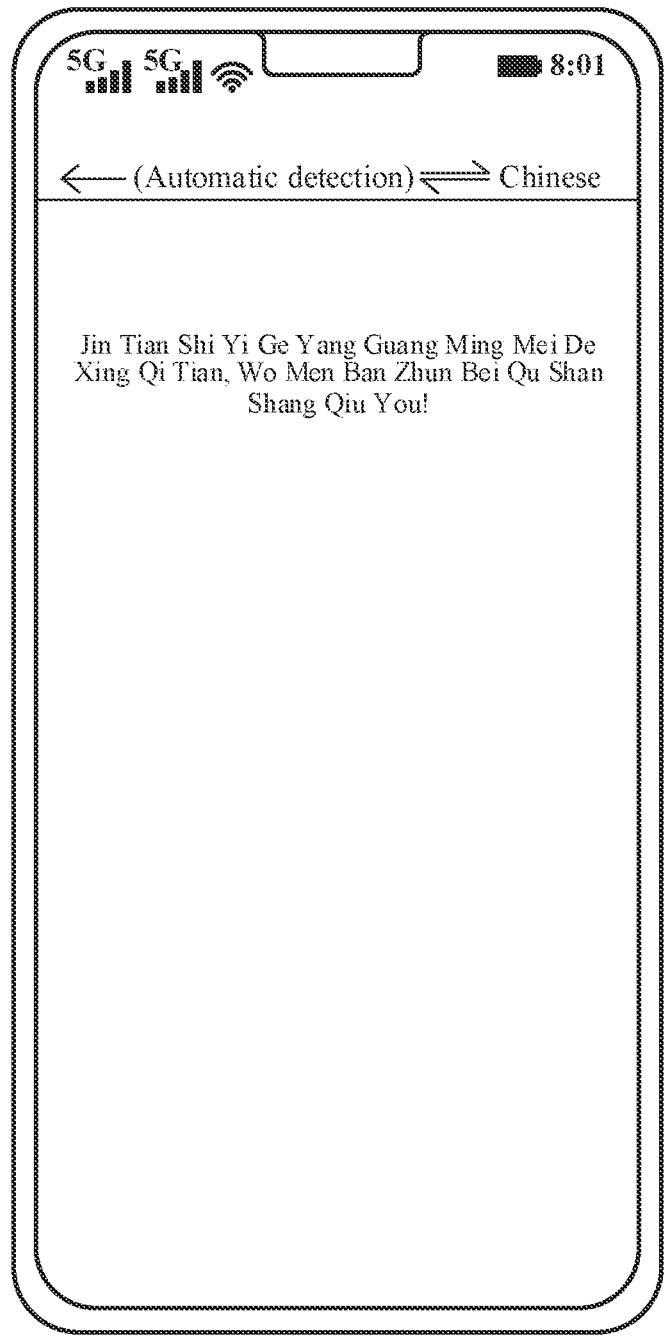

Refer to a GUI shown in FIG. 3(e)-1 and FIG. 3(e)-2. In response to receiving the translation content sent by the mobile phone, the smart television may display the translation content.

In this embodiment of this application, the user may use a function of another device (for example, the mobile phone) on one device (for example, the smart television), to extend a capability boundary of the device. In addition, the device can conveniently and efficiently complete some difficult tasks. The user does not need to input the text in the photo displayed on the smart television into translation software or upload the text to a translation website, and triggers, through a preset operation, the mobile phone to obtain the image information from the smart television. After obtaining the image information, the mobile phone may obtain the character string information through recognition, so that the mobile phone translates the character string information. The smart television may directly display, on the display interface of the original text, a result of translating the original text by the mobile phone, so that efficiency of translating the original text by the user can be improved, and excessive user operations performed during translation of the original text can be avoided, to improve user experience.

FIG. 4(a) to FIG. 4(d)-1 and FIG. 4(d)-2 show another group of GUIs according to an embodiment of this application.

Figure 4A:
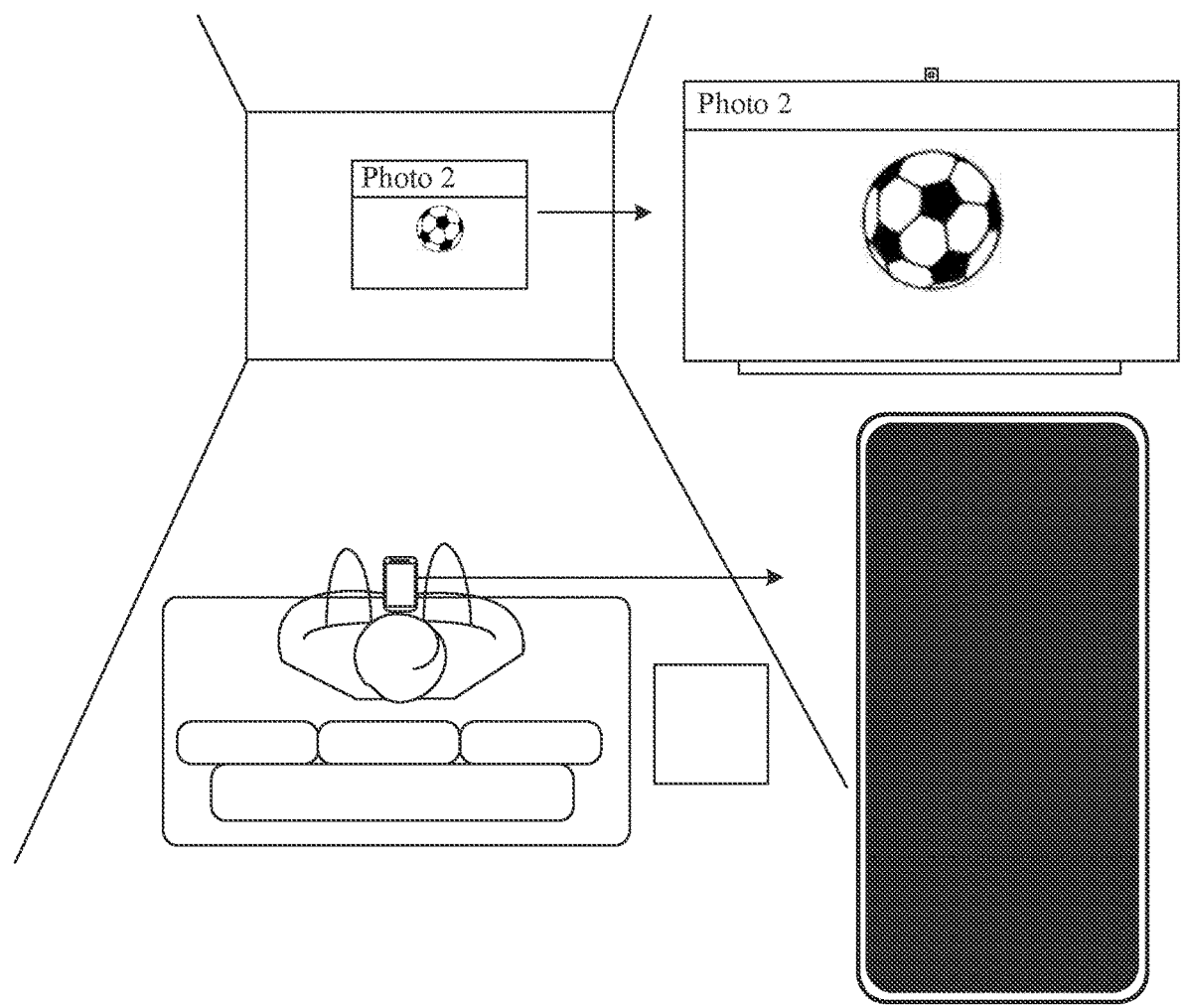

Refer to a GUI shown in FIG. 4(a). A smart television displays a photo 2, where the photo 2 includes image information of a football. In this case, a lock screen interface is displayed on a mobile phone.

Figure 4B:
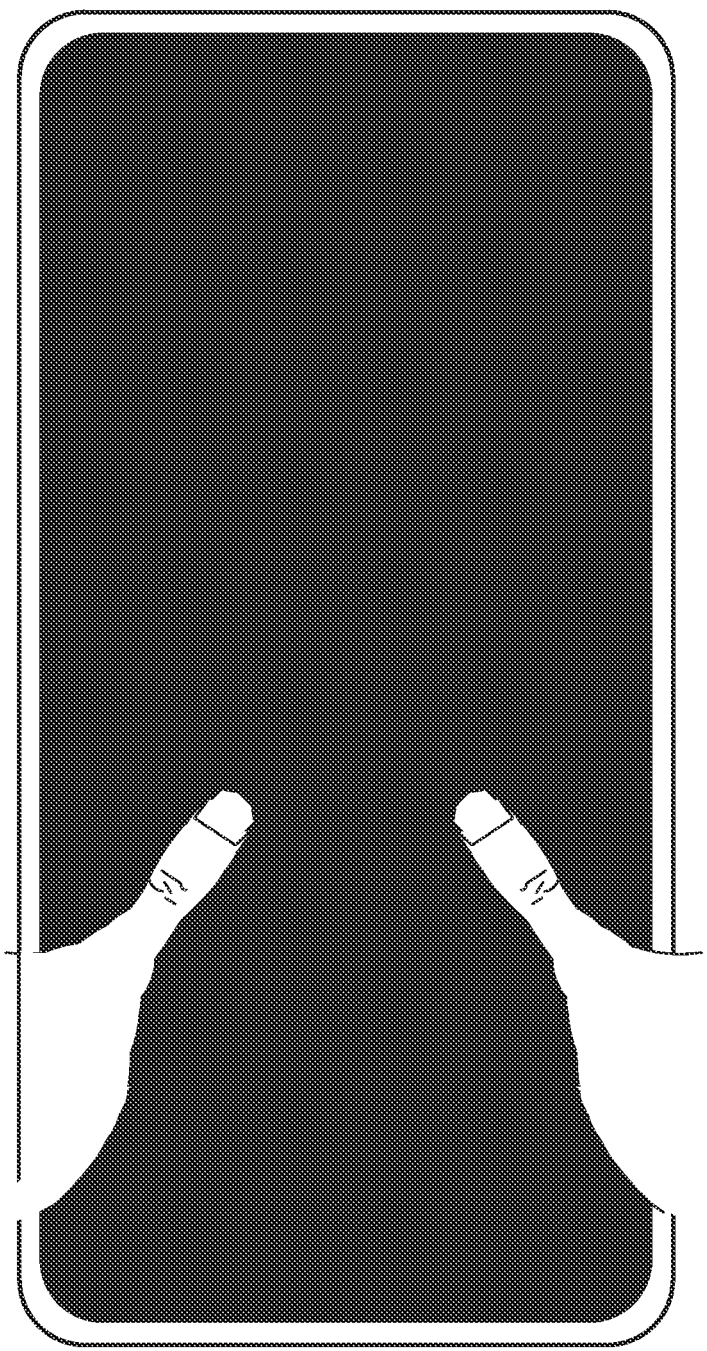

Refer to a GUI shown in FIG. 4(b). After the mobile phone detects an operation of pressing a screen with two fingers by a user, the mobile phone may send an instruction to the smart television, where the instruction instructs the smart television to capture image information currently displayed on the smart television. In response to receiving the instruction sent by the mobile phone, the smart television sends, to the mobile phone, the image information currently displayed through the display. In response to receiving the image information sent by the smart television, the mobile phone may recognize an object in the image information, to obtain an object recognition result of the object.

In an embodiment, after the mobile phone detects an operation of pressing a screen with two fingers by the user, the mobile phone may collect fingerprint information of the user, and match the collected fingerprint information with fingerprint information preset in the mobile phone. If the matching succeeds, the mobile phone may perform an unlocking operation, to enter a non-lock screen interface. After receiving the image information sent by the smart television, the mobile phone may perform object recognition on the image information and display an object recognition result shown in FIG. 4(c).

Figure 4C:
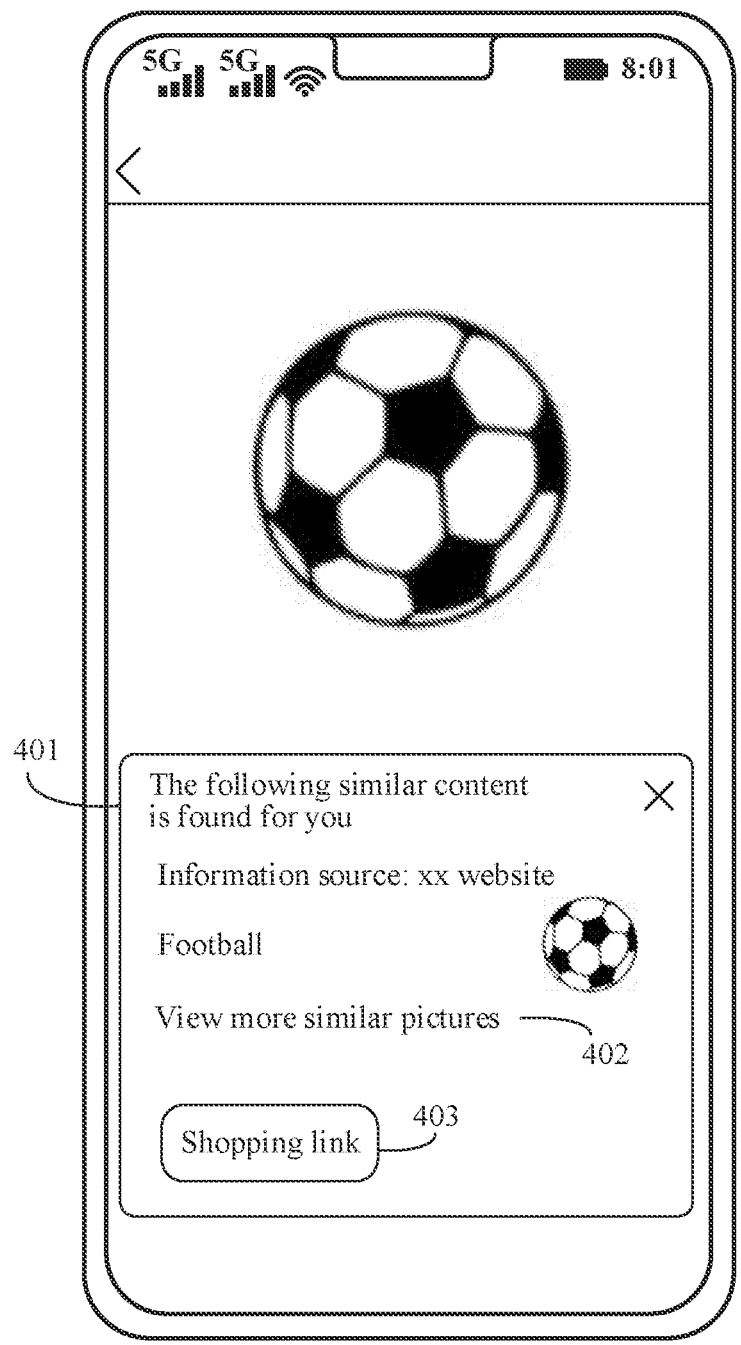

It should be understood that if the mobile phone receives the image information and obtains the object recognition result before entering the non-lock screen interface, the mobile phone may directly display the object recognition result after entering the non-lock screen interface; or if the mobile phone receives the image information after entering the non-lock screen interface, the mobile phone may display, after recognizing the object in the image information, the object recognition result shown in FIG. 4(c).

In an embodiment, after the mobile phone detects an operation of pressing a screen with two fingers by the user, the mobile phone may send the instruction to the smart television. When the mobile phone receives the image information sent by the smart television, the mobile phone may prompt the user to recognize the object in the image information after unlocking. When the mobile phone detects an unlock operation of the user, the mobile phone may enter the non-lock screen interface, to recognize the object in the image information and display the object recognition result shown in FIG. 4(c). It should be understood that, that the mobile phone detects an unlock operation of the user includes but is not limited to: The mobile phone detects that the user enters a password and the password is successfully verified; or the mobile phone detects an operation of pressing a screen with a finger by the user in a fingerprint collection area, and the collected fingerprint information matches fingerprint information preset in the mobile phone; or the mobile phone enables a camera to collect facial information of the user, and the facial information collected by the camera matches facial information preset in the mobile phone.

In an embodiment, after the mobile phone detects an operation of pressing a screen with two fingers by the user, the mobile phone may send the instruction to the smart television. When receiving the image information sent by the smart television, the mobile phone may perform object recognition on the image information, to obtain an object recognition result. In response to obtaining the object recognition result, the mobile phone may prompt the user to view the object recognition result after unlocking. When the mobile phone detects the unlock operation of the user, the mobile phone may display the object recognition result shown in FIG. 4(c). It should be understood that, for descriptions that the mobile phone detects the unlock operation of the user, refer to the descriptions in the foregoing embodiments. For brevity, details are not described herein again.

In an embodiment, if the mobile phone determines, after recognizing the photo 2, that the photo 2 includes only information about an object, the mobile phone may automatically recognize the object.

Refer to a GUI shown in FIG. 4(c). The GUI is an interface for displaying the object recognition result. The mobile phone may display a prompt box 401 through the display, where the prompt box 401 includes prompt information "The following similar content is found for you", an information source (for example, "xx website"), name information of the object (for example, "Football"), a control 402 for viewing more similar pictures, and a shopping link 403.

In an embodiment, while displaying the object recognition result, the mobile phone may further send the object recognition result to the smart television, so that the smart television displays the object recognition result.

Figures 1, 4D:
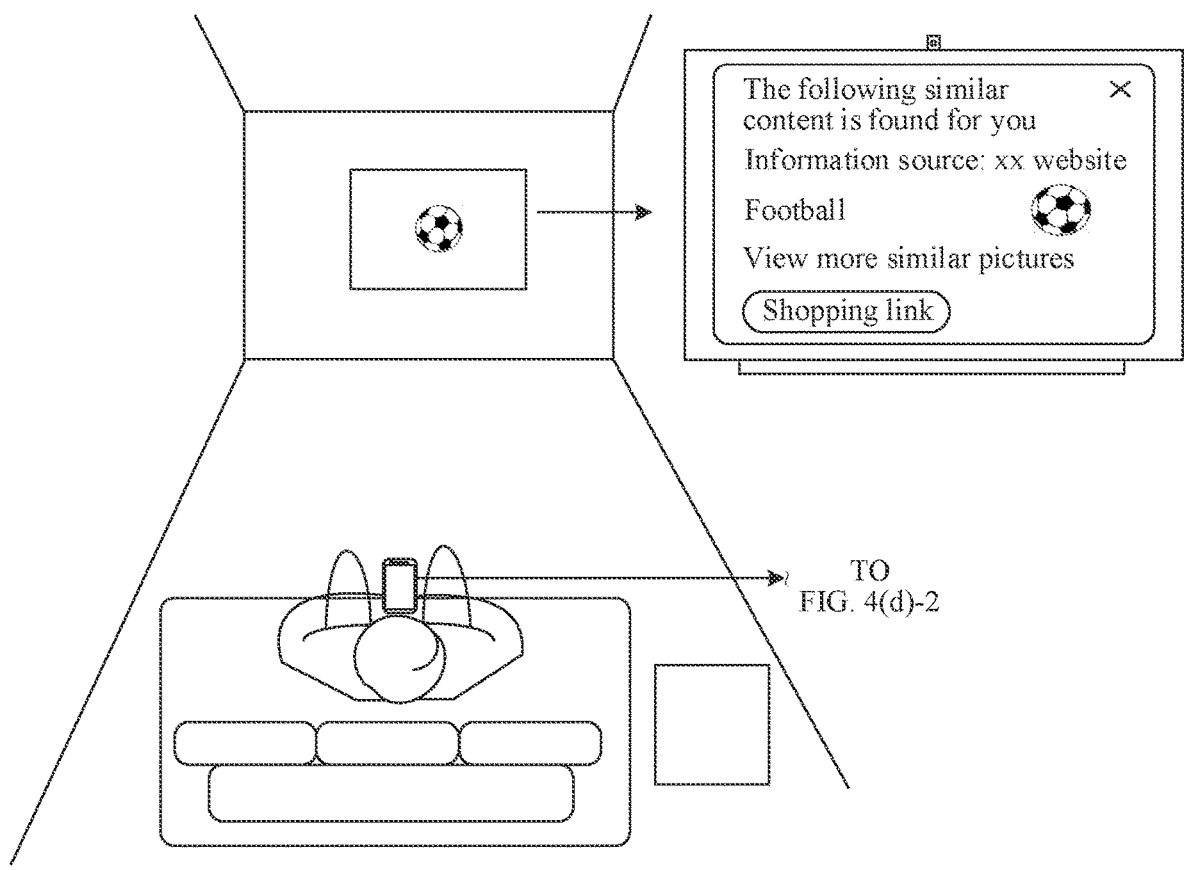
Figures 1, 2, 4D:
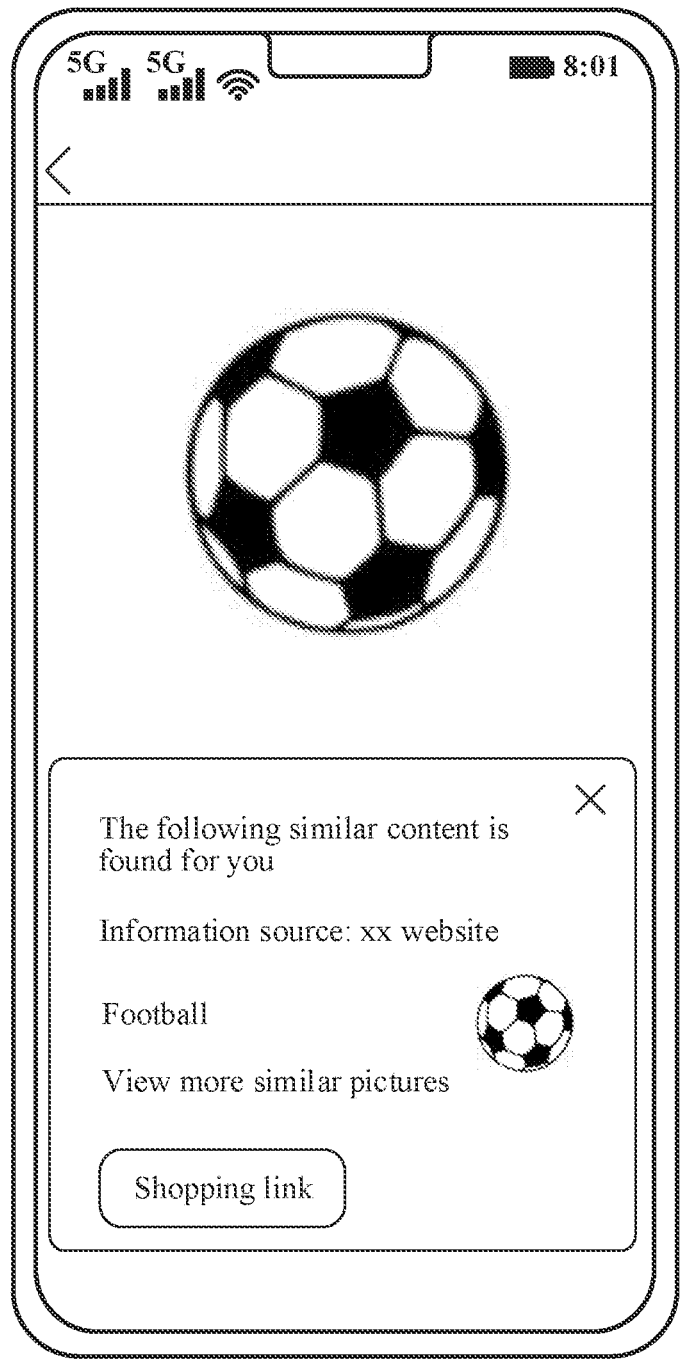

Refer to a GUI shown in FIG. 4(d)-1 and FIG. 4(d)-2. In response to receiving the object recognition result sent by the mobile phone, the smart television may display the object recognition result through a display.

In this embodiment of this application, the user does not need to log in to an object recognition software or send the photo to an object recognition website for object recognition, and triggers, through a preset operation of the user, the mobile phone to send an instruction for obtaining the image information to the smart television. After obtaining the image information, the mobile phone may recognize the object in the image information by using an object recognition function of the mobile phone. In this way, the smart television can invoke an AI Touch function of the mobile phone, which helps improve efficiency of recognizing the object in the photo by the user and helps improve user experience.

FIG. 5(a)-1 and FIG. 5(a)-2 to FIG. 5(c) show another group of GUIs according to an embodiment of this application.

Figures 1, 5A:
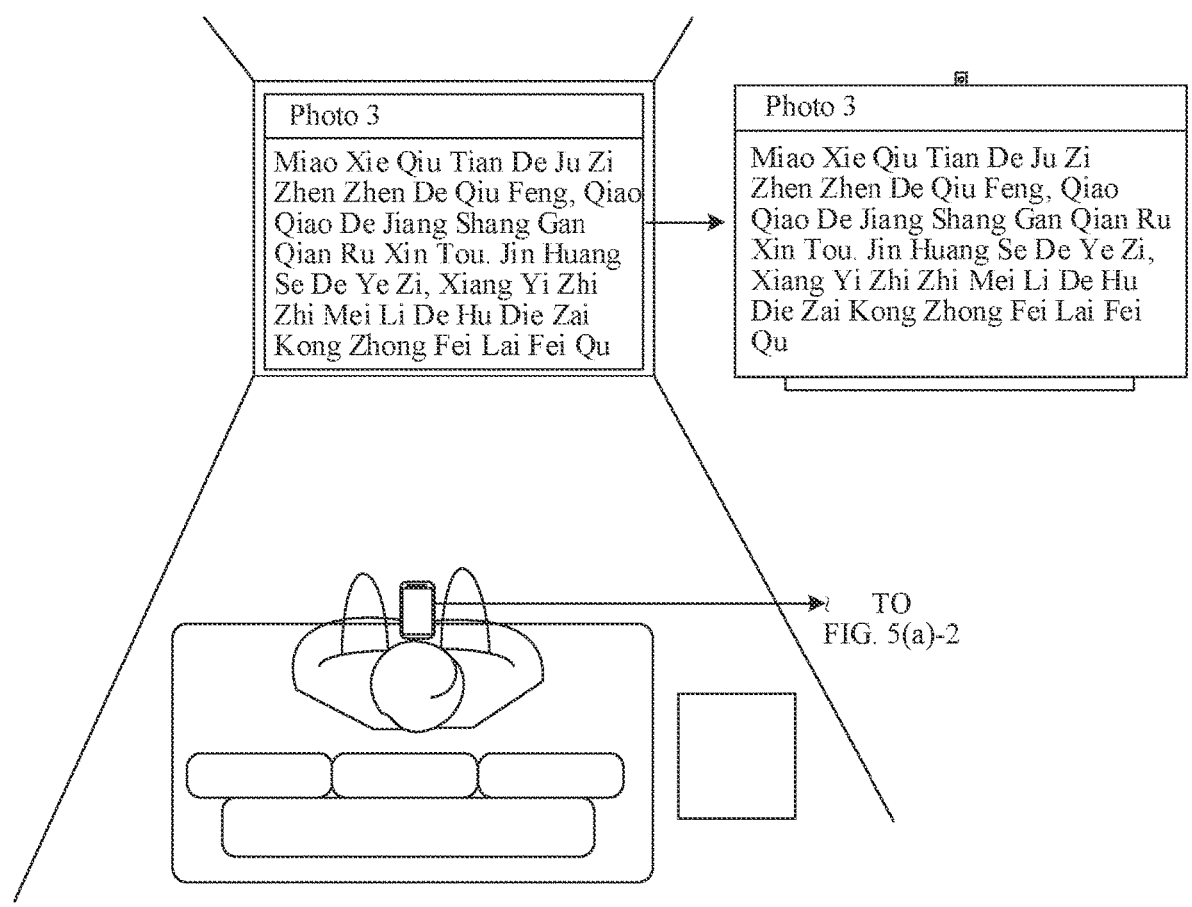
Figures 2, 5A:
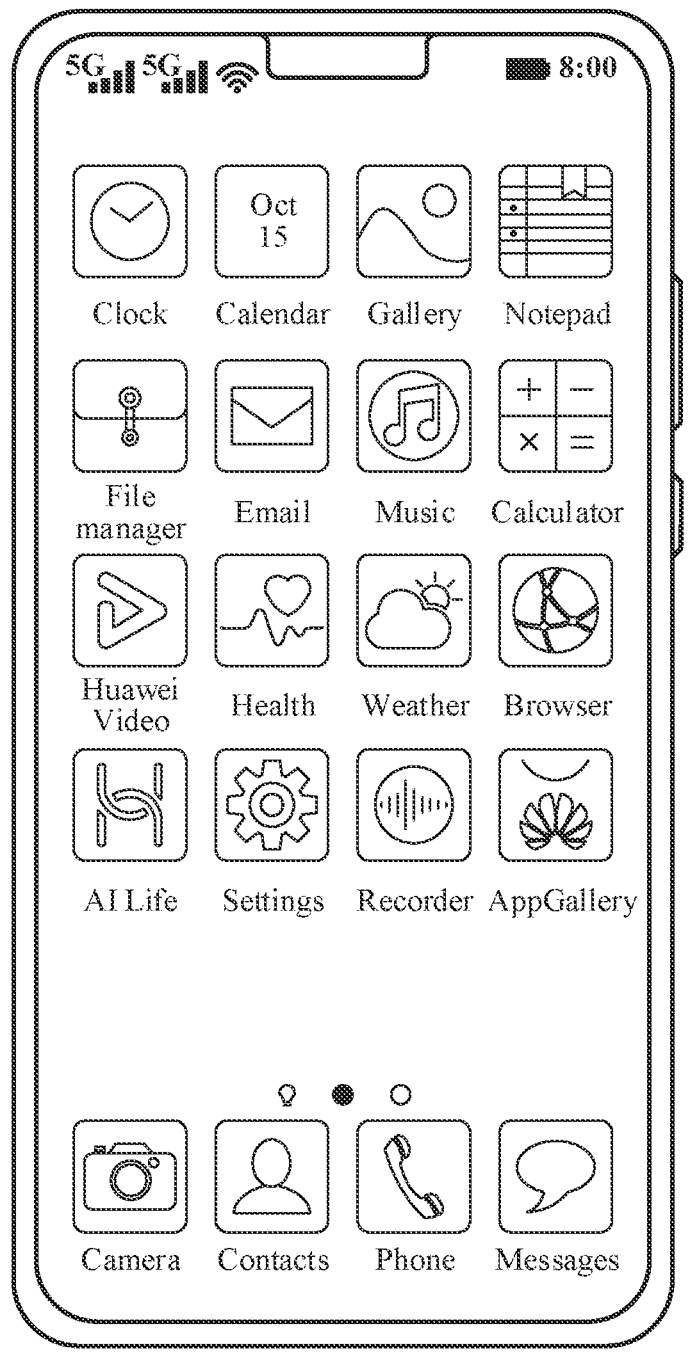

Refer to a GUI shown in FIG. 5(a)-1 and FIG. 5(a)-2. A smart television displays a photo 3, where the photo 3 includes a Chinese paragraph "Miao Xie Qiu Tian De Ju Zi . . . Fei Lai Fei Qu". In this case, a home screen of a mobile phone is displayed on the mobile phone.

Figure 5B:
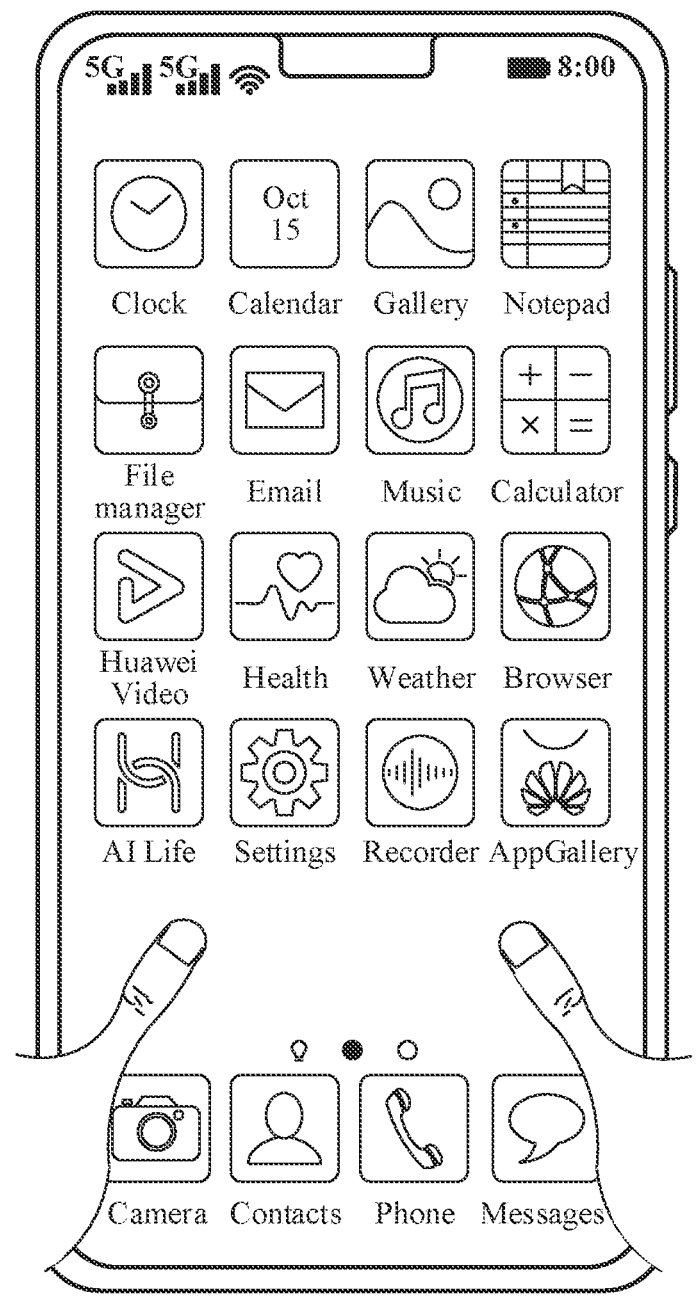

Refer to a GUI shown in FIG. 5(b). After the mobile phone detects an operation of pressing a screen with two fingers by a user, the mobile phone may send an instruction to the smart television, where the instruction instructs the smart television to capture image information currently displayed on the smart television. In response to receiving the instruction sent by the mobile phone, the smart television sends, to the mobile phone, the image information currently displayed through the display. In response to receiving the image information sent by the smart television, the mobile phone may recognize a text in the photo 3 through OCR, to obtain character string information "Miao Xie Qiu Tian De Ju Zi . . . Fei Lai Fei Qu".

Figure 5C:
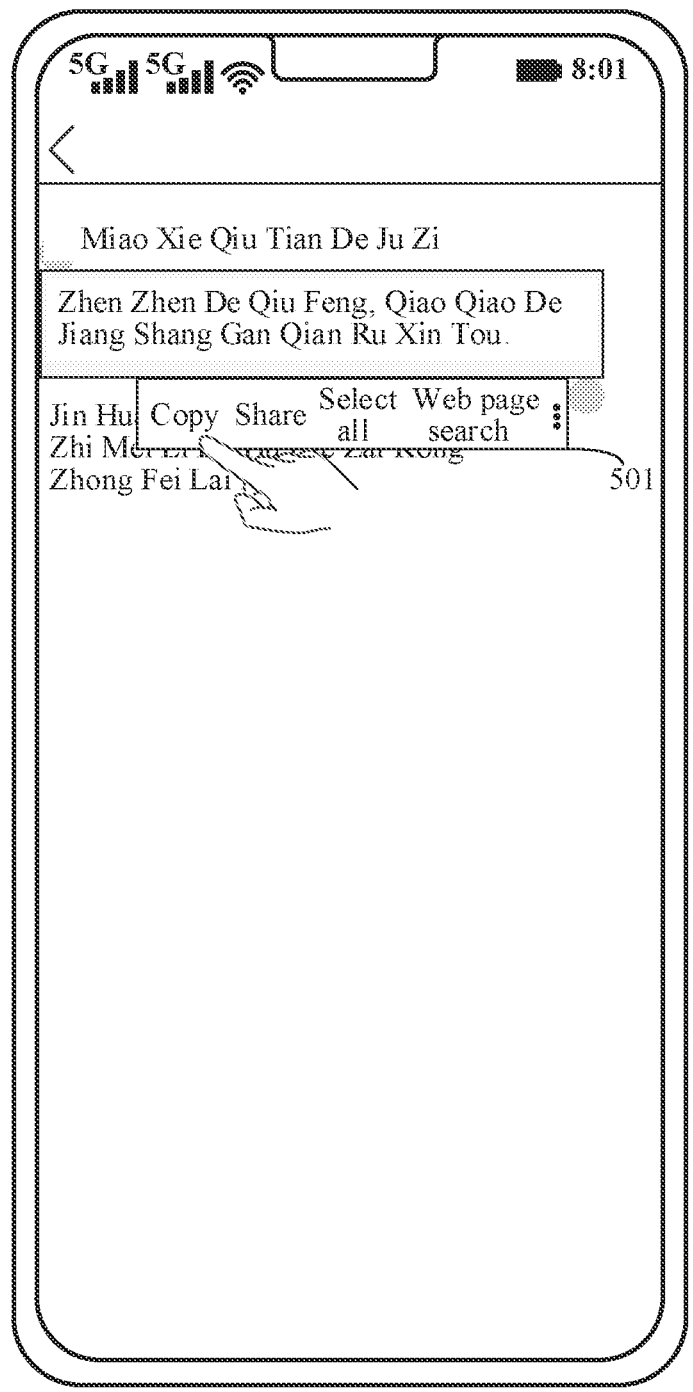

Refer to a GUI shown in FIG. 5(c). The GUI is a character string information display interface. After the mobile phone detects that the user selects a part of the text "Zhen Zhen De Qiu Feng . . . Qian Ru Xin Tou", the mobile phone may display a function list 501, where the function list 501 includes functions such as Copy, Share, Select all, and Web page search. The user may choose to copy the selected text to the local mobile phone (for example, copy the text to a Notepad application of the mobile phone).

In an embodiment, if the mobile phone determines, after recognizing the photo 3, that the photo 3 includes only text content and the text content is in a default language of the mobile phone, the mobile phone may display the character string information obtained by the mobile phone through recognition.

For example, if the default language of the mobile phone is Chinese, and the mobile phone determines that a language corresponding to the character string information is Chinese content, the mobile phone may display the character string information.

In an embodiment, the mobile phone may further display prompt information to the user after obtaining character string information, where the prompt information prompts the user with a language (for example, Chinese, Japanese, Korean, or Spanish) into which the character string content is to be translated.

In this embodiment of this application, the user does not need to manually enter the corresponding text on the mobile phone based on the content in the photo on the smart television, and triggers, through a preset operation of the user, the mobile phone to send an instruction for obtaining the image information to the smart television. After obtaining the image information, the mobile phone may obtain, by using a function of converting the text in the image on the mobile phone into the character string, the character string information obtained through recognition. This helps improve efficiency of converting the text in the image into the character string by the user, to help improve user experience.

The foregoing describes, through several groups of GUIs shown in FIG. 3(a)-1 and FIG. 3(a)-2 to FIG. 3(e)-1 and FIG. 3(e)-2 to FIG. 5(a)-1 and FIG. 5(a)-2 to FIG. 5(c), a process in which the mobile phone determines, by using image information obtained from the smart television, content included in the image information, to invoke a capability corresponding to the mobile phone by using the content, to process the content. The following describes a manner of performing processing when the mobile phone identifies different types of content (for example, character string information and image information of an object) from image information obtained by the smart television.

FIG. 6(a)-1 and FIG. 6(a)-2 to FIG. 6(f) show another group of GUIs according to an embodiment of this application.

Figures 1, 6A:
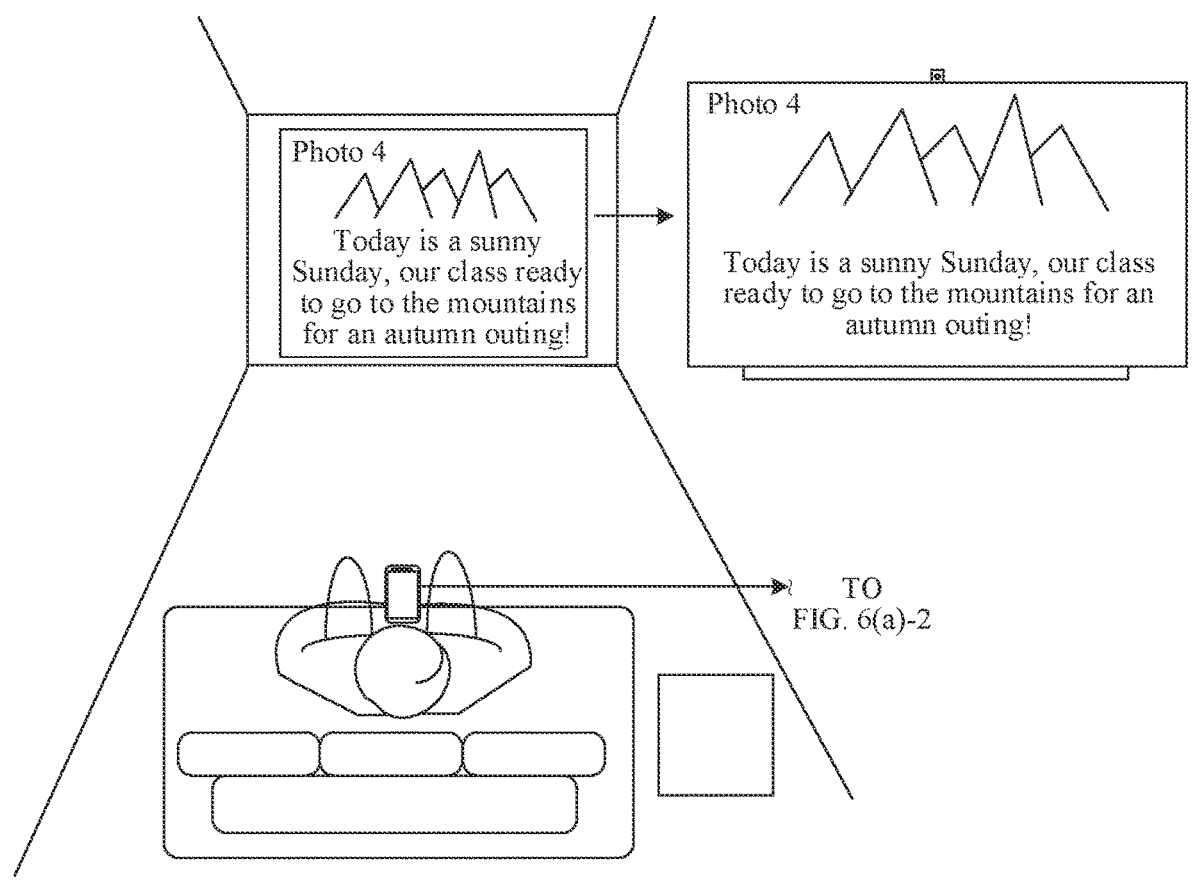
Figures 2, 6A:
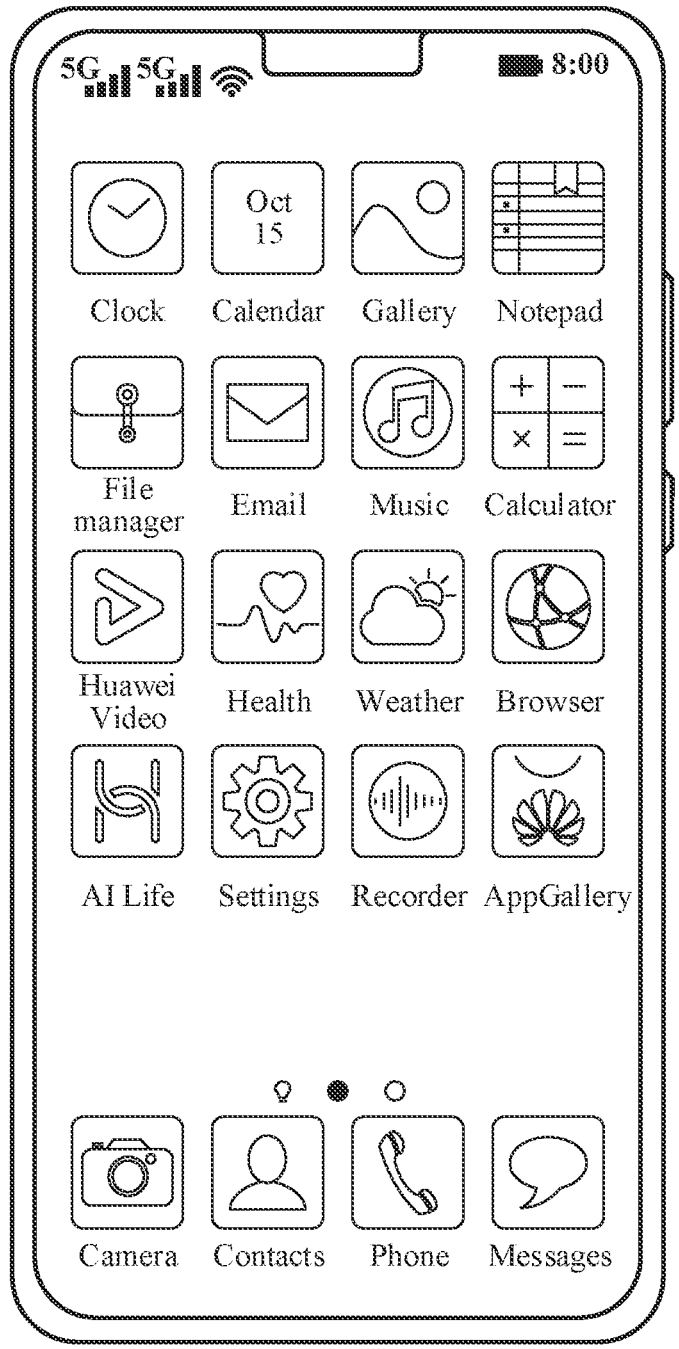

Refer to a GUI shown in FIG. 6(a)-1 and FIG. 6(a)-2. A smart television displays a photo 4, where the photo 4 includes an English paragraph "Today is a sunny . . . outing!" and image information of an object (for example, "Mountains"). In this case, a home screen of a mobile phone is displayed on the mobile phone.

Figure 6B:
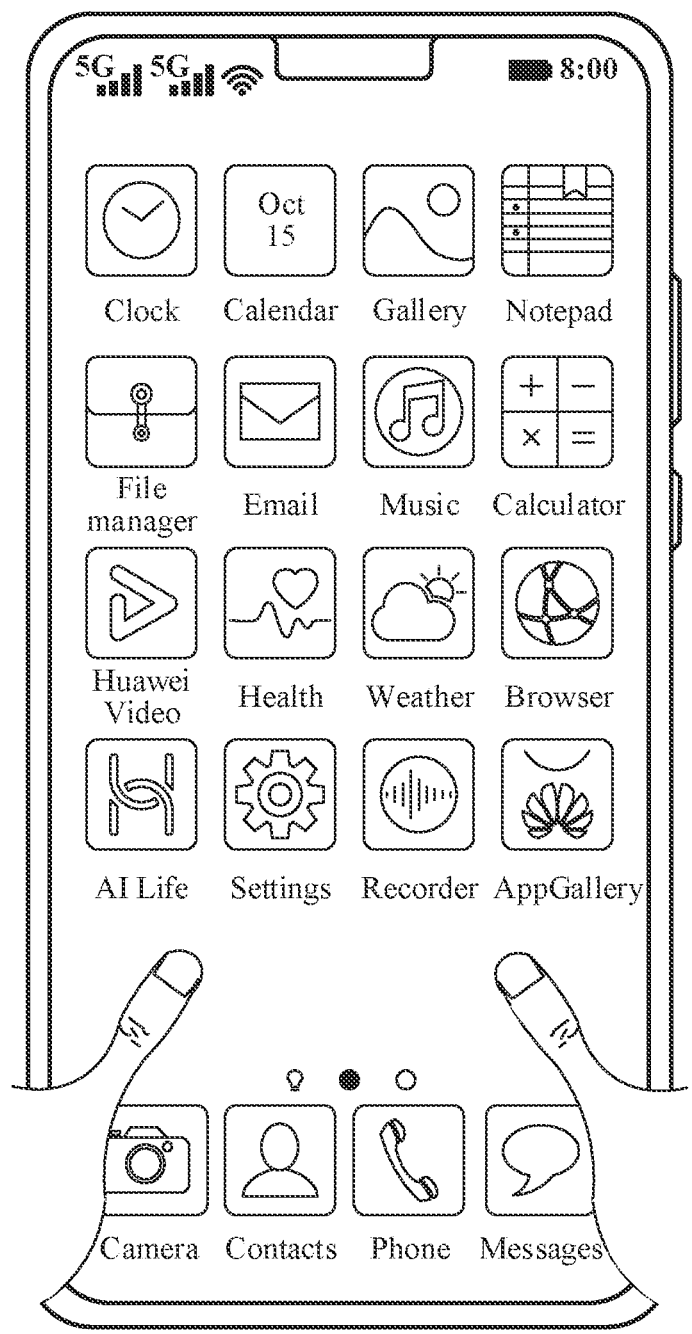

Refer to a GUI shown in FIG. 6(b). After the mobile phone detects an operation of pressing a screen with two fingers by a user, the mobile phone may send an instruction to the smart television, where the instruction instructs the smart television to capture image information currently displayed on the smart television. In response to receiving the instruction sent by the mobile phone, the smart television sends, to the mobile phone, the image information currently displayed through the display. In response to receiving the image information sent by the smart television, the mobile phone may recognize the image information in the photo 4, to obtain character string information (for example, "Today is a sunny . . . outing!") and image information of an object.

Figure 6C:
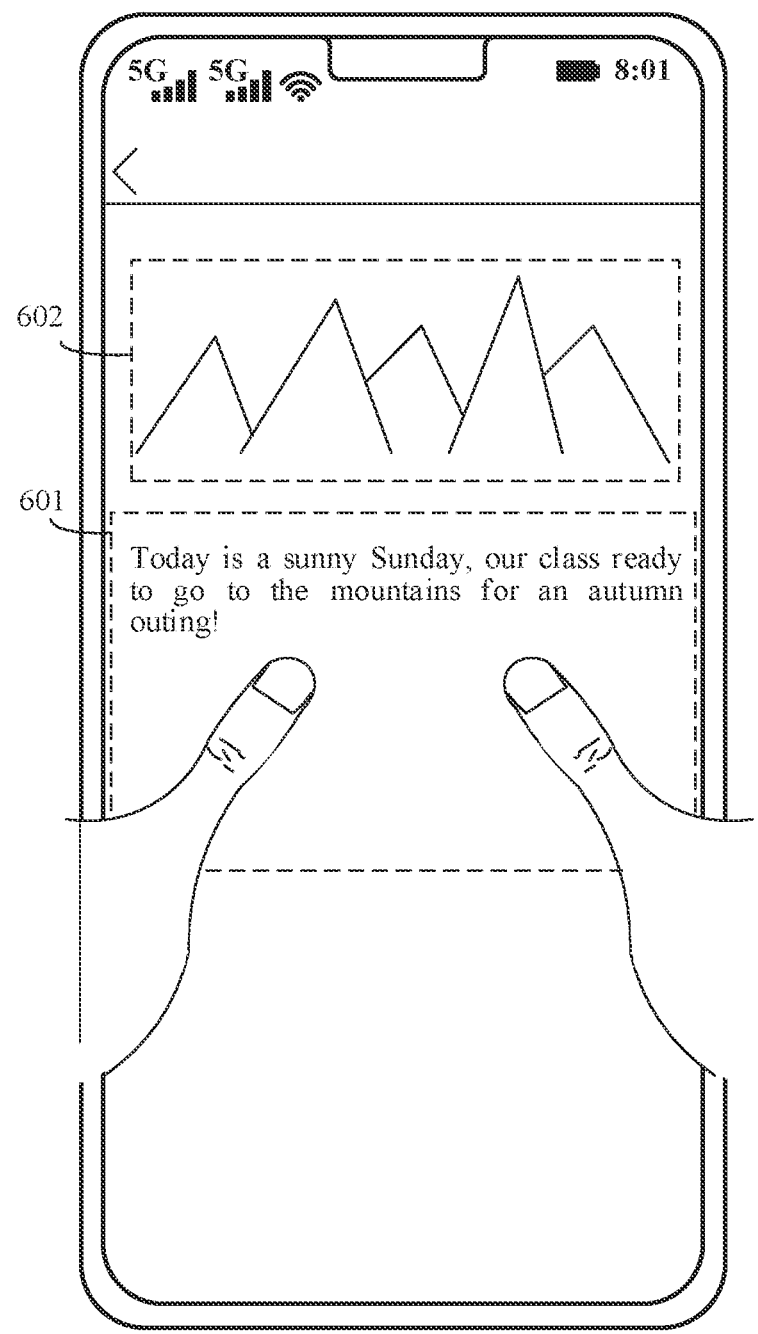

Refer to a GUI shown in FIG. 6(c). After the mobile phone completes recognition of the image information, the mobile phone may display character string information 601 and image information 602 of an object that are obtained through recognition. When the mobile phone detects a two-finger press operation performed by the user on the character string information, the mobile phone may display a GUI shown in FIG. 6(d).

Figure 6D:
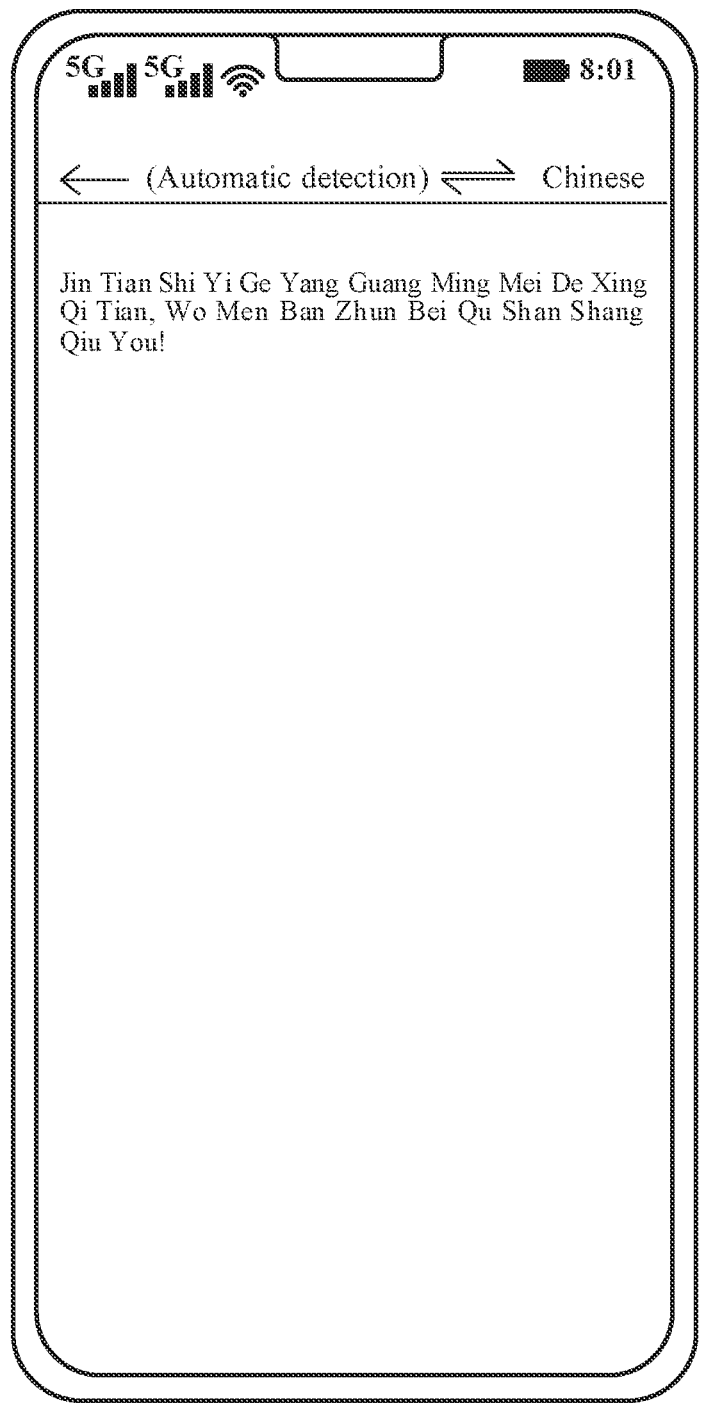

Refer to the GUI shown in FIG. 6(d). In response to the fact that the mobile phone detects the two-finger press operation performed by the user on the character string information, the mobile phone may translate the character string information. The GUI displays a result of translating the character string information.

In an embodiment, if a default language of the mobile phone is Chinese and the mobile phone determines that a language corresponding to the character string information is not Chinese, when the mobile phone detects a two-finger press operation performed by the user on the character string information, the mobile phone may automatically translate the character string information into Chinese.

In an embodiment, when the mobile phone detects a two-finger press operation performed by the user on the character string information, the mobile phone may further prompt the user with a language (for example, Chinese, Japanese, Korean, or Spanish) into which the character string information is to be translated.

In an embodiment, the mobile phone may further translate the character string information when detecting another preset operation (for example, a three-finger press operation) performed by the user on the character string information.

Figure 6E:
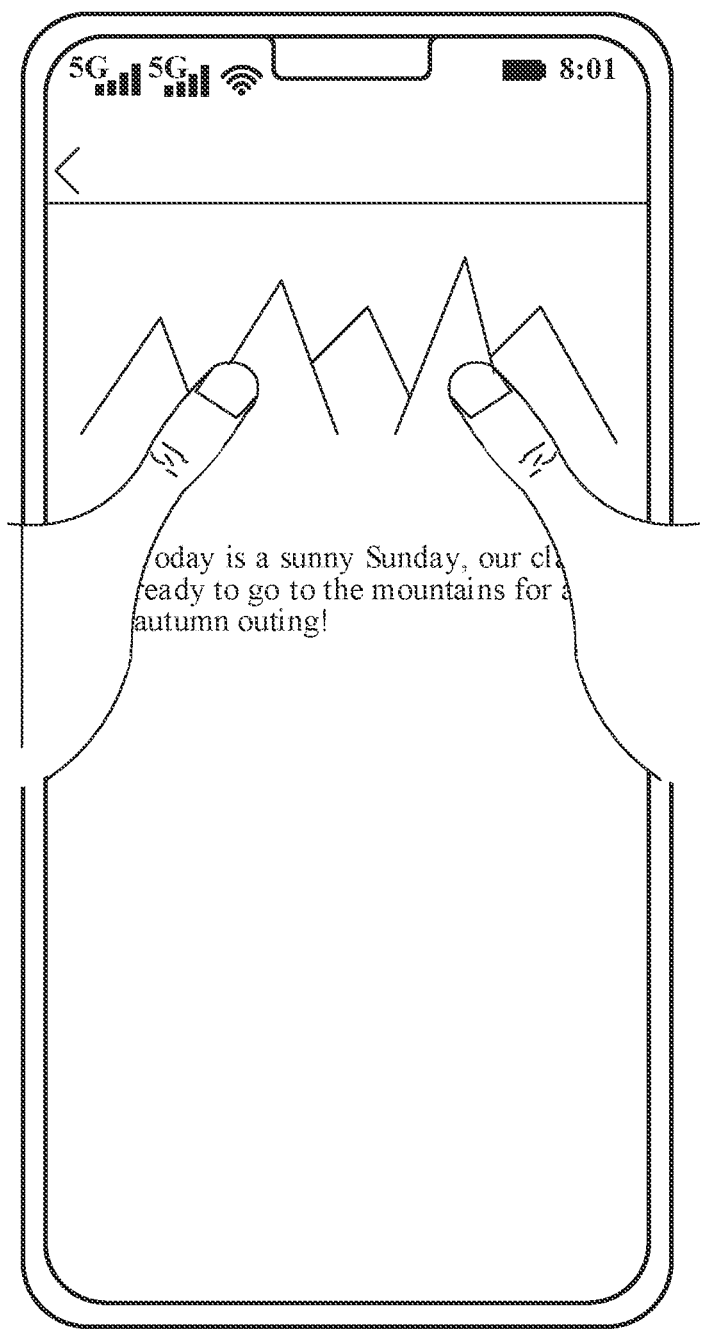

Refer to a GUI shown in FIG. 6(e). When the mobile phone detects a two-finger press operation performed by the user on the image information of the object, the mobile phone may display a GUI shown in FIG. 6(f).

Figure 6F:
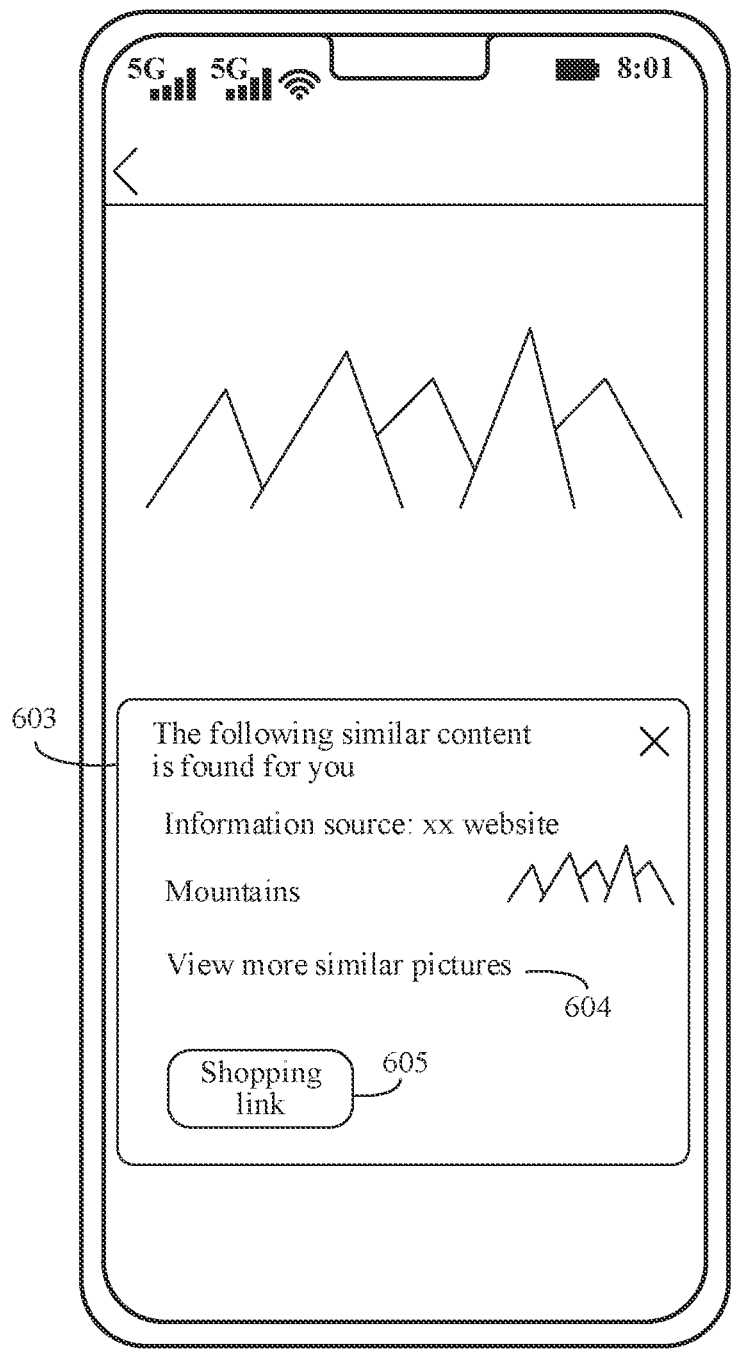

Refer to the GUI shown in FIG. 6(f). In response to the fact that the mobile phone detects the two-finger press operation performed by the user on the image information of the object, the mobile phone may perform object recognition on the image information, to display a prompt box 603, where the prompt box 603 includes an object recognition result of the object, and the object recognition result includes prompt information "The following similar content is found for you", an information source (for example, "xx website"), a name of the object (for example, "Mountains"), a control 604 for viewing more similar pictures, and a shopping link 605.

In an embodiment, in response to the fact that the mobile phone detects the two-finger press operation performed by the user on the image information of the object, the mobile phone may further prompt the user with an operation to be performed on the image information, for example, object recognition or shopping link query.

In an embodiment, the mobile phone may further perform object recognition on the image information when detecting another preset operation (for example, a mid-air gesture) performed by the user on the image information.

FIG. 7(a) to FIG. 7(e) show another group of GUIs according to an embodiment of this application. Different from the GUIs shown in FIG. 6(a)-1 and FIG. 6(a)-2 to FIG. 6(f), in the GUIs shown in FIG. 7(a) to FIG. 7(e), before displaying a processing result of image information sent by the smart television, the mobile phone may prompt the user to select a manner of processing the image information.

Figure 7A:
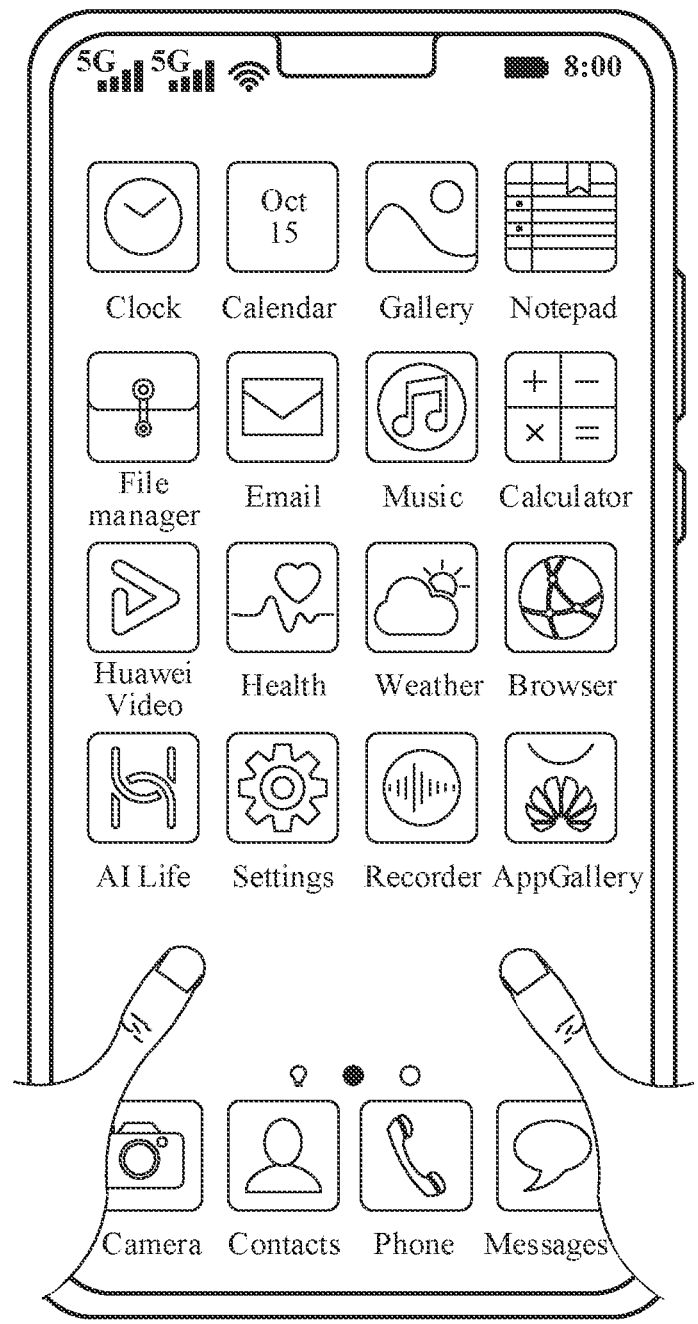
FIG. 7(a) to FIG. 7(e) show another group of graphical user interfaces according to an embodiment of this application.

Refer to a GUI shown in FIG. 7(a). After the mobile phone detects an operation of pressing a screen with two fingers by the user, the mobile phone may send an instruction to the smart television, where the instruction instructs the smart television to capture image information currently displayed on the smart television. In response to receiving the instruction sent by the mobile phone, the smart television sends, to the mobile phone, the image information currently displayed through the display. In response to receiving the image information sent by the smart television, the mobile phone may recognize the image information in the photo 4, to obtain character string information (for example, "Today is a sunny . . . outing!") and image information of an object.

Figure 7B:
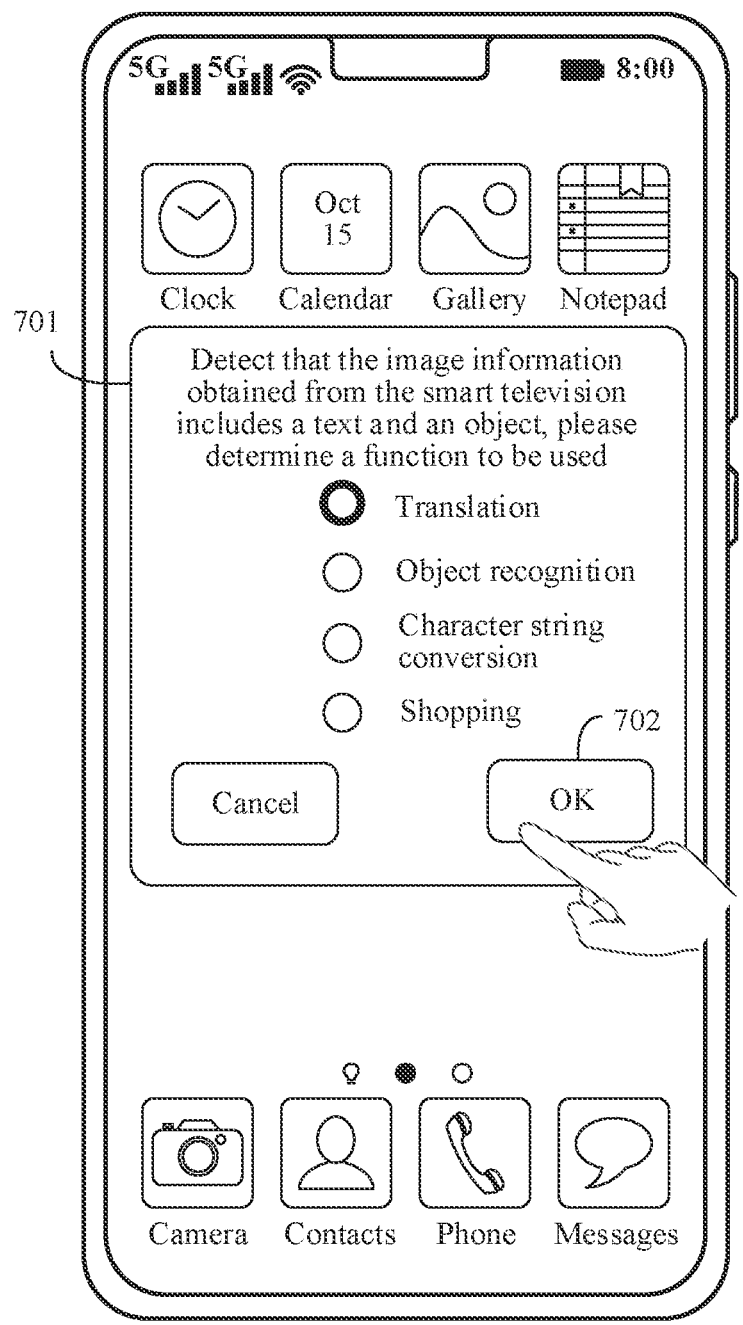

Refer to a GUI shown in FIG. 7(b). In response to obtaining the character string information and the image information of the object by the mobile phone, the mobile phone may display a prompt box 701, where the prompt box 701 includes prompt information "Detect that the image information obtained from the smart television includes a text and an object, please determine a function to be used" and a function list (including Translation, Object recognition, Character string conversion, and Shopping). When the mobile phone detects an operation that the user selects the translation function and taps a control 702, the mobile phone may display a GUI shown in FIG. 7(c).

Figure 7C:
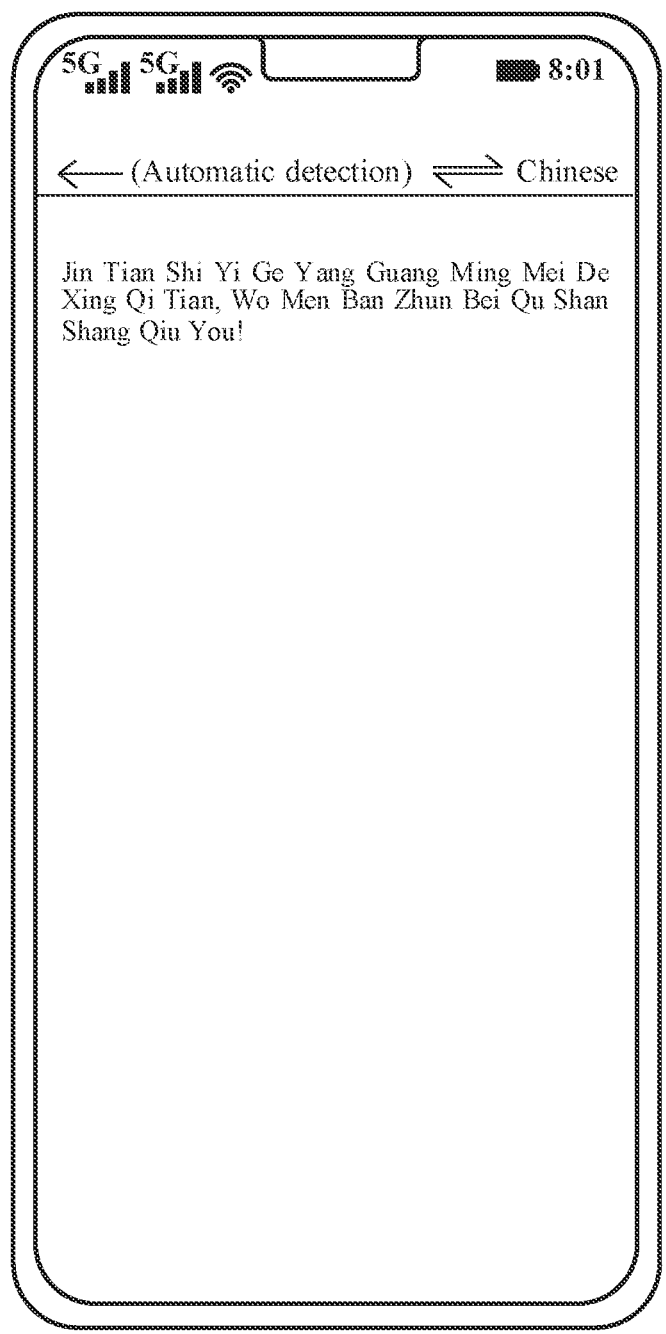

Refer to the GUI shown in FIG. 7(c). In response to the fact that the mobile phone detects the operation that the user selects the translation function and taps the control 702, the mobile phone may translate the character string information. The GUI displays a result of translating the character string information.

In an embodiment, if a default language of the mobile phone is Chinese and the mobile phone determines that a language corresponding to the character string information is not Chinese, when the mobile phone detects the operation that the user selects the translation function and taps the control 702, the mobile phone may automatically translate the character string information into Chinese.

In an embodiment, when detecting an operation of tapping the control 702 by the user, the mobile phone may further prompt the user with a language (for example, Chinese, Japanese, Korean, or Spanish) into which the character string information is to be translated. When the mobile phone detects that the user selects Translation into Chinese, the mobile phone may translate the character string information into Chinese.

Figure 7D:
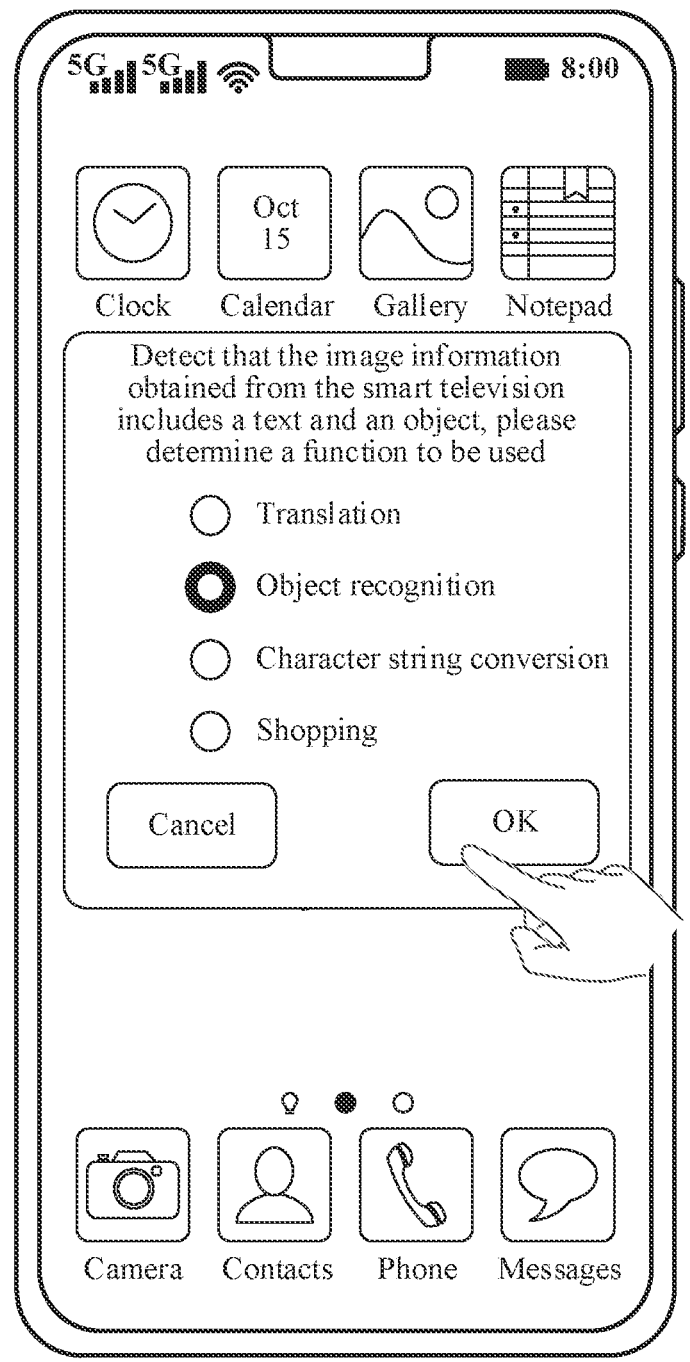

Refer to a GUI shown in FIG. 7(d). When the mobile phone detects an operation that the user selects the object recognition function and taps the control 702, the mobile phone may display a GUI shown in FIG. 7(e).

Figure 7E:
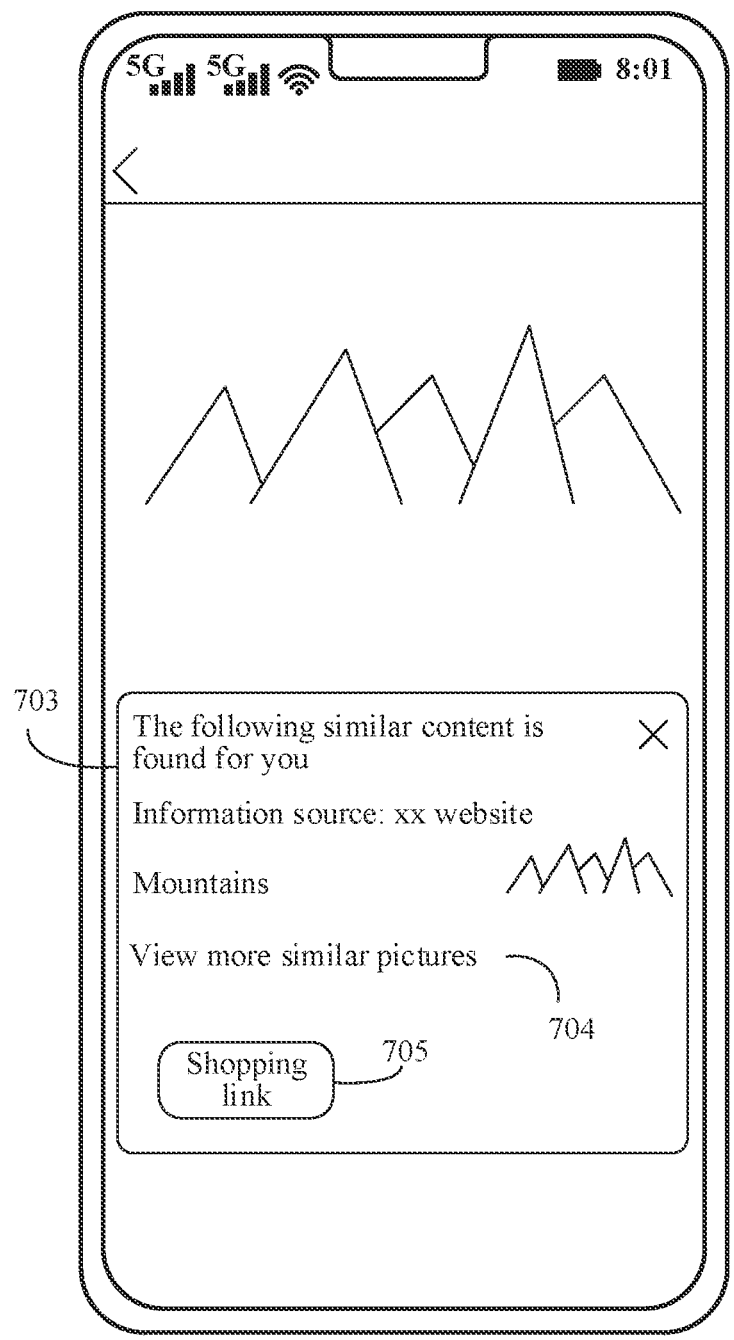

Refer to a GUI shown in FIG. 7(e). In response to the fact that the mobile phone detects the operation that the user selects the object recognition function and taps the control 702, the mobile phone may perform object recognition on the image information of the object, to display a prompt box 703, where the prompt box 703 includes an object recognition result of the object, and the object recognition result includes prompt information "The following similar content is found for you", an information source (for example, "xx website"), a name of the object (for example, "Mountains"), a control 704 for viewing more similar pictures, and a shopping link 705.

The foregoing describes, with reference to FIG. 6(a)-1 and FIG. 6(a)-2 to FIG. 6(f) and FIG. 7(a) to FIG. 7(e), a manner of performing processing when the mobile phone identifies different types of content (for example, character string information and image information of an object) from image information obtained by the smart television. The following describes, with reference to FIG. 8(a)-1 and FIG. 8(a)-2 to FIG. 8(e), a process in which the mobile phone determines whether the user processes content displayed on the mobile phone or processes content displayed on the smart television.

FIG. 8(a)-1 and FIG. 8(a)-2 to FIG. 8(e) show another group of GUIs according to an embodiment of this application.

Figures 1, 8A:
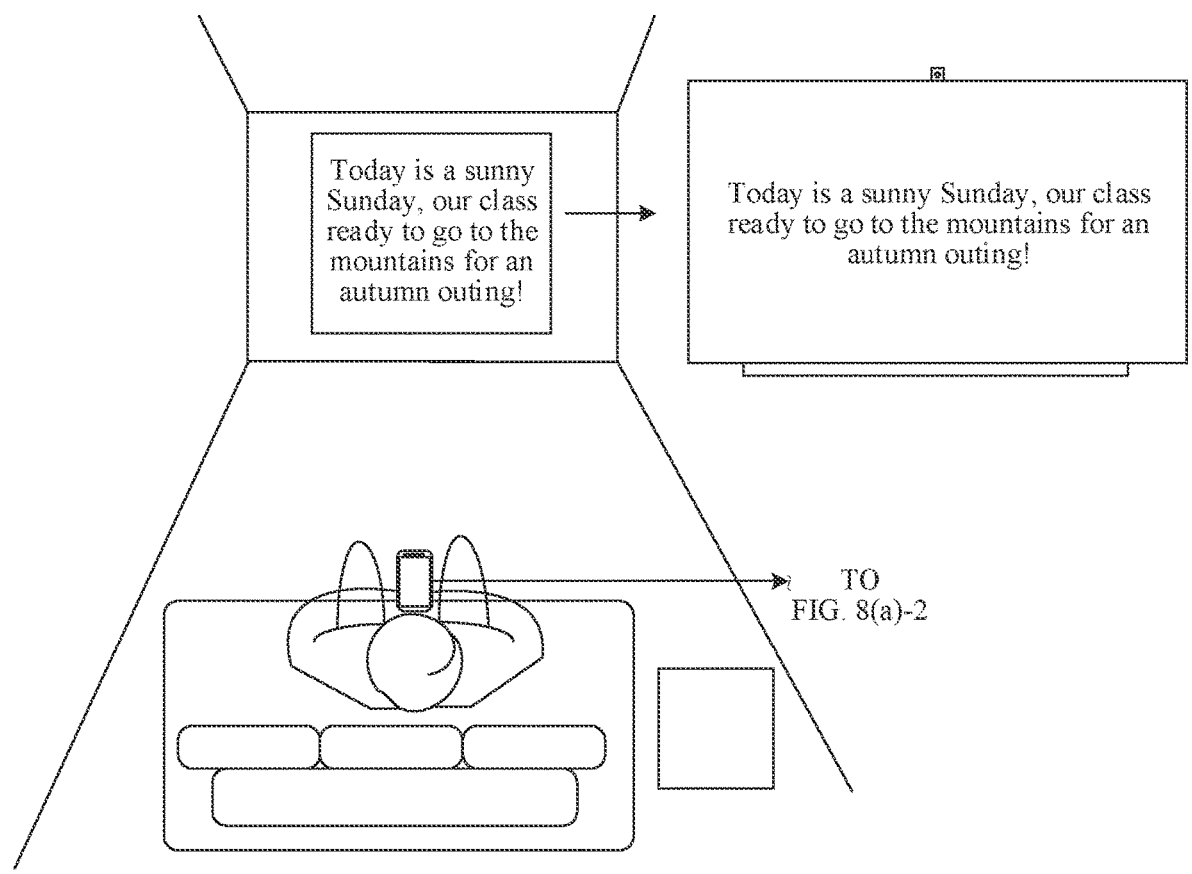
Figures 2, 8A:
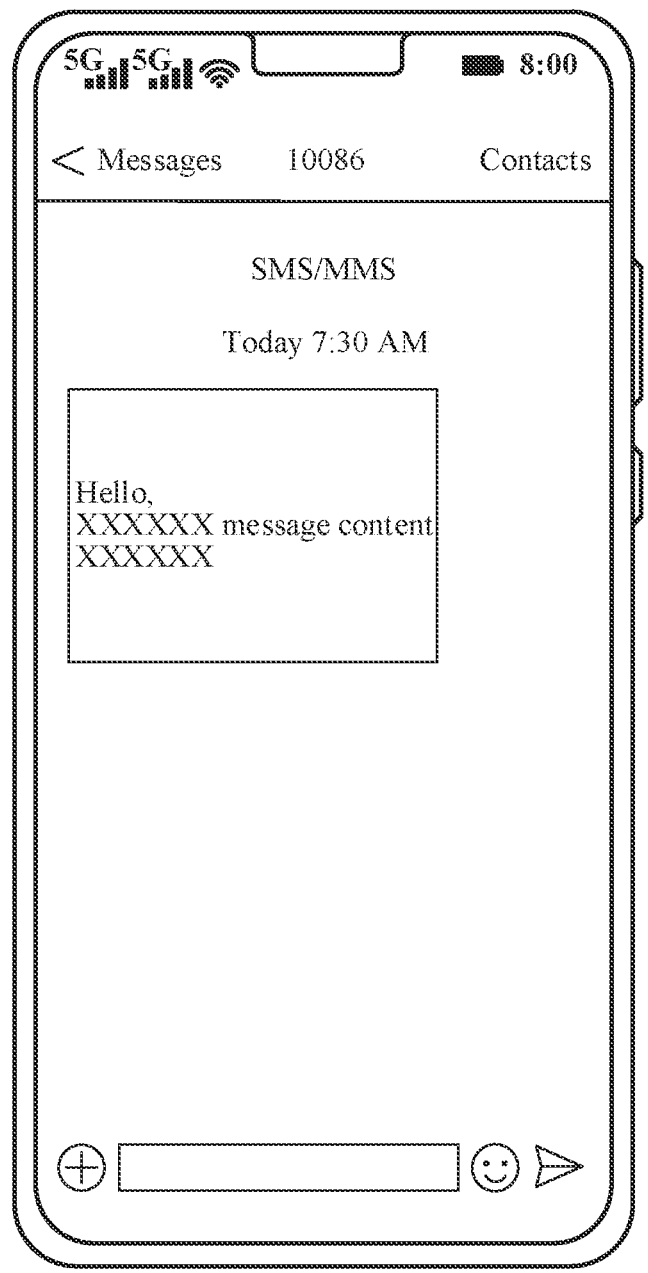

Refer to a GUI shown in FIG. 8(a)-1 and FIG. 8(a)-2. A smart television displays a photo 1, where the photo 1 includes an English paragraph "Today is a sunny . . . outing!". In this case, a display interface of a Messages application of a mobile phone is displayed on the mobile phone.

Figure 8B:
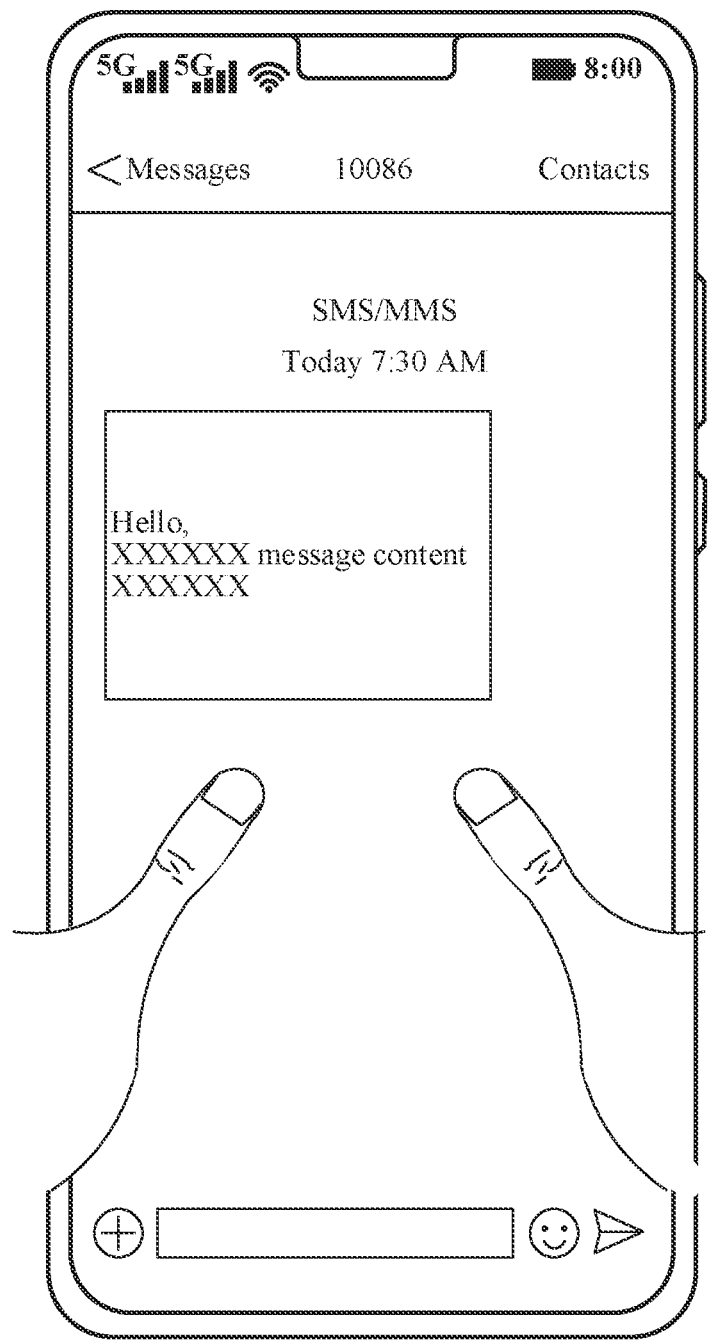

Refer to a GUI shown in FIG. 8(b). When the mobile phone detects a two-finger press operation performed by the user on the display interface of the Messages application, the mobile phone may display a GUI shown in FIG. 8(c).

Figure 8C:
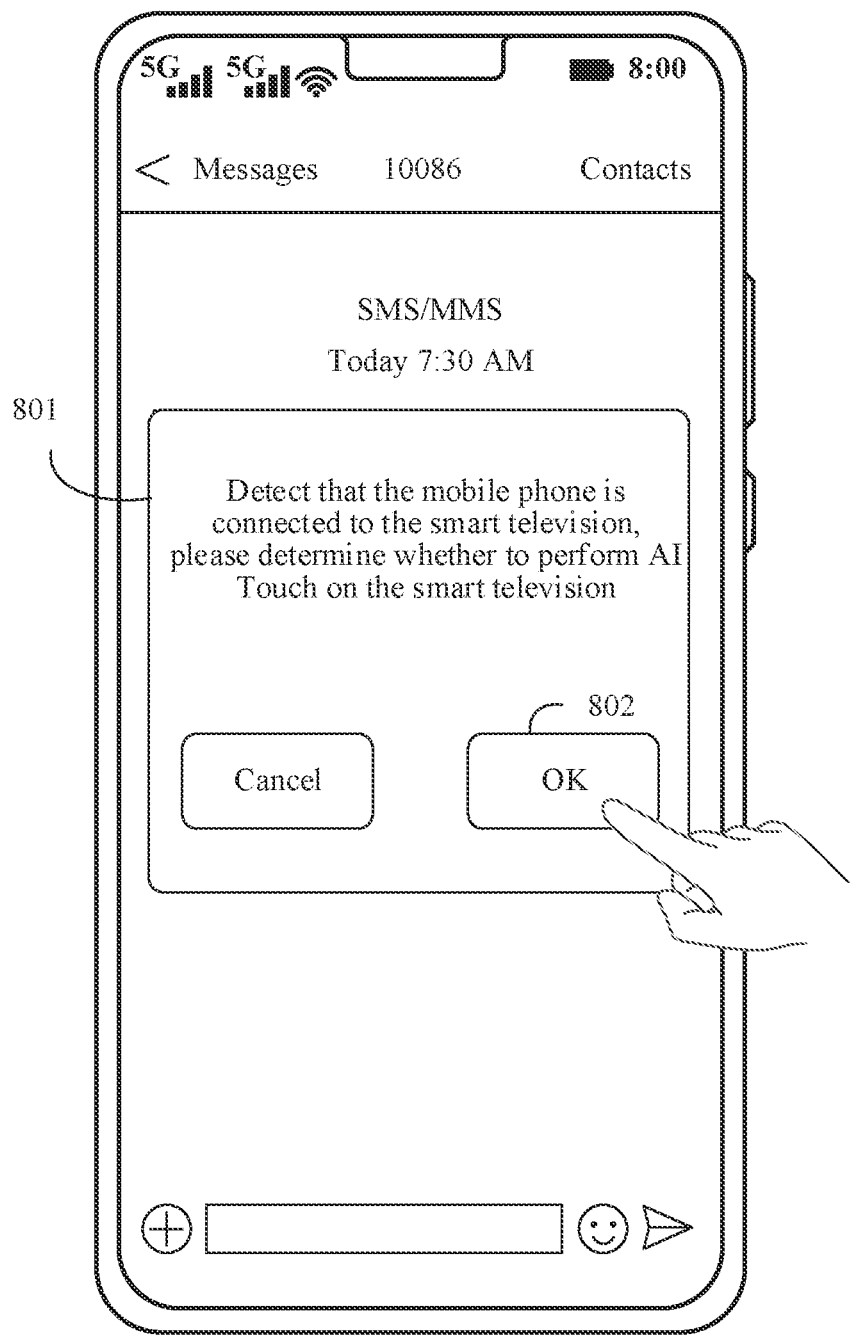

Refer to the GUI shown in FIG. 8(c) In response to the fact that the mobile phone detects the two-finger press operation performed by the user on the display interface of the Messages application, the mobile phone may display a prompt box 801, where the prompt box 801 includes prompt information "Detect that the mobile phone is connected to the smart television, please determine whether to perform AI Touch on the smart television". When the mobile phone detects an operation of tapping a control 802 by the user, the mobile phone may send an instruction to the smart television, where the instruction instructs the smart television to capture image information currently displayed on the smart television. In response to receiving the instruction sent by the mobile phone, the smart television sends, to the mobile phone, the image information currently displayed through the display. In response to receiving the image information sent by the smart television, the mobile phone may recognize the image information in the photo 4, to obtain character string information (for example, "Today is a sunny . . . outing!").

In an embodiment, if a wireless connection is established between the mobile phone and each of the smart television and a tablet, the mobile phone may further prompt the user to select a device on which AI Touch is to be performed. If the mobile phone detects that the user chooses to perform AI Touch on the smart television, the mobile phone may send the instruction to the smart television.

Figure 8D:
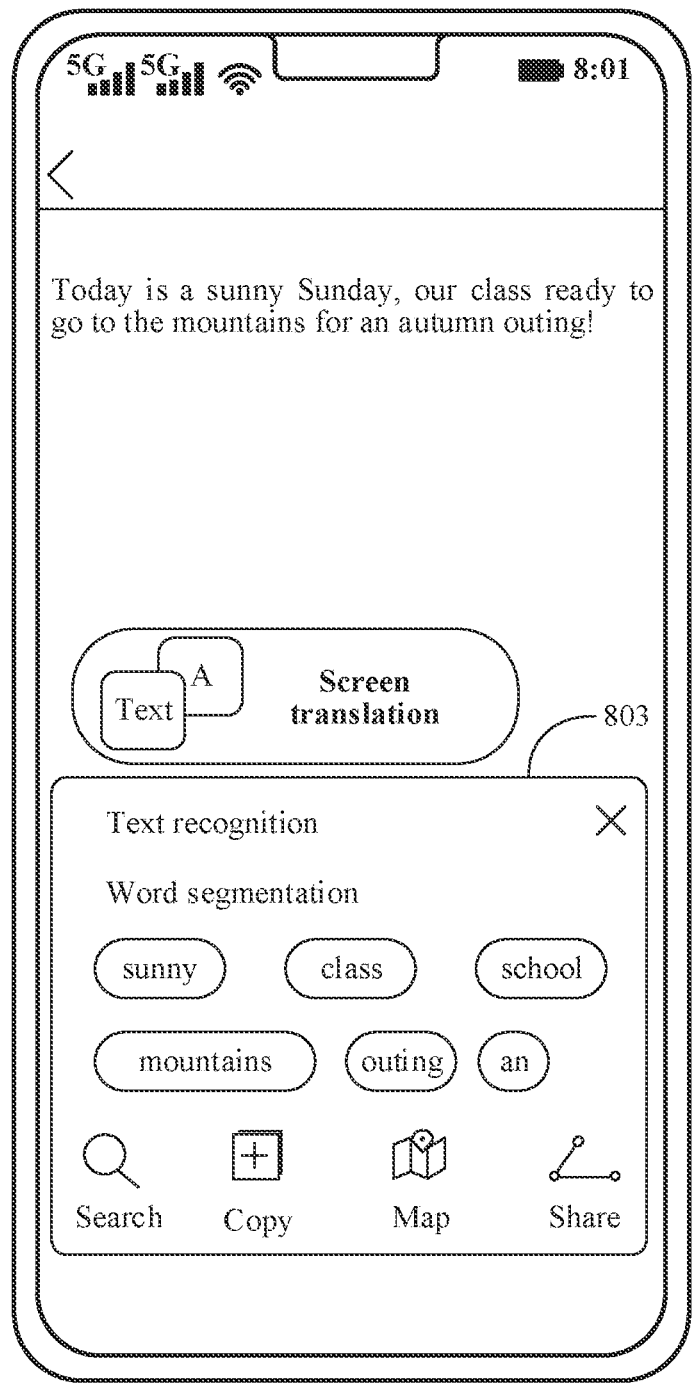

Refer to a GUI shown in FIG. 8(d). The GUI is a character string information display interface. The display interface further includes a prompt box 803. The prompt box 803 includes a result of performing word segmentation on the character string information by the mobile phone and a screen translation control. The mobile phone may automatically translate the character string information after displaying the character string information display interface for preset duration (for example, 3 seconds).

In an embodiment, if the mobile phone determines, after recognizing the photo 1, that the photo 1 includes only text content, the mobile phone may automatically translate the character string information obtained through recognition.

For example, if a default language of the mobile phone is Chinese, and the mobile phone determines that a language corresponding to the character string information is non-Chinese content (for example, English), the mobile phone may automatically translate the character string content into Chinese.

In an embodiment, the mobile phone may further display prompt information to the user after obtaining character string information, where the prompt information prompts the user with a language (for example, Chinese, Japanese, Korean, or Spanish) into which the character string content is to be translated.

Figure 8E:
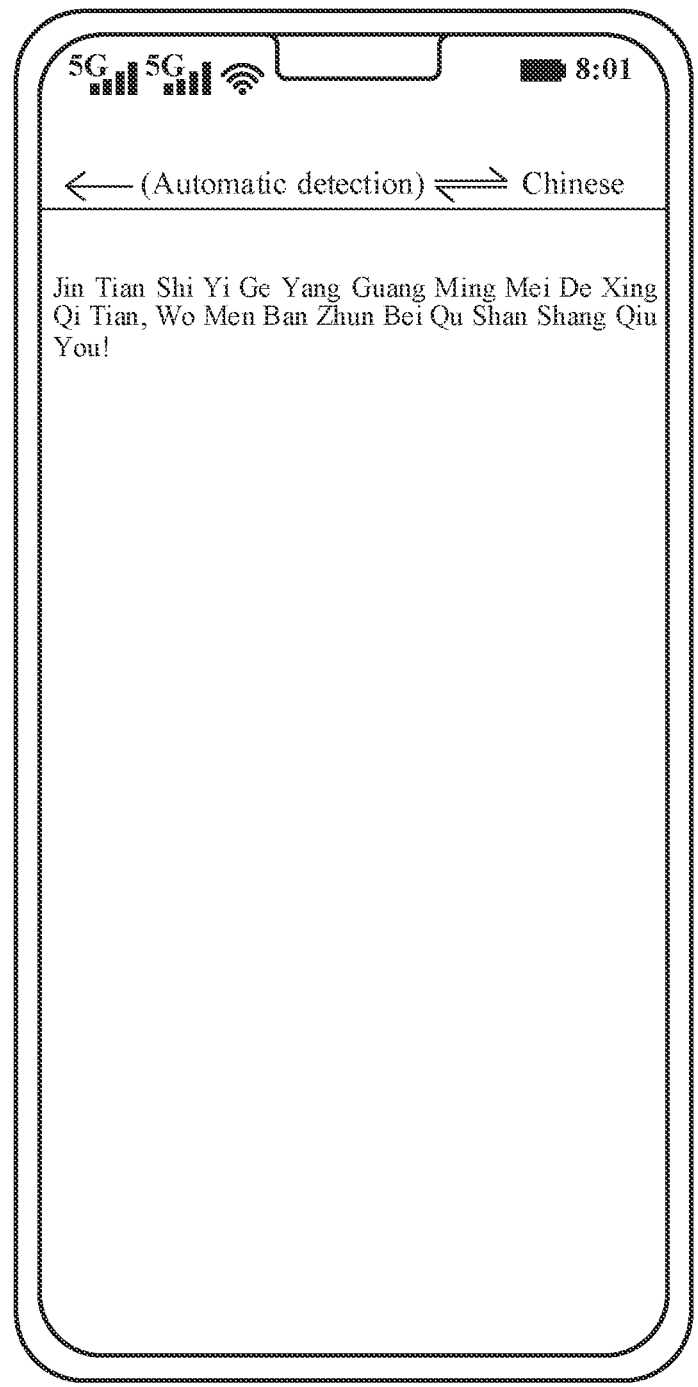

Refer to a GUI shown in FIG. 8(e). The GUI is a translation display interface. After completing translation of the character string information, the mobile phone may display corresponding translation content "Jin Tian Shi Yi Ge Yang Guang Ming Mei De Xing Qi Tian . . . Qiu You!" through the display.

In an embodiment, while displaying the translation display interface, the mobile phone may further send translation content to the smart television. In this way, the mobile phone displays the GUI shown in FIG. 3(e)-1 and FIG. 3(e)-2.

In an embodiment, after the mobile phone detects an operation of tapping the control 802 by the user, the mobile phone may also directly display the GUI shown in FIG. 8(e).

In an embodiment, the mobile phone may determine, based on content displayed in a current interface, whether the user expects to perform AI Touch on a picture on the mobile phone or perform AI Touch on a picture on the smart television. For example, a wireless connection is established between the mobile phone and the smart television. When the mobile phone displays a home screen of the mobile phone or a lock screen interface of the mobile phone, and the mobile phone detects a preset operation (for example, a two-finger operation) of the user, the mobile phone may determine that the user expects to perform AI Touch on a picture on the smart television. When the mobile phone displays a display interface of an application (for example, a Messages application, a Notepad application, or a Browser application), and the mobile phone detects a preset operation (for example, a two-finger operation) of the user, the mobile phone may determine that the user expects to perform AI Touch on a picture on the mobile phone, or the mobile phone may prompt the user to select a device on which AI Touch is to be performed on a picture.

In an embodiment, the mobile phone may also determine, based on a preset gesture of the user, whether the user expects to perform AI Touch on a picture on the mobile phone or perform AI Touch on a picture on the smart television. For example, when the mobile phone detects a two-finger press operation of the user, the mobile phone may determine that AI Touch is to be performed on a picture on the mobile phone. For example, when the mobile phone detects that the user presses a screen with two fingers and a distance for moving the two fingers on the screen is greater than or equal to a preset distance, the mobile phone may determine that AI Touch is to be performed on a picture on the smart television. For example, if a wireless connection is established between the mobile phone and each of the smart television and the tablet computer, when the mobile phone detects that the user presses a screen with two fingers and a distance at which the two fingers move on the screen is greater than or equal to a preset distance, the mobile phone may prompt the user to choose to perform AI Touch on a picture on the smart television or the tablet computer.

The foregoing describes, with reference to FIG. 3(a)-1 and FIG. 3(a)-2 to FIG. 3(e)-1 and FIG. 3(e)-2 to FIG. 8(a)-1 and FIG. 8(a)-2 to FIG. 8(e), that when detecting a preset operation (for example, a two-finger press operation), the mobile phone may send an instruction to the smart television, where the instruction instructs the smart television to capture image information currently displayed on the smart television. In this embodiment of this application, considering that there is a specific time interval from a time point at which the user sees a picture on the smart television to a time point at which the user picks up the mobile phone to perform AI Touch on the picture on the smart television, the instruction sent by the mobile phone to the smart television may further instruct the smart television to capture a video cache resource in a time period, and the video cache resource may include a plurality of frames of images.

FIG. 9(a)-1 and FIG. 9(a)-2 to FIG. 9(e) show another group of GUIs according to an embodiment of this application.

Figures 1, 9A:
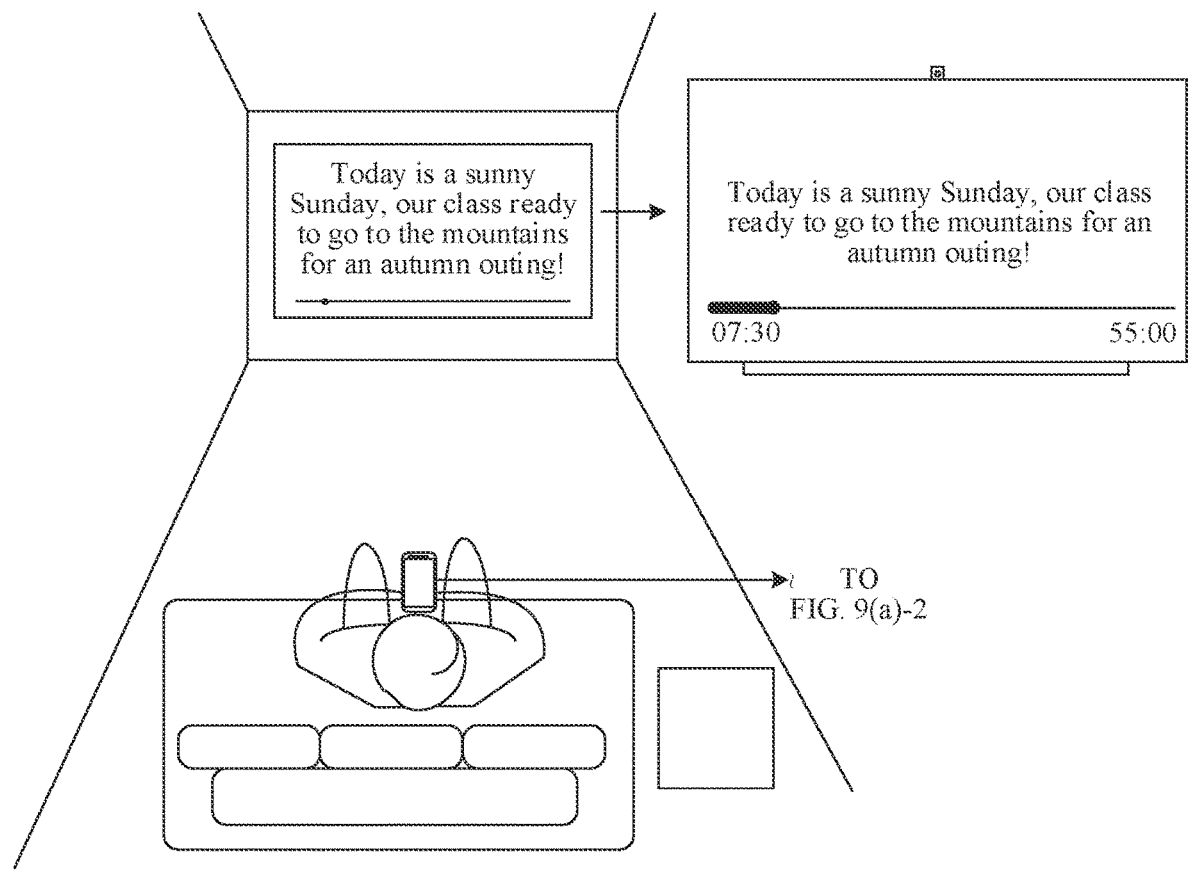
Figures 2, 9A:
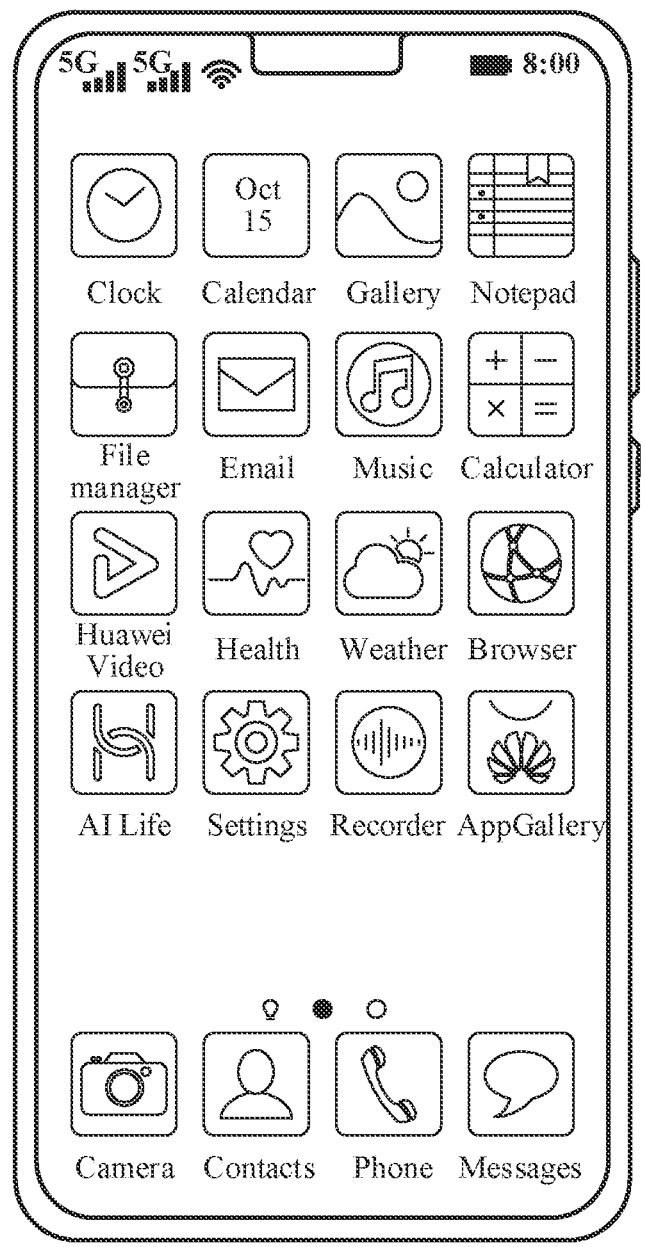

Refer to a GUI shown in FIG. 9(a)-1 and FIG. 9(a)-2. A smart television is currently playing a video. In this case, a mobile phone displays a home screen of the mobile phone.

Figure 9B:

Refer to a GUI shown in FIG. 9(b). When the mobile phone detects a two-finger press operation of the user, the mobile phone may display a GUI shown in FIG. 9(c).

Figure 9C:
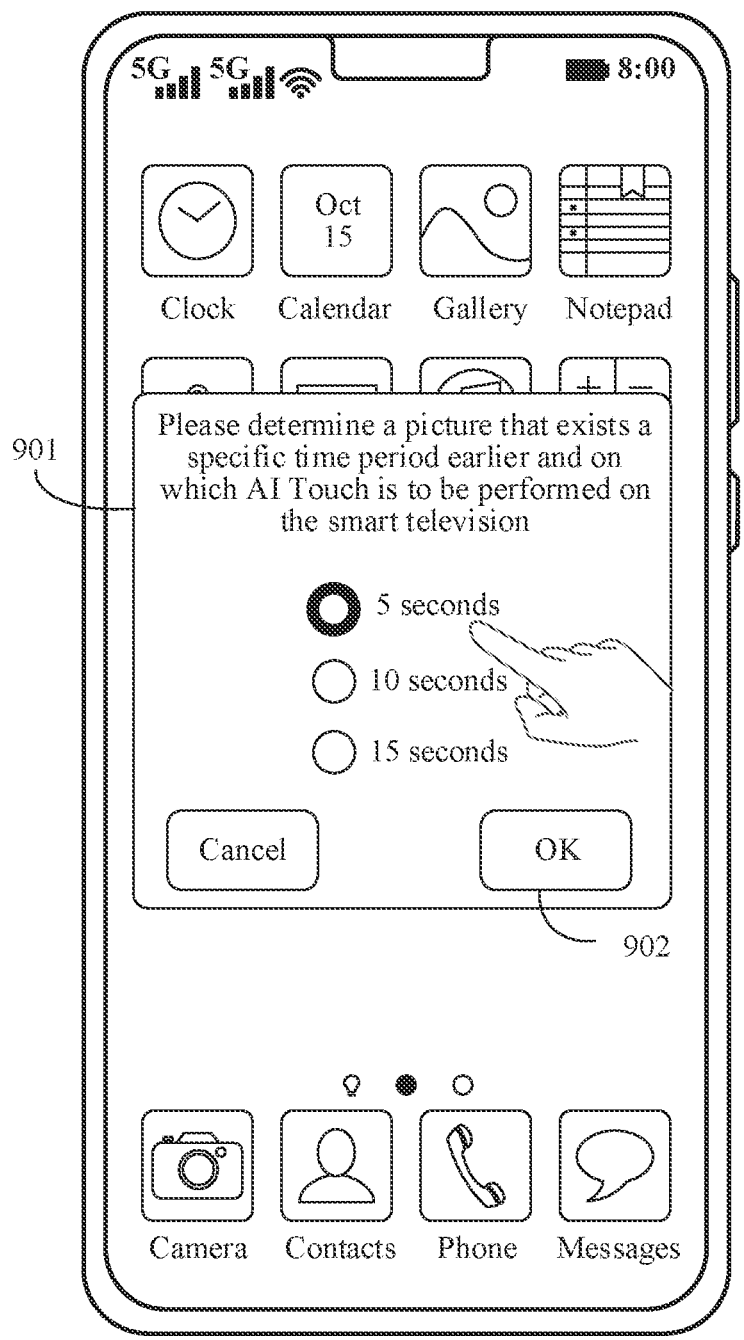

Refer to the GUI shown in FIG. 9(c) In response to the fact that the mobile phone detects the two-finger press operation performed by the user on a display interface of a Messages application, the mobile phone may display a prompt box 901, where the prompt box 901 includes prompt information "Please determine a picture that exists a specific time period earlier and on which AI Touch is to be performed on the smart television". When the mobile phone detects an operation that the user chooses to perform AI Touch on a picture 5 seconds ago and taps a control 902, the mobile phone may send an instruction to the smart television, where the instruction instructs the smart television to capture a video cache resource 5 seconds ago. In response to receiving the instruction sent by the mobile phone, the smart television sends the video cache resource 5 seconds ago to the mobile phone.

In an embodiment, when detecting a two-finger press operation of the user, the mobile phone may record a timestamp $T_1$ at the moment. There is a time interval $T_2$ from a time point at which the user sees a related picture on the smart television to a time point at which the user presses the mobile phone with two fingers (for example, the user chooses to perform AI Touch on a picture 5 seconds ago). In this case, the instruction may include the timestamp $T_1$ and the time interval $T_2$, and the smart television may capture a video cache resource of N seconds (for example, N is 2) at a time point T1-T2, and send the video cache resource to the mobile phone.

For example, if the timestamp $T_1$ is 08:00:15 a.m. and the user chooses to perform AI Touch on a picture 5 seconds ago, the smart television may capture a video cache resource near 08:00:10. For example, the smart television may capture a video cache resource from 08:00:09 to 08:00:11.

After receiving the video cache resource sent by the smart television, the mobile phone may convert the video cache resource into image information. For a specific conversion process, refer to the following description. Details are not described herein again. The mobile phone may recognize the image information obtained through conversion. For example, the mobile phone may recognize the image information to obtain character string information.

Figure 9D:
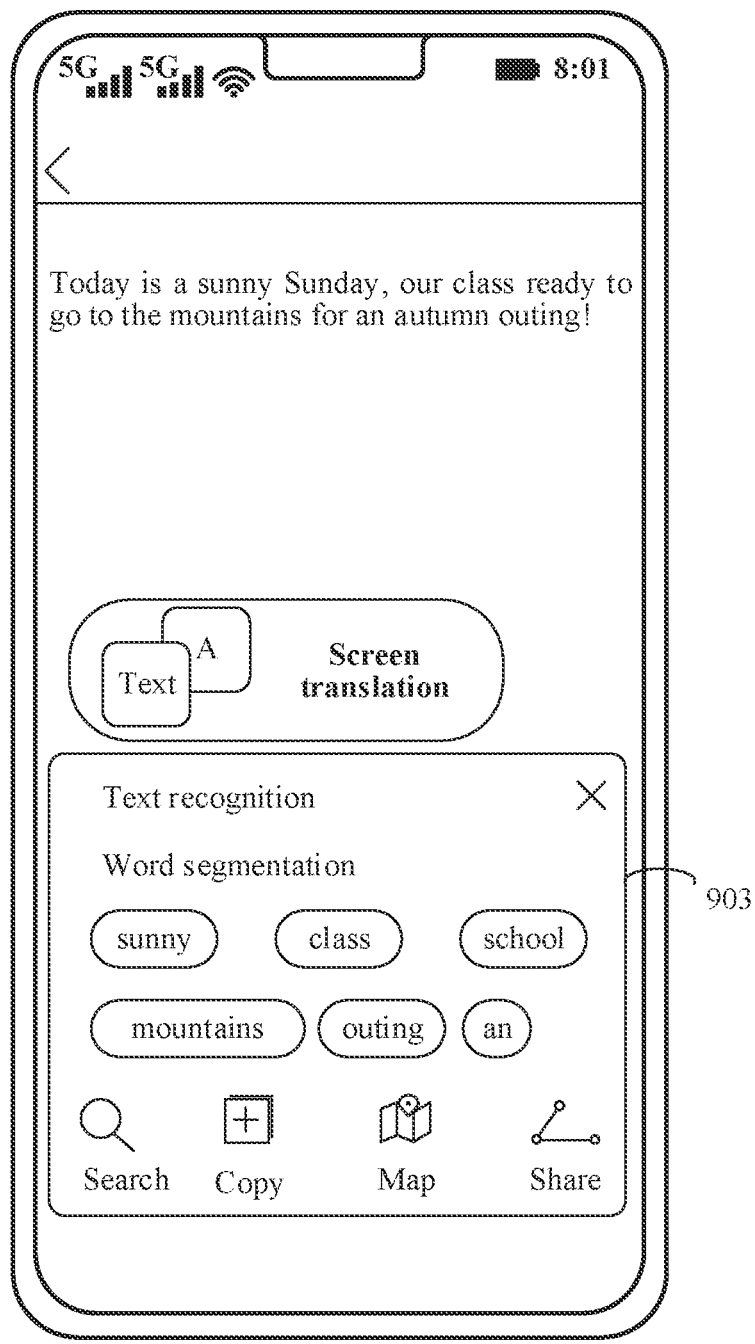

Refer to a GUI shown in FIG. 9(d). The GUI is a character string information display interface. After identifying the character string information, the mobile phone may display the character string information and display a prompt box 903 through the display. The prompt box 903 includes a result of performing word segmentation on the character string information by the mobile phone and a screen translation control. The mobile phone may automatically translate the character string information after displaying the character string information display interface for preset duration (for example, 3 seconds).

In an embodiment, if the mobile phone recognizes the image information obtained through conversion, and the mobile phone determines that the image information includes only text content, the mobile phone may automatically translate the character string information obtained through recognition.

For example, if a default language of the mobile phone is Chinese, and the mobile phone determines that a language corresponding to the character string information is non-Chinese content (for example, English), the mobile phone may automatically translate the character string content into Chinese.

In an embodiment, the mobile phone may further display prompt information to the user after obtaining character string information, where the prompt information prompts the user with a language (for example, Chinese, Japanese, Korean, or Spanish) into which the character string content is to be translated.

Figure 9E:
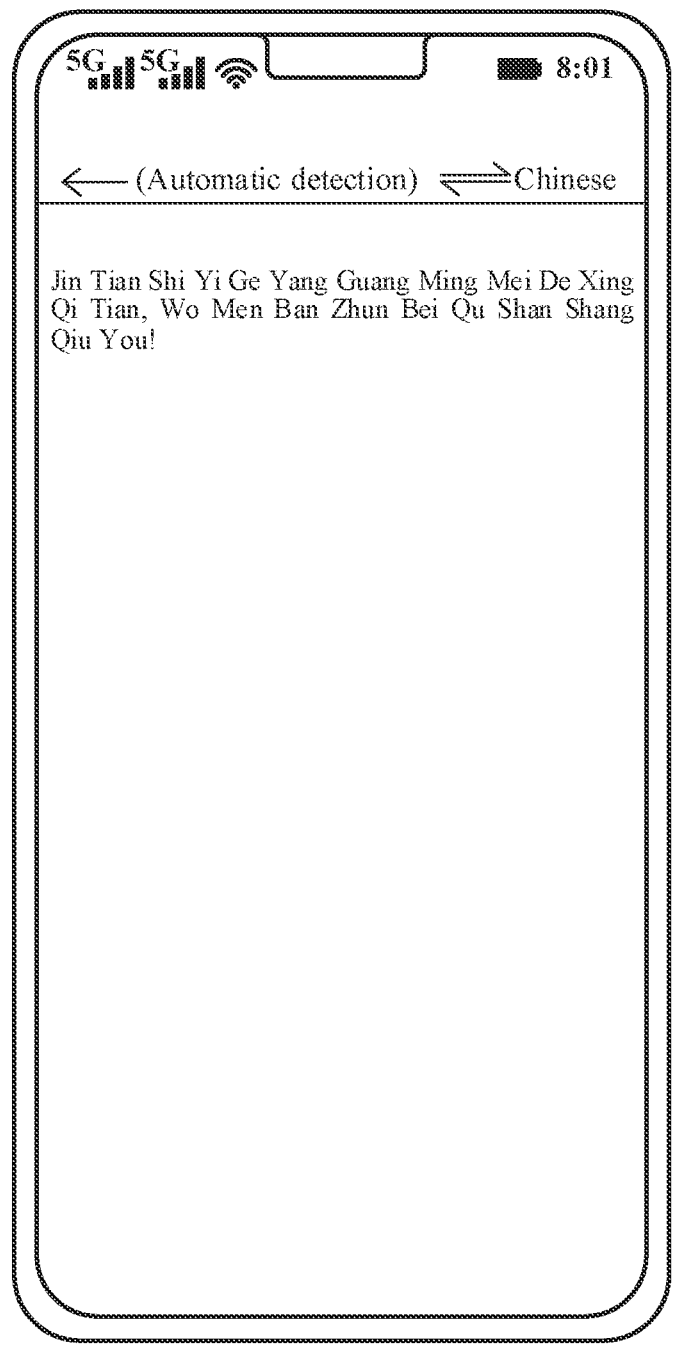

Refer to a GUI shown in FIG. 9(e). The GUI is a translation display interface. After completing translation of the character string information, the mobile phone may display corresponding translation content "Jin Tian Shi Yi Ge Yang Guang Ming Mei De Xing Qi Tian . . . Qiu You!" through the display.

In an embodiment, while displaying the translation display interface, the mobile phone may further send translation content to the smart television.

In an embodiment, after the mobile phone detects an operation of pressing a screen with two fingers by the user, the mobile phone may also directly display the GUI shown in FIG. 9(e).

FIG. 10(a)-1 and FIG. 10(a)-2 to FIG. 10(c)-1 and FIG. 10(c)-2 show another group of GUIs according to an embodiment of this application.

Figures 1, 10A:
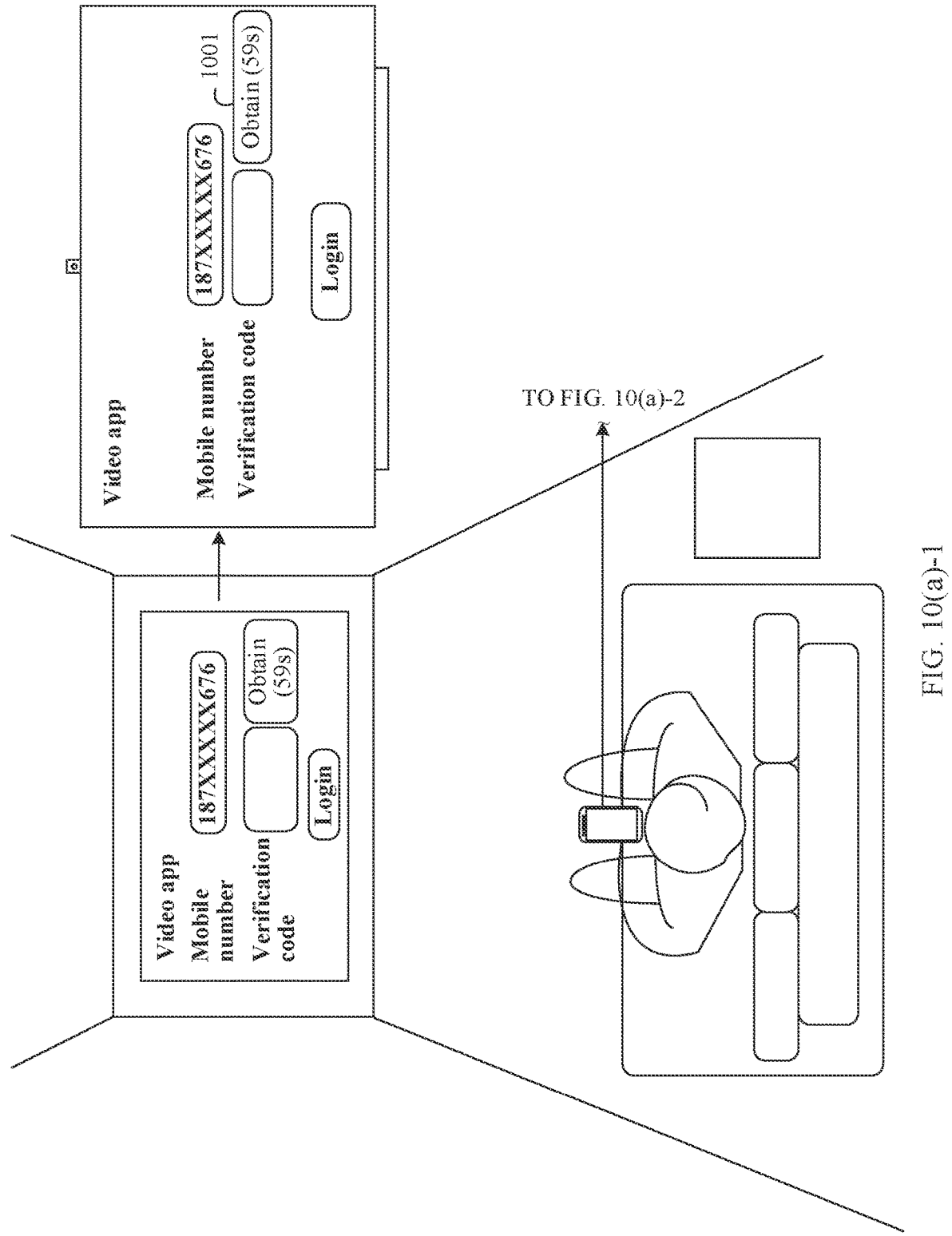
Figures 2, 10A:
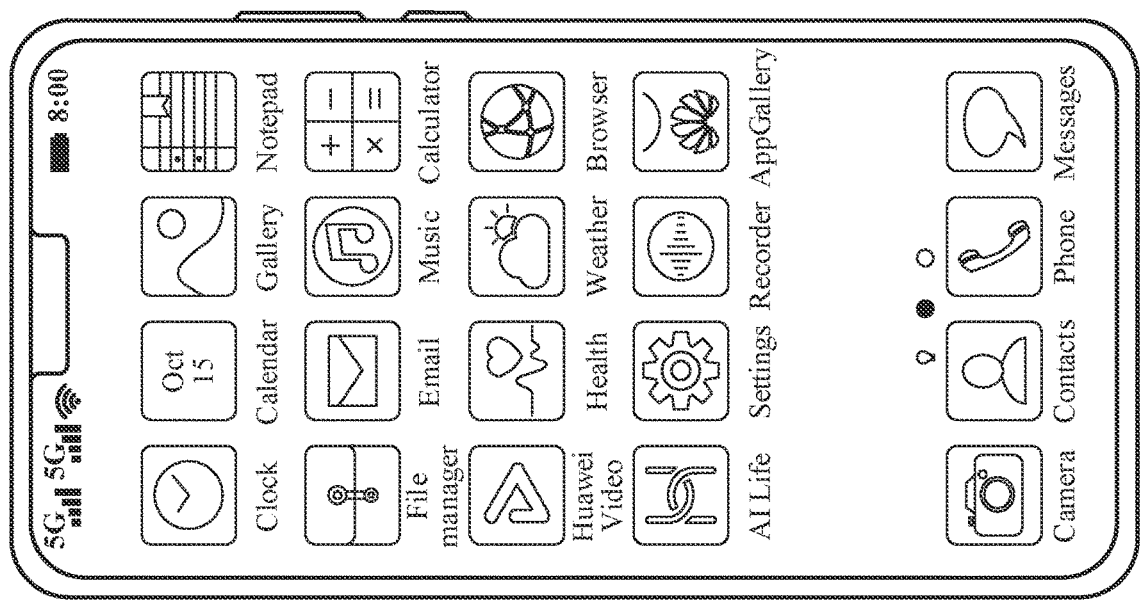
Figure 10B:
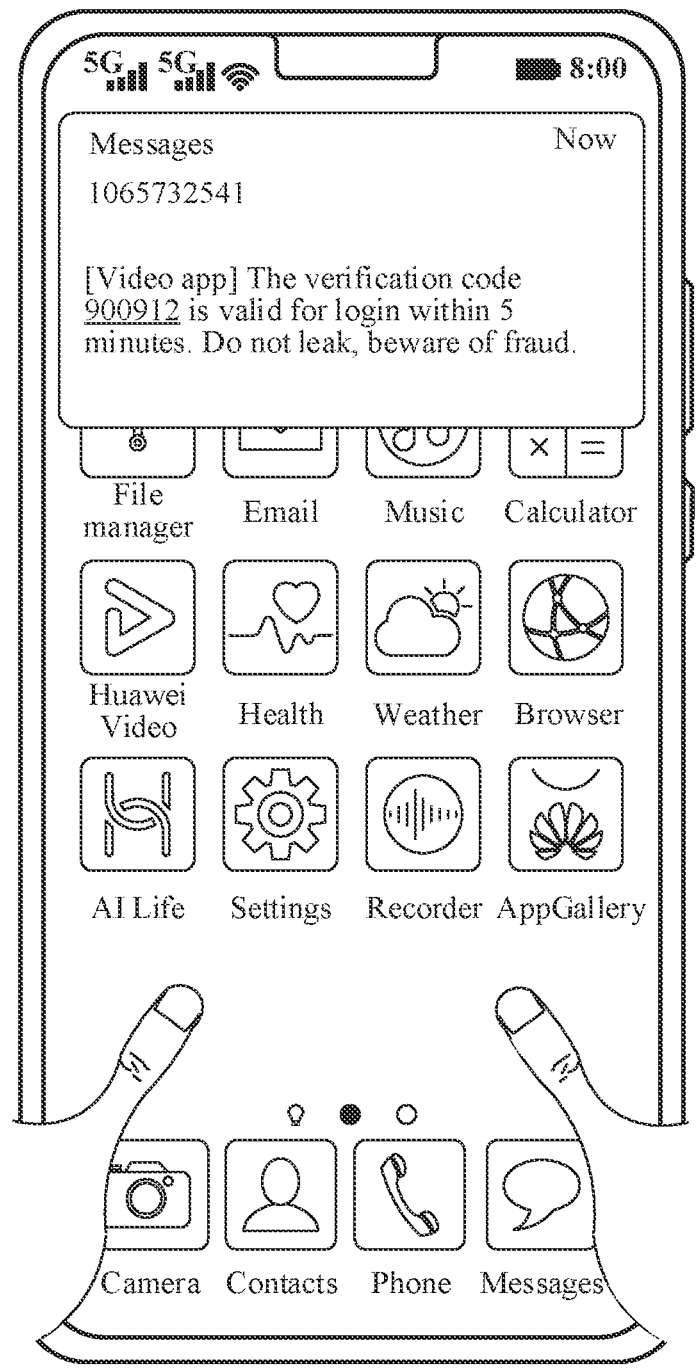
Figures 1, 10C:
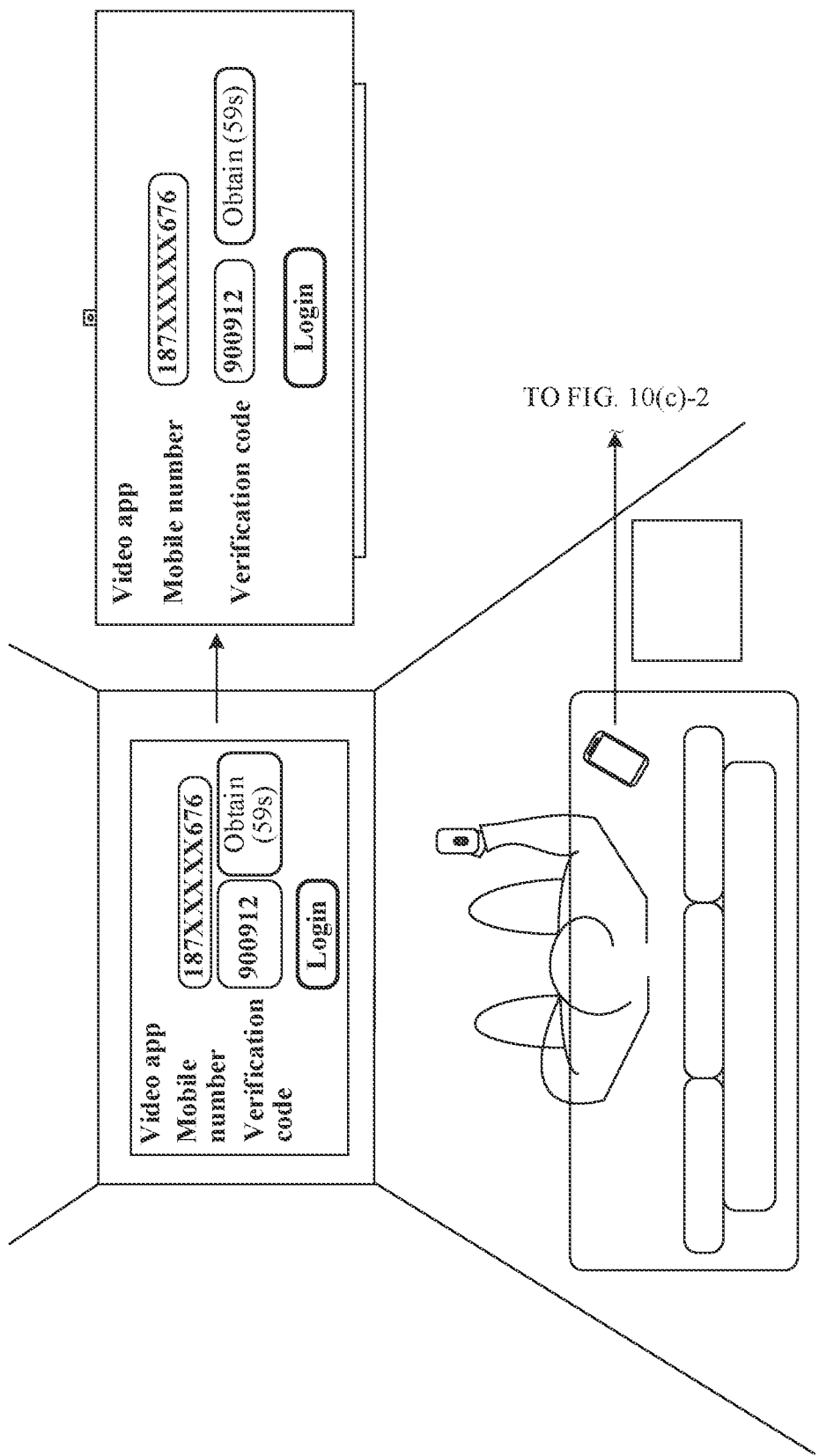
Figures 2, 10C:
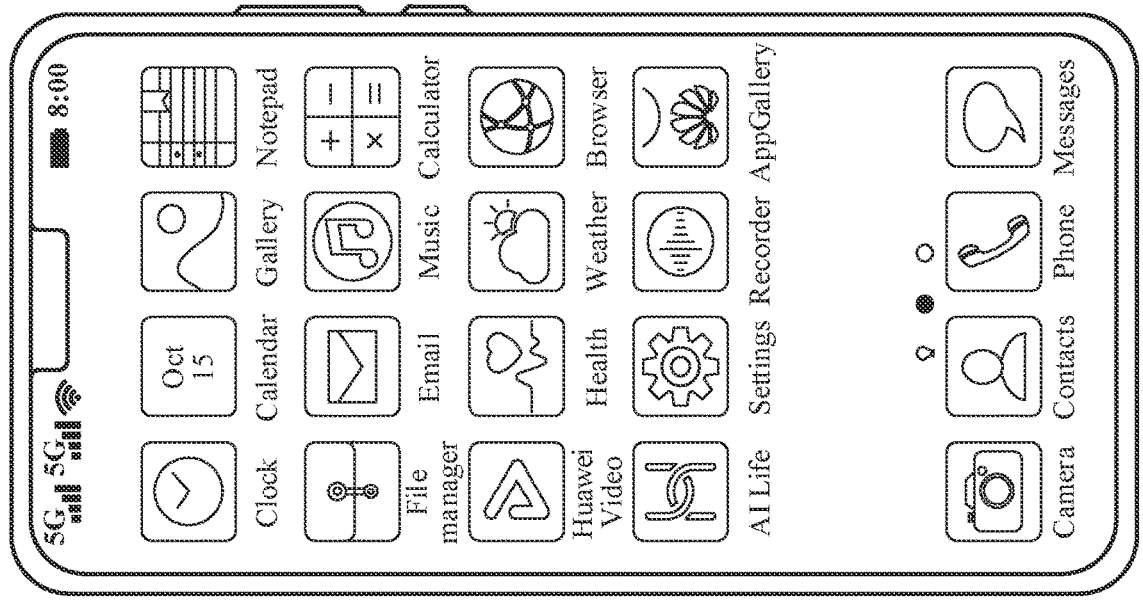

Refer to a GUI shown in FIG. 10(a)-1 and FIG. 10(a)-2. A smart television displays a login interface of a video app. In this case, a mobile phone displays a home screen of the mobile phone.

When the smart television detects an operation that a user enters a mobile number in a mobile number input box and taps a control 1001 for obtaining a verification code, the smart television may request a server to send the verification code to a device corresponding to the mobile number.

Refer to a GUI shown in FIG. 10(*b*). The GUI is a display interface obtained when the mobile phone receives the verification code. When the mobile phone detects a two-finger press operation of the user in the display interface, the mobile phone may extract verification code information (for example, a digital verification code "900912") from an SMS message. When determining that a wireless connection to the smart television has been established, the mobile phone may send the verification code information to the smart television.

Refer to a GUI shown in FIG. 10(*c*)-1 and FIG. 10(*c*)-2. In response to receiving the verification code information sent by the mobile phone, the verification code information may be automatically filled in a verification code input box.

In this embodiment of this application, the mobile phone may send the verification code information to the smart television when receiving the verification code information sent by the server and detecting the preset operation of the user. In this way, a process in which the user views the mobile phone and actively memorizes the verification code is omitted, which provides convenience for the user, improves efficiency of obtaining the verification code, and improves user experience.

The groups of GUIs provided in embodiments of this application are described above with reference to FIG. 3(*a*)-1 and FIG. 3(*a*)-2 to FIG. 3(*e*)-1 and FIG. 3(*e*)-2 to FIG. 10(*a*)-1 and FIG. 10(*a*)-2 to FIG. 10(*c*)-1 and FIG. 10(*c*)-2. An internal implementation process in embodiments of this application is described below with reference to the accompanying drawings.

Figure 11:
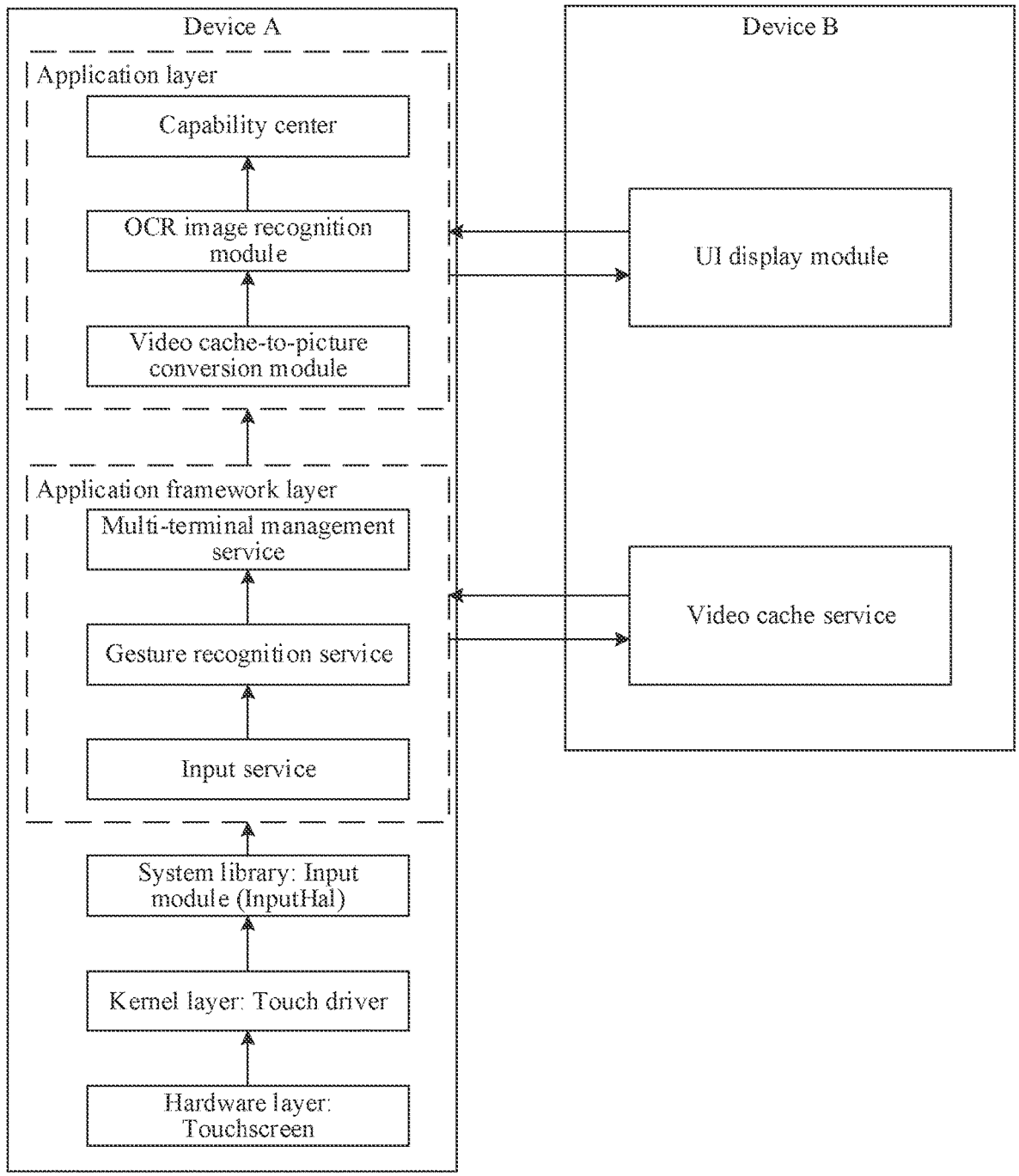
FIG. 11 shows an interaction process between a device A and a device B according to an embodiment of this application.

FIG. 11 shows an interaction process between a device A (for example, a mobile phone) and a device B (for example, a smart television) according to an embodiment of this application. Refer to FIG. 11. When detecting a preset operation (for example, a two-finger press operation) of a user through a display, the device A triggers an interrupt and notifies a touch driver at a kernel layer to obtain touchscreen (TP) data. After receiving the interrupt, the touch driver obtains the TP data, converts the TP data into an input event, and reports the input event. An input module (InputHal) in a system library (hardware abstraction layer (HAL)) reports the TP data to an input service at an application framework layer, and the input service continues to send the TP data to a mobile phone recognition service. The gesture recognition service determines a gesture type of the user based on the TP data. If the gesture recognition service determines, based on the TP data, that the gesture is a preset gesture (for example, a two-finger press gesture), the gesture recognition service continues to notify a multi-terminal management service to determine whether the device A establishes a connection to another device. If the multi-terminal management service determines that the device A and the device B establish a connection, the device A sends an instruction to the device B (for example, the device A sends the instruction to the device B by using a short-range wireless communication technology), where the instruction may instruct the device B to capture currently displayed image information, or the instruction instructs the device B to capture a video cache resource in a time period.

After receiving the instruction, the device B may capture the currently displayed image information (for example, the device B performs a screenshot operation to obtain a picture), or the device B may obtain the video cache resource in the time period from a video cache service. The device B sends the corresponding image information or video cache resource to the device A.

If the device A receives the image information sent by the device B, the device A may recognize the image information by using an OCR image recognition module at an application layer, and process a recognition result by using a capability in a capability center. The device A may display a processing result through the display. Further, the device A may further send the processing result to a UI display module of the device B, so that the device B displays the processing result through the display.

If the device A receives the video cache resource sent by the device B, the device A may first convert the video cache resource into image information, to recognize the image information by using the OCR image recognition module. For a subsequent process, refer to the foregoing description. For brevity, details are not described herein again.

Figure 12:
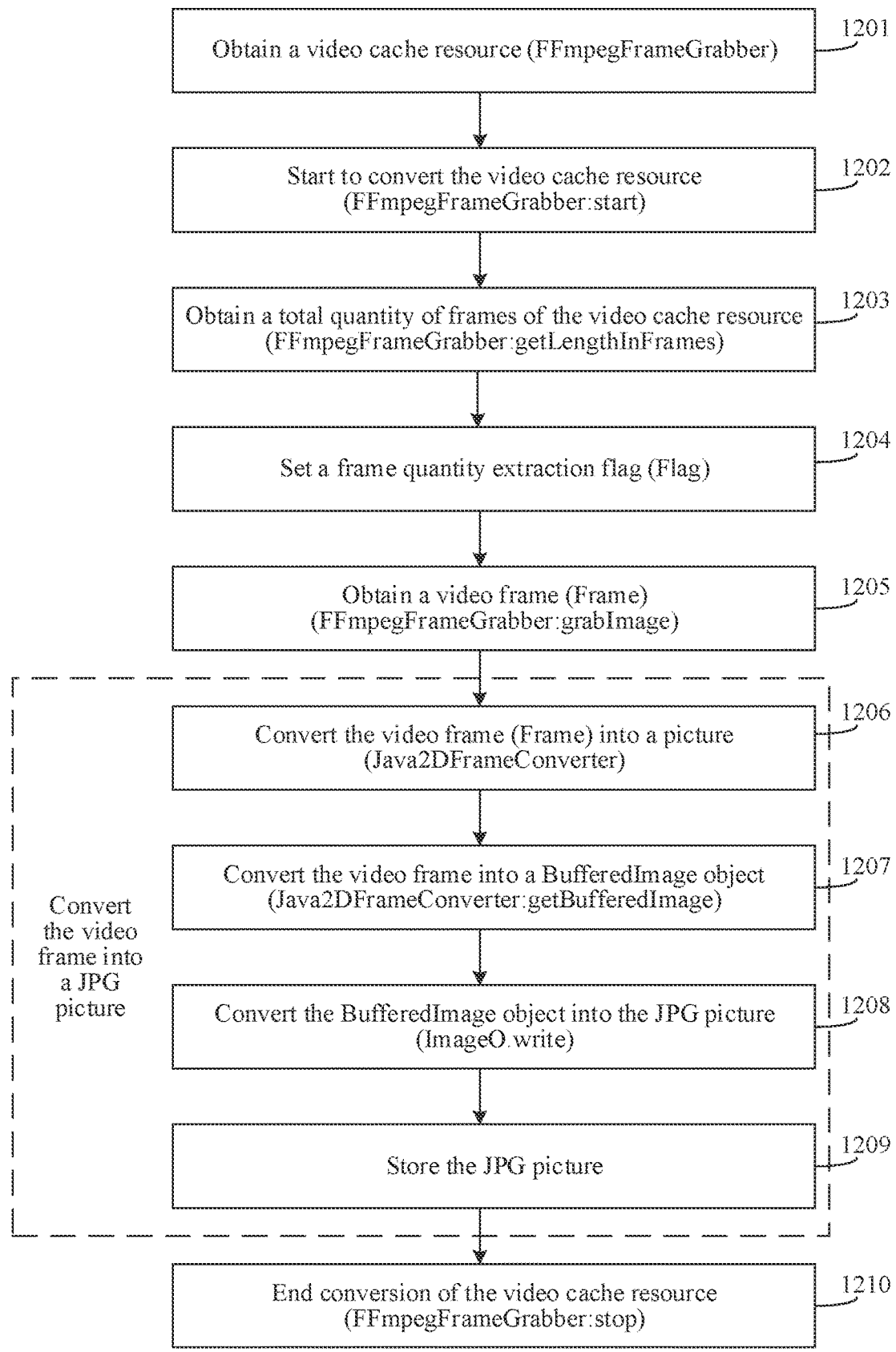
FIG. 12 shows a process in which a device A converts a video resource into image information.

FIG. 12 shows a process in which a device A converts a video resource into image information. It should be understood that, in this embodiment of this application, the device A may convert a video cache resource received from a device B into image information, or a device B may obtain a video cache resource in a time period from a video cache service, then convert the video cache resource into image information, and send the image information to the device A. The process of converting the video resource into the image information includes the following steps:

S1201: Obtain the video cache resource (FFmpegFrameGrabber).

S1202: Start to convert the video cache resource (FFmpegFrameGrabber:start).

S1203: Obtain a total quantity of frames of the video cache resource (FFmpegFrameGrabber:getLengthInFrames).

S1204: Set a frame quantity extraction flag, where for example, the flag may be 10 frames per second, 20 frames per second, 30 frames per second, or the like.

S1205: Obtain a video frame (FFmpegFrameGrabber: grabImage) based on the flag (Flag).

S1206: Convert the video frame into a picture (Java2DFrameConverter).

For example, a format of the picture may be JPG.

S1207: Convert the video frame into a BufferedImage object (Java2DFrameConverter: getBufferedImage).

S1208: Convert the BufferedImage object into a JPG picture (ImageO).write).

S1209: Store the JPG picture.

S1210: End conversion of the video cache resource (FFmpegFrameGrabber: stop).

It should be understood that the foregoing shows only one manner of converting the video cache resource into a picture. In this embodiment of this application, the device A or the device B may alternatively convert the video cache resource into a picture in another manner. This conversion manner is not specifically limited in this embodiment of this application.

Figure 13:
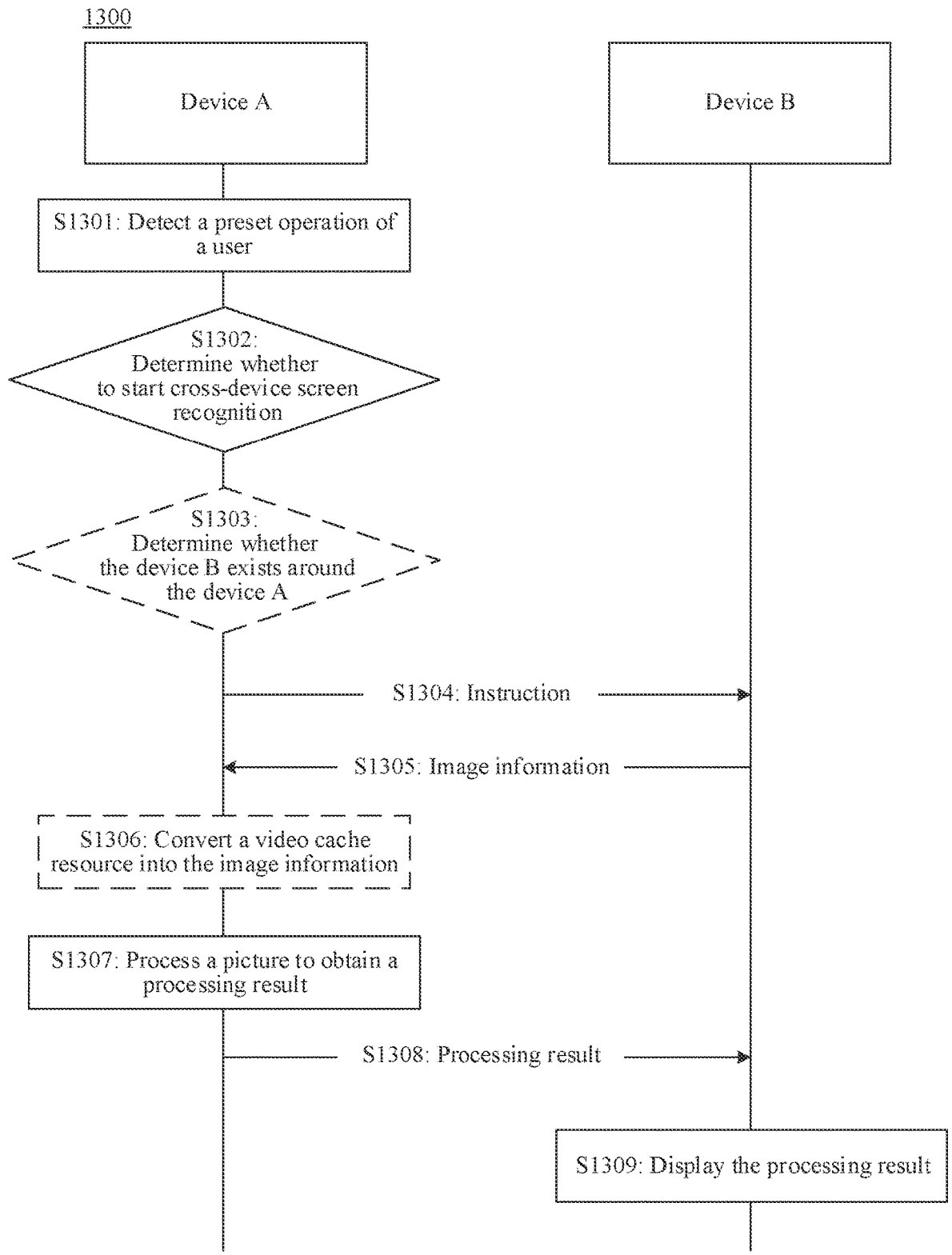
FIG. 13 is a schematic flowchart of a method for invoking a capability of another device according to an embodiment of this application.

FIG. 13 is a schematic flowchart of a method 1300 for invoking a capability of another device according to an embodiment of this application. The method 1300 may be performed by a device A (for example, a mobile phone) and a device B (for example, a smart television). The method 1300 includes the following steps:

S1301: The device A detects a preset operation of a user.

For example, as shown in FIG. 3(*b*), the mobile phone detects a two-finger press operation of the user on a home screen of the mobile phone.

S1302: In response to detecting the preset operation of the user, the device A determines whether to start cross-device screen recognition.

In an embodiment, the device A and the device B establish a wireless connection (for example, a Wi-Fi/Bluetooth/NFC connection). When detecting the preset operation of the user, the device A may determine to start cross-device screen recognition, so as to perform S1304.

Alternatively, when detecting the preset operation of the user, the device A may prompt the user to choose to perform screen recognition on the device A or the device B. If the device A detects that the user chooses to perform screen recognition on the device B, the device A may determine to start cross-device screen recognition, so as to perform S1304.

Alternatively, when detecting the preset operation of the user in a preset interface (for example, the device A displays a home screen of the device A or a lock screen interface of the device A), the device A may determine to start cross-device screen recognition, so that the mobile phone A can perform S1304.

In an embodiment, the device A does not establish a wireless connection to another device.

When detecting the preset operation of the user, the device A may prompt the user to choose to perform screen recognition on the device A or the another device. If the device A detects that the user chooses to perform screen recognition on the another device, the device A may start device searching, to perform S1303.

Alternatively, the device A may determine, based on content currently displayed in a display interface, whether to start cross-device screen recognition. When the device A displays a home screen of the device A or a lock screen interface of the device A, and the device A detects the preset operation (for example, a two-finger press operation) of the user, the device A may determine that the user expects to perform AI Touch on a picture on the another device, and the device A starts device searching, to perform S1303. When the device A displays a display interface of an application (for example, a Messages application, a Notepad application, or a Browser application), and the device A detects a preset operation (for example, a two-finger press operation) of the user, the device A may determine that the user does not expect to perform cross-device screen recognition, so that the device A recognizes a picture displayed by the device A.

S1303. The device A determines whether the device B exists around the device A.

In an embodiment, the device A may determine whether the device B having a screen exists around the device A.

For example, the device A may send a broadcast message to a surrounding device, where the broadcast message is used to query whether the surrounding device is a large-screen device. The device A may perform S1304 if the device A receives response information (ACK) from the device B.

S1304: The device A sends an instruction to the device B, where the instruction is used to request image information.

In an embodiment, the instruction is used to request the device B to capture image information displayed when the instruction is obtained (for example, instructs the device B to perform a screenshot operation to obtain a picture).

In an embodiment, the instruction is used to request a video cache resource in a first time period. In this case, the instruction may include the timestamp $T_1$ and the time interval $T_2$. After receiving the instruction, the device B may capture a video cache resource near a moment $T_1$-$T_2$.

It should be understood that the time interval $T_2$ may be a time interval that is indicated by the user and that is detected by the device. Alternatively, the instruction may not carry the time interval $T_2$, and the time interval may be preset in the device B. Further, the device B may further preset the time interval $T_2$ based on information about a user. For example, if an age of the user is from 20 to 40, the time interval may be set to 5 seconds; or if an age of the user is from 41 to 60, the time interval may be set to 10 seconds.

S1305: The device B sends the image information to the device A.

For example, the device A obtains, from the device B, a picture obtained by performing a screenshot operation by the device B.

For example, the device A obtains the video cache resource from the device B.

S1306: If the device A obtains the video cache resource from the device B, the device A may convert the video cache resource into a picture.

It should be understood that, for a manner in which the device A converts the video cache resource into the picture, refer to the descriptions in the foregoing embodiments. For brevity, details are not described herein again.

S1307. The device A processes the picture to obtain a processing result.

In an embodiment, the device A may perform corresponding processing based on content obtained by recognizing the picture.

For example, for the GUIs shown in FIG. 3(a)-1 and FIG. 3(a)-2 to FIG. 3(e)-1 and FIG. 3(e)-2, after obtaining a picture, the mobile phone may recognize the picture (for example, through OCR) to obtain character string information. If the mobile phone determines that a language (for example, English) corresponding to the character string information is not a default language of the mobile phone, the device A may translate the character string information, to obtain a translation corresponding to the character string information.

For example, for the GUIs shown in FIG. 4(a) to FIG. 4(d)-1 and FIG. 4(d)-2, after obtaining a picture, the mobile phone may recognize the picture (for example, through OCR) to obtain image information of an object. In this case, the device A may recognize the object based on the image information of the object, to obtain an object recognition result of the object.

For example, for the GUIs shown in FIG. 5(a)-1 and FIG. 5(a)-2 to FIG. 5(c), after obtaining a picture, the mobile phone may recognize the picture (for example, through OCR) to obtain character string information. If the mobile phone determines that a language (for example, Chinese) corresponding to the character string information is a default language of the mobile phone, the device A may display the character string information.

In an embodiment, after receiving the picture, the device A prompts which manner is used to process the picture. When the device A detects that the user performs an operation of processing the picture in a manner, the device A processes the picture in the manner.

For example, as shown in FIG. 7(b), when the mobile phone detects that the user chooses to translate content in the picture, the mobile phone may translate character string information obtained through recognition, to obtain a translation corresponding to the character string information.

In an embodiment, the device A may first recognize content in a picture, to obtain a recognition result, where the recognition result includes a first part of content and a second part of content, and a type of the first part of content is different from a type of the second part of content. When detecting a preset operation performed by the user on the first part of content, the mobile phone processes the first part of content, to obtain a processing result. For example, as shown in FIG. 6(c), a result of recognizing the picture by the mobile phone includes character string information (whose type is a text) and image information (whose type is a picture) of an object. In this case, when the mobile phone detects a two-finger press operation performed by the user on the character string information, the mobile phone may translate the character string information; or as shown in FIG. 6(e), when the mobile phone detects a two-finger press operation performed by the user on the image information of the object, the mobile phone may recognize the object. In an embodiment, when detecting a first preset operation (for example, a three-finger press operation) of the user, the mobile phone may process the first part of content; and when detecting a second preset operation (for example, a mid-air gesture) of the user, the mobile phone may process the second part of content.

S1308: The device A sends the processing result to the device B.

S1309: The device B displays the processing result.

For example, as shown in FIG. 3(e)-1 and FIG. 3(e)-2, after obtaining a translation, the mobile phone may send the translation to the smart television, so that the smart television can display the translation content through the display.

For example, as shown in FIG. 4(d)-1 and FIG. 4(d)-2, after obtaining an object recognition result, the mobile phone may send the object recognition result to the smart television, so that the smart television can display the object recognition result through the display.

In this embodiment of this application, the user may use a function of another device (for example, the mobile phone) on one device (for example, the smart television), to extend a capability boundary of the device. In addition, the device can conveniently and efficiently complete some difficult tasks, to help improve user experience.

Figure 14:
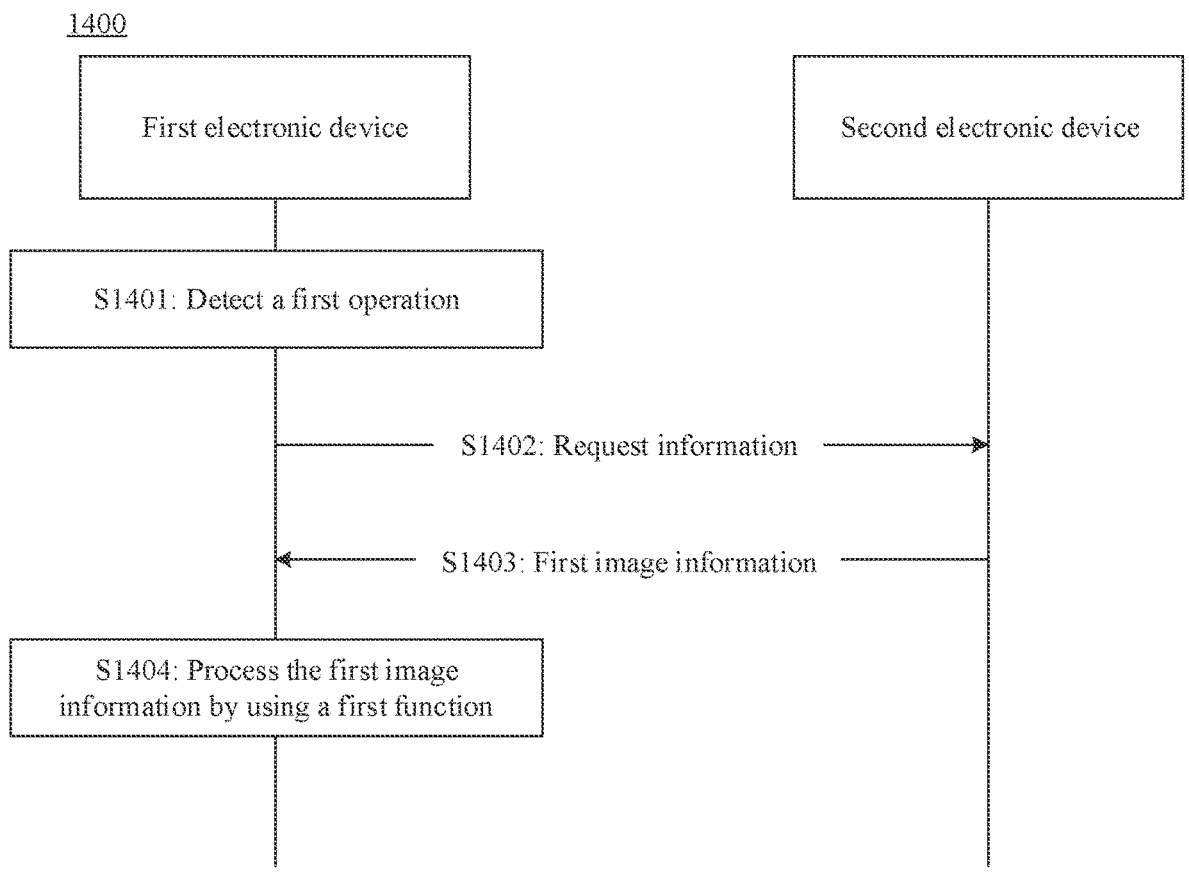
FIG. 14 is another schematic flowchart of a method for invoking a capability of another device according to an embodiment of this application.

FIG. 14 is a schematic flowchart of a method 1400 for invoking a capability of another device according to an embodiment of this application. The method 1400 may be performed by a first electronic device and a second electronic device. The method 1400 includes the following steps.

S1401: The first electronic device detects a first operation of a user.

For example, as shown in FIG. 3(b), the mobile phone detects a two-finger press operation of the user on a home screen of the mobile phone.

S1402: The first electronic device sends request information to the second electronic device in response to the first operation, where the request information is used to request first image information on the second electronic device.

In an embodiment, the first electronic device may send a BLE data packet to the second electronic device in response to the first operation, where the BLE data packet may include the request information.

In an embodiment, the first electronic device may send the request information to the second electronic device through a transmission control protocol (TCP) connection.

In an embodiment, if an account on the first electronic device is associated with an account on the second electronic device, the first electronic device may further send the request information to the second electronic device through a server.

Optionally, that the first electronic device sends request information to the second electronic device in response to the first operation includes: In response to the first operation, the first electronic device prompts the user whether to process image information on the second electronic device. The first electronic device sends the request information to the second electronic device in response to an operation that the user determines to process the image information on the second electronic device.

For example, as shown in FIG. 8(c), when the mobile phone detects a two-finger press operation of the user, the mobile phone may display a prompt box 801, where prompt information in the prompt box 801 is used by the user to determine whether to perform AI Touch on the smart television. When the mobile phone detects an operation of tapping a control 802 by the user, the mobile phone may send the request information to the smart television.

Optionally, the method 1400 further includes: The first electronic device detects a third operation of the user. In response to the third operation, the first electronic device processes image information displayed on the first electronic device.

In an embodiment, the first operation and the third operation may be different operations. For example, when the mobile phone detects a two-finger press operation of the user, the mobile phone may determine that AI Touch is to be performed on a picture on the mobile phone. For example, when the mobile phone detects that the user presses a screen with two fingers and a distance for moving the two fingers on the screen is greater than or equal to a preset distance, the mobile phone may determine that AI Touch is to be performed on a picture on the smart television.

S1403: The second electronic device sends the first image information to the second electronic device in response to the request information.

In an embodiment, the second electronic device may send the first image information to the first electronic device through a TCP connection.

In an embodiment, the second electronic device may send the first image information to the first electronic device by using a BLE data packet.

In an embodiment, the second electronic device may send the first image information to the first electronic device through a server.

S1404: The first electronic device processes the first image information by using a first function.

Optionally, the first function includes a first sub-function and a second sub-function, and that the first electronic device processes the first image information by using a first function includes: When the first image information includes first content, the first electronic device processes the first content by using the first sub-function; or when the first image information includes second content, the first electronic device processes the second content by using the second sub-function.

For example, as shown in FIG. 3(d), when the mobile phone determines that the image information sent by the smart television includes text content, the mobile phone may translate the text content by using a translation function, to obtain a translation result.

For example, as shown in FIG. 4(c), when the mobile phone determines that the image information sent by the smart television includes information about an object (for example, a football), the mobile phone may recognize the object by using an object recognition function, to obtain an object recognition result.

Optionally, the first electronic device further has a second function, and that the first electronic device processes the first image information by using a first function includes: In response to receiving the first image information, the first electronic device prompts the user to process the first image information by using the first function or the second function. The first electronic device processes the first image information by using the first function in response to an operation of selecting the first function by the user.

For example, as shown in FIG. 7(b), after the mobile phone receives the image information sent by the smart television, the mobile phone may prompt the user to select a specific function to process the image information. When the mobile phone detects that the user selects a translation function, the mobile phone may translate a text in the image information by using the translation function, to obtain a translation result.

Optionally, that the first electronic device processes the first image information by using a first function includes: The first electronic device displays the first image information in response to receiving the first image information, where the first image information includes a first part and a second part. The first electronic device processes the first part by using the first function in response to a second operation performed by the user on the first part.

For example, as shown in FIG. 6(c), the mobile phone may display the image information received from the smart television, where the image information includes an area 601 and an area 602. When the mobile phone detects a two-finger press operation of the user in the area 601, the mobile phone may perform a translation operation on text content in the area 601, to obtain a translation result.

Optionally, the method 1400 further includes: The first electronic device sends a processing result of the first image information to the second electronic device. The second electronic device is further configured to display the processing result.

In this embodiment of this application, after obtaining the processing result, the first electronic device may not display the processing result, but sends the processing result to the second electronic device and displays the processing result through the second electronic device. The first electronic device is insensitive to the user, to help improve user experience.

Optionally, the method 1400 further includes: The first electronic device displays the processing result of the first image information.

In this embodiment of this application, the first electronic device may display the processing result after obtaining the processing result, or display the processing result on both the first electronic device and the second electronic device after sending the processing result to the second electronic device, to help improve user experience.

An embodiment of this application provides an electronic device. The electronic device includes one or more processors and one or more memories. The one or more memories store one or more computer programs, and the one or more computer programs include instructions. When the instructions are run on the one or more processors, a first electronic device or a second electronic device is enabled to perform the technical solutions in the foregoing embodiments.

It should be understood that the one or more processors may be the processor 110 in FIG. 1, and the one or more memories may be the memory 121 in FIG. 1.

An embodiment of this application provides a system, including a first electronic device and a second electronic device. The system is configured to perform the technical solutions in the foregoing embodiments. Implementation principles and technical effects thereof are similar to those of the foregoing method embodiments. Details are not described herein again.

An embodiment of this application provides a computer program product. When the computer program product runs on a first electronic device (or the mobile phone in the foregoing embodiment), the first electronic device is enabled to perform the technical solutions in the foregoing embodiments. Implementation principles and technical effects thereof are similar to those of the foregoing method embodiments. Details are not described herein again.

An embodiment of this application provides a readable storage medium. The readable storage medium includes instructions. When the instructions are run on a first electronic device (or the mobile phone in the foregoing embodiment), the first electronic device is enabled to perform the technical solutions in the foregoing embodiments. Implementation principles and technical effects thereof are similar to those of the foregoing method embodiments. Details are not described herein again.

An embodiment of this application provides a chip. The chip is configured to execute instructions. When the chip runs, the technical solutions in the foregoing embodiments are executed. Implementation principles and technical effects thereof are similar to those of the foregoing method embodiments. Details are not described herein again.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A system, wherein the system comprises a first electronic device and a second electronic device, and the first electronic device has a first function, wherein:
   the first electronic device is configured to:
   detect a first operation of a user within a predetermined interface context of the first electronic device, the predetermined interface context comprising at least a home screen or a lock screen interface;
   determine, based on the predetermined interface context and the first operation comprising a predetermined operation, that the user intends to process first image information displayed on the second electronic device; and
   in response to determining that the user intends to process the first image information displayed on the second electronic device, send request information to the second electronic device, wherein the request information requests the second electronic device to capture the first image information currently displayed on the second electronic device;
   the second electronic device is configured to: in response to receiving the request information from the first electronic device, send the first image information to the first electronic device; and
   the first electronic device is further configured to process the first image information by using the first function comprising a first sub-function and a second sub-function, wherein the first electronic device is configured to selectively process the first image information using one of the first sub-function and the second sub-function based on content of the first image information.

2. The system of claim 1, wherein:
   the first electronic device is further configured to send a processing result of the first image information to the second electronic device; and
   the second electronic device is further configured to display the processing result.

3. The system of claim 2, wherein the first electronic device is further configured to display the processing result of the first image information.

4. The system of claim 1, wherein the first sub-function comprises a translation function, and the second sub-function comprises an object recognition function, and the first electronic device is configured to:
   when the first image information comprises a first content, process the first content by using the first sub-function, wherein the first content comprises text information; or
   when the first image information comprises a second content, process the second content by using the second sub-function, wherein the second content comprises an image of an object.

5. The system of claim 1, wherein the first electronic device further has a second function, and the first electronic device is configured to:
   in response to receiving the first image information, prompt the user to process the first image information by using the first function or the second function; and
   in response to detecting an operation of selecting the first function by the user, process the first image information by using the first function.

6. The system of claim 1, wherein the first electronic device is configured to:
   in response to receiving the first image information, display the first image information, wherein the first image information comprises a first part and a second part; and
   in response to detecting a second operation performed by the user on the first part, process the first part by using the first function.

7. The system of claim 1, wherein the first electronic device is configured to:
   in response to the first operation, prompt the user whether to process image information on the second electronic device; and
   in response to detecting an operation that the user determines to process the image information on the second electronic device, send the request information to the second electronic device.

8. The system of claim 1, wherein the first electronic device is further configured to:
   detect a third operation of the user; and
   in response to the third operation, process image information displayed on the first electronic device.

9. The system of claim 1, wherein the request information comprises information about a first moment, the first moment is a moment at which the first electronic device detects the first operation, and the second electronic device is further configured to:
   determine the first image information based on the first moment.

10. The system of claim 9, wherein the request information further comprises information about a first duration, and the second electronic device is configured to:
    determine the first image information based on the first moment and the first duration.

11. The system of claim 1, wherein the first image information comprises text information, and the first electronic device is configured to:
    translate the text information by using a translation function to obtain a translation result; or perform a word extraction operation on the text information by using a word extraction function to obtain a word extraction result.

12. The system of claim 1, wherein the first image information comprises an image of an object, and the first electronic device is configured to:
recognize the object by using an object recognition function to obtain an object recognition result.

13. The system of claim 1, wherein a login account on the first electronic device is associated with a login account on the second electronic device.

14. An electronic device, comprising:
at least one processor; and
one or more memories coupled to the at least one processor and configured to store programming instructions that, when executed by the at least one processor, cause the electronic device to:
detect a first operation of a user within a predetermined interface context of the electronic device, the predetermined interface context comprising at least a home screen or a lock screen interface;
determine, based on the predetermined interface context and the first operation comprising a predetermined operation, that the user intends to process first image information displayed on a second electronic device;
in response to determining that the user intends to process the first image information displayed on the second electronic device, send request information to the second electronic device, wherein the request information requests the second electronic device to capture the first image information currently displayed on the second electronic device;
receive the first image information sent by the second electronic device, wherein the first image information is sent by the second electronic device in response to receiving the request information from the electronic device; and
process the first image information by using a first function comprising a first sub-function and a second sub-function, wherein the electronic device is configured to selectively process the first image information using one of the first sub-function and the second sub-function based on content of the first image information.

15. The electronic device of claim 14, wherein the one or more memories are configured to store the programming instructions that, when executed by the at least one processor, further cause the electronic device to:
send a processing result of the first image information to the second electronic device.

16. The electronic device of claim 15, wherein the one or more memories are configured to store the programming instructions that, when executed by the at least one processor, further cause the electronic device to:
display the processing result of the first image information.

17. The electronic device of claim 14, wherein the first sub-function comprises a translation function, and the second sub-function comprises an object recognition function, and the selectively process the first image information using one of the first sub- function and the second sub-function based on content of the first image information comprises:
process a first content by using the first sub-function when the first image information comprises the first content, wherein the first content comprises text information; or
process a second content by using the second sub-function when the first image information comprises the second content, wherein the second content comprises an image of an object.

18. The electronic device of claim 14, wherein:
the electronic device further has a second function, and the one or more memories are configured to store the programming instructions that, when executed by the at least one processor, further cause the electronic device to:
before processing the first image information by using the first function, and in response to receiving the first image information, prompt the user to process the first image information by using the first function or the second function; and
the process the first image information by using the first function comprises:
in response to detecting an operation of selecting the first function by the user, process the first image information by using the first function.

19. The electronic device of claim 14, wherein:
the one or more memories are configured to store the programming instructions that, when executed by the at least one processor, further cause the electronic device to:
before the process the first image information by using the first function, and in response to receiving the first image information, display the first image information, wherein the first image information comprises a first part and a second part; and
the process the first image information by using the first function comprises:
in response to detecting a second operation performed by the user on the first part, process the first part by using the first function.

20. The electronic device of claim 14, wherein the in response to detecting the first operation, send request information to a second electronic device comprises:
in response to detecting the first operation, prompt the user whether to process image information on the second electronic device; and
in response to detecting an operation that the user determines to process the image information on the second electronic device, send the request information to the second electronic device.

* * * * *